(12) United States Patent
Tomita et al.

(10) Patent No.: US 7,139,436 B2
(45) Date of Patent: Nov. 21, 2006

(54) ORTHOGONAL TRANSFORM METHOD AND APPARATUS

(75) Inventors: Hiroto Tomita, Kasuya-Gun (JP); Masahiro Ohashi, Kasuya-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 669 days.

(21) Appl. No.: 10/354,195

(22) Filed: Jan. 30, 2003

(65) Prior Publication Data

US 2003/0152281 A1    Aug. 14, 2003

(30) Foreign Application Priority Data

Jan. 31, 2002   (JP) ............... 2002-022711

(51) Int. Cl.
*G06K 9/36* (2006.01)
(52) U.S. Cl. .............. 382/248; 382/232; 382/233; 382/250
(58) Field of Classification Search ............. 382/232, 382/233, 248, 250, 244, 245, 246; 375/240.18, 375/240.25, 240.24; 348/403.1
See application file for complete search history.

(56) References Cited

U.S. PATENT DOCUMENTS 5,801,776 A * 9/1998 Tamura et al. ......... 375/240.18
6,333,951 B1 * 12/2001 Tamura et al. ......... 375/240.25

FOREIGN PATENT DOCUMENTS

| EP | 1 065 884 A1 | 1/2001 |
|---|---|---|
| JP | 03-104435 | 5/1991 |
| JP | 02-194734 | 8/1991 |
| JP | 04-043461 | 2/1992 |
| JP | 7-83478 | 6/1995 |
| JP | 2000244916 A * | 9/2000 |
| WO | 99/10818 | 3/1999 |

OTHER PUBLICATIONS

Pei et al., "Transform Domain Adaptive Linear Phase Filter", IEEE vol. 44, No. 12, Dec. 1996, pp. 3142-3146.*
Wintz, "Transform Picture Coding", IEEE vol. 60, No. 7, Jul. 1972, pp. 809-820.*
Stasinski et al., "Reduced-Complexity Shape-Adaptive DCT for Region-Based Image Coding", IEEE vol. 3, Oct. 1998, pp. 114-118.*

(Continued)

*Primary Examiner*—Anh Hong Do
(74) *Attorney, Agent, or Firm*—Wenderoth, Lind & Ponack, L.L.P.

(57) ABSTRACT

In a four-by-four orthogonal transform mode, an input data buffer enters a first half of entered eight pieces of pixel data, i.e., "x0A", "x1A", "x2A", and "x3A", into each of the first to fourth multiply-and-accumulation (MAC) operation circuits, while feeding a second half of the entered eight pieces of pixel data, i.e., "x0B", "x1B", "x2B", and "x3B", into each of the fifth to eighth MAC operation circuits. In an eight-by-eight orthogonal transform mode, the input data buffer feeds entered eight pieces of pixel data into each of the first to eighth MAC operation circuits. Since the input data buffer receives the eight pieces of pixel data in each of the four-by-four and eight-by-eight orthogonal transform modes, an orthogonal transform circuit is activated once in each of the four-by-four and eight-by-eight orthogonal transform modes. In both of the four-by-four and eight-by-eight orthogonal transform modes, the same first to eighth MAC operation circuits are used to produce the orthogonal transform coefficient data. This feature inhibits an increase in hardware area.

13 Claims, 23 Drawing Sheets

OTHER PUBLICATIONS

Paek S-K et al: "A Mode-Changeable 2-D DCT/IDCT Processor for Digital VCR" IEEE Transactions on Consumer Electronics, IEEE Inc. New York, US, vol. 42, No. 3, Aug. 1996, pp. 606-616, XP000638545.

Guo J-I et al: "A Generalized Architecture for the One-Dimensional Discrete Cosine and Sine Transforms" IEEE Transactions on Circuits and Systems for Video Technology, IEEE Inc. New York, US, vol. 11, No. 7, Jul. 2001, pp. 874-881, XP001083362.

* cited by examiner 8-by-8 orthogonal transform mode 4-by-4 orthogonal transform mode DC : direct current coefficient AC : alternating current coefficient

ORTHOGONAL TRANSFORM METHOD AND APPARATUS

BACKGROUND OF THE INVENTION

1. Field of the Invention

The present invention relates to an orthogonal transform method for use in providing compressed information, and an art related thereto.

2. Description of the Related Art

In JPEG (Joint Photographic Coding Experts Group) that is a standard method for compressing a static picture, and MPEG (Moving Picture Coding Experts Group) that is a standard method for compressing a moving picture, compressed information is provided using an intra-screen (spatial) correlation.

An image signal is orthogonally transformed in a manner called discrete cosine transform (DCT), thereby providing orthogonal transform coefficients. At this time, a large value is concentrated on low-frequency components in the image signal. In view of such a characteristic, the orthogonal transform coefficients are quantized, thereby providing orthogonal transform coefficient data. Such quantization removes high-frequency components from the image signal. The orthogonal transform coefficient data are subjected to entropy encoding, thereby providing the compressed information.

A matrix operation is required to practice the DCT during encoding and IDCT (inverse discrete cosine transform) during decoding. The matrix operation involves a great amount of arithmetic operation.

Accordingly, the DCT and IDCT are often carried out using dedicated hardware.

In JPEG and MPEG, eight-by-eight DCT is practiced as an orthogonal transformation. However, when the orthogonal transformation is performed for each block, then a block boundary correlation is lost. As a result, a block distortion occurs.

In order to handle such an inconvenience, the orthogonal transformation may be practiced for each of smaller-sized blocks in order to reduce the block distortion. Accordingly, a next-generation coding system would possibly incorporate a four-by-four transformation as the orthogonal transformation.

In order to provide orthogonal transform-dedicated hardware adapted for use in both of the MPEG and the next generation coding system, the orthogonal transform-dedicated hardware must be constructed to provide both eight-by-eight, and four-by-four orthogonal transformations. Similarly to the orthogonal transformation as just described, inverse orthogonal transform-dedicated hardware must be designed for both eight-by-eight and four-by-four inverse orthogonal transformations.

In the orthogonal transformation, the prior art employs two different types of circuits, i.e., eight-by-eight and four-by-four orthogonal transform circuits. Similarly to the orthogonal transformation, in the inverse orthogonal transformation, the prior art uses two different types of circuits, i.e., eight-by-eight and four-by-four inverse orthogonal transform circuits. Such a prior art system brings about a problem of the resulting large-scaled hardware.

The published Japanese Patent Application Examined No. 7-83478 discloses DCT and IDCT apparatuses designed to inhibit an increase in hardware size thereof. These apparatuses are now described with reference to the drawings.

FIG. 23 is a block diagram, illustrating a prior art DCT apparatus.

FIG. 24 is a block diagram, illustrating a prior art IDCT apparatus.

As illustrated in FIG. 23, in encoding, a mirror image-generating circuit 900 produces a mirror image in response to a four-by-four image signal, thereby transforming the four-by-four image signal into an eight-by-eight image signal.

A DCT circuit 901 orthogonally transforms the eight-by-eight image signal from the mirror image-generating circuit 900, thereby providing orthogonal transform coefficients. A pixel-skipping circuit 902 thins out the orthogonal transform coefficients, thereby providing four-by-four orthogonal transform coefficients.

As illustrated in FIG. 24, in decoding, an interpolation circuit 903 supplements orthogonal transform coefficients, thereby transforming the supplemented orthogonal transform coefficients into eight-by-eight orthogonal transform coefficients. The eight-by-eight orthogonal transform coefficients are sent to an IDCT circuit 904.

The IDCT circuit 904 inversely orthogonally transforms the eight-by-eight transform coefficients from the interpolation circuit 903, thereby providing inversely orthogonally transformed data. A mirror image-eliminating circuit 905 eliminates mirror image data from the inversely orthogonally transformed data, thereby providing four-by-four image signals.

This system is characterized in that only the mirror image-generating circuit 900 and the interpolation circuit 902 are added to hardware, thereby inhibiting an increase in hardware size of the DCT apparatus. Similarly, the above system inhibits an increase in hardware size of the IDCT apparatus.

However, a drawback to the above is that the prior art DCT apparatus is constructed to practice four-by-four orthogonal transformation only for each of four pixels-by-four lines-formed blocks.

As a result, the orthogonal transformation-dedicated hardware is activated an increased number of times of activation to practice the four-by-four orthogonal transformation, when compared with the way in which the orthogonal transformation-dedicated hardware is activated to perform the eight-by-eight orthogonal transformation. This causes increased latency when the orthogonal transformation-dedicated hardware is activated.

The term "latency" as mentioned above broadly refers to a time between the moment when the DCT apparatus receives data completely to execute processing and the moment when the DCT apparatus starts to output the processed results.

More specifically, the prior art DCT apparatus is activated once when performing the eight-by-eight orthogonal transformation on an eight pixels-by-eight lines-formed block, but the prior art DCT apparatus is activated four times when practicing the four-by-four orthogonal transformation on the four pixels-by-four lines-formed four blocks.

This means that, assuming that the DCT executes the orthogonal transformation on the same quantity of data, the DCT apparatus is activated to perform the four-by-four orthogonal transformation at latency four times as great as that involved when the DCT apparatus is activated to practice the eight-by-eight orthogonal transformation. Similarly, the prior art IDCT apparatus is activated to perform the four-by-four inverse orthogonal transformation at latency four times as great as that involved when the IDCT apparatus is activated to practice the eight-by-eight inverse orthogonal transformation.

Such increased latency at the activation of the DCT and IDCT apparatuses objectionably reduces processing speeds.

OBJECTS AND SUMMARY OF THE INVENTION

In view of the above, an objective of the present invention is to provide an orthogonal transform method and an art related thereto, whereby N-by-N and N/2-by-N/2 orthogonal transformations are both practicable, and the N/2-by-N/2 orthogonal transformation can be practiced at improved processing speeds to realize high-speed processing, while inhibited hardware size thereof are achievable.

A first aspect of the present invention provides an orthogonal transform method comprising steps of: performing one of an N-by-N orthogonal transformation and an N/2-by-N/2 orthogonal transformation on data on an N-pixels-by-N-lines-formed pixel block, where N is equal to 2x (x is an exponent); in an N-by-N orthogonal transform mode, entering N-pieces of pixel data after receipt of the N-pieces of pixel data into an operation block in which an orthogonal transform operation is practiced; in an N/2-by-N/2 orthogonal transform mode, entering N/2-pieces of first pixel data and N/2 pieces of second pixel data after receipt of N-pieces of pixel data into a first operation block of the operation block and a second operation block of the operation block, respectively; in the N-by-N orthogonal transform mode, practicing the N-by-N orthogonal transformation in the operation block using the entered N-pieces of pixel data and given N-by-N orthogonal transformation-related coefficient data, thereby producing N-number of orthogonal transform coefficients; in the N/2-by-N/2 orthogonal transform mode, practicing the N/2-by-N/2 orthogonal transformation in the first operation block using the entered N/2-pieces of first pixel data and given N/2-by-N/2 orthogonal transformation-related coefficient data, thereby producing N/2-number of orthogonal transform coefficients; and in the N/2-by-N/2 orthogonal transform mode, practicing the N/2-by-N/2 orthogonal transformation in the second operation block using the entered N/2-pieces of second pixel data and the given N/2-by-N/2 orthogonal transformation-related coefficient data, thereby producing N/2-number of orthogonal transform coefficients.

This system receives the same number (N-number) of pixel data in each of the N-by-N and N/2-by-N/2 orthogonal transform modes, and enters the pixel data into the same operation block in a manner suitable for each of these two different modes.

This feature allows the N/2-by-N/2 orthogonal transformation to be executed on the N-pixels-by-N-lines-formed pixel block.

As a result, an orthogonal transform apparatus incorporating the orthogonal transform method according to the present invention therein is activated at the same number of times or rather once when performing the N-by-N orthogonal transformation on the data on the N-pixels-by-N-lines-formed pixel block and when executing the N/2-by-N/2 orthogonal transformation on the data on N/2 pixels-by-N/2-lines-formed four pixel blocks that are obtained by dividing the N-pixels-by-N-lines-formed pixel block into four parts.

Consequently, the N/2-by-N/2 orthogonal transformation can be executed at high-processing speeds.

Another feature is that the same operation block is used in both of the N-by-N and N/2-by-N/2 orthogonal transform modes, while coefficient data suitable to each of these two different modes are entered into the operation block.

In this way, the same orthogonal transform apparatus incorporating the orthogonal transform method according to the present invention therein is usable in each of the N-by-N and N/2-by-N/2 orthogonal transformation.

This feature inhibits an increase in hardware size of the orthogonal transform apparatus that embodies the orthogonal transform method according to the present invention.

A further feature is that the N-number of pixel data can be received in the same order in each of the N-by-N and N/2-by-N/2 orthogonal transform modes. As a result, easy address control is achievable.

A second aspect of the present invention provides an orthogonal transform method as defined in the first aspect of the present invention, wherein the step of producing the N-number of orthogonal transform coefficients in the N-by-N orthogonal transform mode comprises a step of performing a multiply-and accumulation (MAC) operation in an N-parallel manner in the operation block, wherein the step of producing the N/2-number of orthogonal transform coefficients in the N/2-by-N/2 orthogonal transform mode comprises a step of performing the N/2-by-N/2 orthogonal transformation on the N/2-pieces of first pixel data and the N/2-by-N/2 orthogonal transformation on the N/2-pieces of second pixel data in a two-parallel manner in the operation block, wherein the step of performing the N/2-by-N/2 orthogonal transformation on the N/2-pieces of first pixel data comprises a step of performing the MAC operation in an N/2-parallel manner in the first operation block, and wherein the step of performing the N/2-by-N/2 orthogonal transformation on the N/2-pieces of second pixel data comprises a step of performing the MAC operation in the N/2-parallel manner in the second operation block.

This system allows the N-by-N orthogonal transformation to parallel-produce the N-number of orthogonal transform coefficients in the N-by-N orthogonal transform mode.

The above system allows the N/2-by-N/2 orthogonal transformation to parallel-produce two sets of the N/2-numbers of orthogonal transform coefficients in the N/2-by-N/2 orthogonal transform mode.

As a result, the orthogonal transformation is executable in high-processing speeds.

A third aspect of the present invention provides an orthogonal transform method as defined in the first or second aspect of the present invention, further comprising steps of: in the N-by-N orthogonal transform mode, detecting a maximum value from among orthogonal transform coefficients on the N-pixels-by-N-lines-formed pixel block; and in the N/2-by-N/2 orthogonal transform mode, detecting a maximum value from among orthogonal transform coefficients for each of N/2-pixels-by-N/2-lines-formed four pixel blocks, the N/2-pixels-by-N/2-lines-formed four pixel blocks being obtained by dividing the N-pixels-by-N-lines-formed pixel block into four parts, wherein the step of detecting the maximum value in the N-by-N orthogonal transform mode comprises a step of detecting the maximum value from among the orthogonal transform coefficients on the N-pixels-by-N-lines-formed pixel block by comparison with the sequentially entered orthogonal transform coefficients, while the N-by-N orthogonal transformation is performed in the step of producing the N-number of orthogonal transform coefficients in the N-by-N orthogonal transform mode, and wherein the step of detecting the maximum value in the N/2-by-N/2 orthogonal transform mode comprises a step of detecting the maximum value from among the orthogonal transform coefficients on each of the N/2-pixels-by-N/2-lines-formed four pixel blocks by comparison with the sequentially entered orthogonal transform coefficients, while the N/2-by-N/2 orthogonal transformation is performed in the step of producing the N/2-number of orthogonal transform coefficients in the N/2-by-N/2 orthogonal transform mode.

This system detects a maximum value while executing the orthogonal transformation in the N-by-N orthogonal transform mode. This feature reduces the entire processing time, when compared with the way in which the maximum value is determined by comparison with all of the orthogonal transform coefficients on the N-pixels-by-N-lines-formed pixel block after the orthogonal transformation is executed.

The above system detects a maximum value while executing the orthogonal transformation in the N/2-by-N/2 orthogonal transform mode. This feature reduces the entire processing time, when compared with the way in which the maximum value is determined by comparison with all of the orthogonal transform coefficients on the N/2-pixels-by-N/2-lines-formed pixel block after the orthogonal transformation is executed.

Following the orthogonal transformation, a quantized value is compared, before quantization, with a maximum value from among orthogonal transform coefficients on an N-pixels-by-N-lines-formed pixel block. When the maximum value from among the orthogonal transform coefficients is smaller than the quantized value, then all of the orthogonal transform coefficients resulting from the N-by-N orthogonal transformation on the N-pixels-by-N-lines-formed pixel block can be processed to have a value equal to zero without the need for operations to quantize the orthogonal transform coefficients. As a result, inter-images can be quantized in a reduced processing time.

Following the orthogonal transformation, a quantized value is compared, before quantization, with a maximum value from among orthogonal transform coefficient for each of N/2-pixels-by-N/2-lines-formed four pixel blocks. When the maximum value from among the orthogonal transform coefficients is smaller than the quantized value, then all of the orthogonal transform coefficients resulting from the N/2-by-N/2 orthogonal transformation on the N/2-pixels-by-N/2-lines-formed pixel block can be processed to have a value equal to zero without the need for operations to quantize the orthogonal transform coefficients. As a result, inter-images can be quantized in a reduced processing time.

A fourth aspect of the present invention provides an orthogonal transform method as defined in the first or second aspect of the present invention, further comprising steps of: in the N-by-N orthogonal transform mode, detecting a maximum value from among orthogonal transform coefficients on the N-pixels-by-N-lines-formed pixel block; and in the N/2-by-N/2 orthogonal transform mode, detecting a maximum value from among orthogonal transform coefficients on the N-pixels-by-N-lines-formed pixel block, wherein the step of detecting the maximum value in the N-by-N orthogonal transform mode comprises a step of detecting the maximum value from among the orthogonal transform coefficients on the N-pixels-by-N-lines-formed pixel block by comparison with the sequentially entered orthogonal transform coefficients, while the N-by-N orthogonal transformation is performed in the step of producing the N-number of orthogonal transform coefficients in the N-by-N orthogonal transform mode, and wherein the step of detecting the maximum value in the N/2-by-N/2 orthogonal transform mode comprises a step of detecting the maximum value from among the orthogonal transform coefficients on the N-pixels-by-N-lines-formed pixel block by comparison with the sequentially entered orthogonal transform coefficients, while the N/2-by-N/2 orthogonal transformation is performed in the step of producing the N/2-number of orthogonal transform coefficients in the N/2-by-N/2 orthogonal transform mode.

This system detects a maximum value while executing the orthogonal transformation in the N-by-N orthogonal transform mode. This feature reduces the entire processing time, when compared with the way in which the maximum value is determined by comparison with all of the orthogonal transform coefficients on the N-pixels-by-N-lines-formed pixel block after the orthogonal transformation is executed.

The above system detects a maximum value while executing the orthogonal transformation in the N/2-by-N/2 orthogonal transform mode. This feature reduces the entire processing time, when compared with the way in which the maximum value is determined by comparison with all of the orthogonal transform coefficients on the N-pixels-by-N-lines-formed pixel block after the orthogonal transformation is executed.

Following the orthogonal transformation, a quantized value is compared, before quantization, with a maximum value from among orthogonal transform coefficients on an N-pixels-by-N-lines-formed pixel block. When the maximum value from among the orthogonal transform coefficients is smaller than the quantized value, then all of the orthogonal transform coefficients on the N-pixels-by-N-lines-formed pixel block can be processed to have a value equal to zero without the need for operations to quantize the orthogonal transform coefficients. As a result, inter-images can be quantized in a reduced processing time.

The above system determines a single maximum value from among the orthogonal transform coefficients on the N-pixels-by-N-lines-formed pixel block in the N/2-by-N/2 orthogonal transform mode.

This feature allows a quantized value to be compared with a maximum value at a fewer number of times than the way in which the maximum value is determined for each of N/2-pixels-by-N/2-lines-formed four pixel blocks in the N/2-by-N/2 orthogonal transform mode. As a result, the quantized value can be compared with the maximum value at high-processing speeds.

A fifth aspect of the present invention provides an orthogonal transform method as defined in the first or second aspect of the present invention, further comprising steps of: in the N-by-N orthogonal transform mode, detecting a maximum value from among AC coefficients in orthogonal transform coefficients on the N-pixels-by-N-lines-formed pixel block; and in the N/2-by-N/2 orthogonal transform mode, detecting a maximum value from among AC coefficients in orthogonal transform coefficients for each of N/2-pixels-by-N/2-lines-formed four pixel blocks, the N/2-pixels-by-N/2-lines-formed four pixel blocks being obtained by dividing the N-pixels-by-N-lines-formed pixel block into four parts, wherein the step of detecting the maximum value in the N-by-N orthogonal transform mode comprises a step of detecting the maximum value from among the AC coefficients on the N-pixels-by-N-lines-formed pixel block by comparison with the AC coefficients in the sequentially entered orthogonal transform coefficients, while the N-by-N orthogonal transformation is performed in the step of producing the N-number of orthogonal transform coefficients in the N-by-N orthogonal transform mode, and wherein the step of detecting the maximum value in the N/2-by-N/2 orthogonal transform mode comprises a step of detecting the maximum value from among the AC coefficients on the N/2-pixels-by-N/2-lines-formed pixel block by comparison with the AC coefficients in the sequentially entered orthogonal transform coefficients, while the N/2-by-N/2 orthogonal transformation is performed in the step of producing the N/2-number of orthogonal transform coefficients in the N/2-by-N/2 orthogonal transform mode.

This system detects a maximum value while executing the orthogonal transformation in the N-by-N orthogonal transform mode. This feature reduces the entire processing time, when compared with the way in which the maximum value is determined by comparison with all of the AC coefficients on the N-pixels-by-N-lines-formed pixel block after the orthogonal transformation is executed.

The above system detects a maximum value while executing the orthogonal transformation in the N/2-by-N/2 orthogonal transform mode. This feature reduces the entire processing time, when compared with the way in which the maximum value is determined by comparison with all of the AC coefficients on the N/2-pixels-by-N/2-lines-formed pixel block after the orthogonal transformation is executed.

Following the orthogonal transformation, a quantized value is compared, before quantization, with a maximum value from among AC coefficients on an N-pixels-by-N-lines-formed pixel block. When the maximum value from among the AC coefficients is smaller than the quantized value, then all of the AC coefficients resulting from the N-by-N orthogonal transformation on the N-pixels-by-N-lines-formed pixel block can be processed to have a value equal to zero without the need for operations to quantize the AC coefficients. As a result, intra-images can be quantized in a reduced processing time.

Following the orthogonal transformation, a quantized value is compared, before quantization, with a maximum value from among AC coefficients for each of N/2-pixels-by-N/2-lines-formed four pixel blocks. When the maximum value from among the AC coefficients is smaller than the quantized value, then all of the AC coefficients resulting from the N/2-by-N/2 orthogonal transformation on the N/2-pixels-by-N/2-lines-formed pixel block can be processed to have a value equal to zero without the need for operations to quantize the AC coefficients. As a result, intra-images can be quantized in a reduced processing time.

A sixth aspect of the present invention provides an orthogonal transform method as defined in the first or second aspect of the present invention, further comprising steps of: in the N-by-N orthogonal transform mode, detecting a maximum value from among AC coefficients in orthogonal transform coefficients on the N-pixels-by-N-lines-formed pixel block; and in the N/2-by-N/2 orthogonal transform mode, detecting a maximum value from among AC coefficients in orthogonal transform coefficients on the N-pixels-by-N-lines-formed pixel block, wherein the step of detecting the maximum value in the N-by-N orthogonal transform mode comprises a step of detecting the maximum value from among the AC coefficients on the N-pixels-by-N-lines-formed pixel block by comparison with the AC coefficients in the sequentially entered orthogonal transform coefficients, while the N-by-N orthogonal transformation is performed in the step of producing the N-number of orthogonal transform coefficients in the N-by-N orthogonal transform mode, and wherein the step of detecting the maximum value in the N/2-by-N/2 orthogonal transform mode comprises a step of detecting the maximum value from among the AC coefficients on the N-pixels-by-N-lines-formed pixel block by comparison with the AC coefficients in the sequentially entered orthogonal transform coefficients, while the N/2-by-N/2 orthogonal transformation is performed in the step of producing the N/2-number of orthogonal transform coefficients in the N/2-by-N/2 orthogonal transform mode.

This system detects a maximum value while executing the orthogonal transformation in the N-by-N orthogonal transform mode. This feature reduces the entire processing time, when compared with the way in which the maximum value is determined by comparison with all of the AC coefficients on the N-pixels-by-N-lines-formed pixel block after the orthogonal transformation is executed.

The above system detects a maximum value while executing the orthogonal transformation in the N/2-by-N/2 orthogonal transform mode. This feature reduces the entire processing time, when compared with the way in which the maximum value is determined by comparison with all of the AC coefficients on the N-pixels-by-N-lines-formed pixel block after the orthogonal transformation is executed.

Following the orthogonal transformation, a quantized value is compared, before quantization, with a maximum value from among AC coefficients on an N-pixels-by-N-lines-formed pixel block. When the maximum value from among the orthogonal transform coefficients is smaller than the quantized value, then all of the AC coefficients on the N-pixels-by-N-lines-formed pixel block can be processed to have a value equal to zero without the need for operations to quantize the AC coefficients. As a result, intra-images can be quantized in a reduced processing time.

The above system determines a single maximum value from among the AC coefficients on the N-pixels-by-N-lines-formed pixel block in the N/2-by-N/2 orthogonal transform mode.

This feature allows a quantized value to be compared with a maximum value at a fewer number of times than the way in which the maximum value is determined for each of the N/2-pixels-by-N/2-lines-formed four pixel blocks in the N/2-by-N/2 orthogonal transform mode. As a result, in intra-images, the quantized value is compared with the maximum value at high-processing speeds.

A seventh aspect of the present invention provides an orthogonal transform method as defined in the first or second aspect of the present invention, further comprising steps of: in the N/2-by-N/2 orthogonal transform mode, obtaining four DC coefficients on N/2-pixels-by-N/2-lines-formed four pixel blocks, while the N/2-by-N/2 orthogonal transformation is practiced in the step of producing the N/2-number of orthogonal transform coefficients in the N/2-by-N/2 orthogonal transform mode, the N/2-pixels-by-N/2-lines-formed four pixel blocks being obtained by dividing the N-pixels-by-N-lines-formed pixel block into four parts; and performing a predetermined operation on the obtained four DC coefficients, wherein the step of performing the predetermined operation on the four DC coefficients comprises a step of starting to execute the predetermined operation on the four DC coefficients when as many the DC coefficients as are able to start performing the predetermined operation are obtained.

This system starts executing the predetermined operation before producing all of the (N-by-N-number of) orthogonal transform coefficients on the N/2-pixels-by-N/2-lines-formed four pixel blocks.

This means that the predetermined operation on the DC coefficients is executed while the N/2-by-N/2 orthogonal transformation is performed.

This feature reduces the entire processing time, when compared with the way in which the four DC coefficients are searched to experience the predetermined operation after all of the (N-by-N-number of) orthogonal transform coefficients on the N/2-pixels-by-N/2-lines-formed four pixel blocks are produced. As a result, high processing is achievable.

An eighth aspect of the present invention provides an orthogonal transform method as defined in the seventh aspect of the present invention, wherein in the N/2-by-N/2 orthogonal transform mode, AC coefficients obtained by removing the four DC coefficients from N-by-N number of orthogonal transform coefficients are outputted to the outside, the N-by-N number of orthogonal transform coefficients being produced using the N/2-pixels-by-N/2-lines-formed four pixel blocks in the N/2-by-N/2 orthogonal transform mode.

This system is suitable for and effective in encoding chroma components in a next generation coding system.

A ninth aspect of the present invention provides an orthogonal transform apparatus operable to perform one of an N-by-N orthogonal transformation and an N/2-by-N/2 orthogonal transformation on data on an N-pixels-by-N-lines-formed pixel block, where N is equal to 2x (x is an exponent), comprising: an input unit operable to enter N-pieces of pixel data after receipt of the N-pieces of pixel data in an N-by-N orthogonal transform mode; the input unit operable to enter N/2-pieces of first pixel data and N/2 pieces of second pixel data after receipt of N-pieces of pixel data in an N/2-by-N/2 orthogonal transform mode; an orthogonal transform operation unit operable to, in the N-by-N orthogonal transform mode, practice an operation on the entered N-pieces of pixel data and given N-by-N orthogonal transformation-related coefficient data, thereby producing N-number of orthogonal transform coefficients; the orthogonal transform operation unit operable to, in the N/2-by-N/2 orthogonal transform mode, practice an operation on the entered N/2-pieces of first pixel data and given N/2-by-N/2 orthogonal transformation-related coefficient data, thereby producing N/2-number of orthogonal transform coefficients; and the orthogonal transform operation unit operable to, in the N/2-by-N/2 orthogonal transform mode, practice an operation on the entered N/2-pieces of second pixel data and the given N/2-by-N/2 orthogonal transformation-related coefficient data, thereby producing N/2-number of orthogonal transform coefficients.

This system receives the same number of pieces (N-piece) of pixel data in each of the N-by-N and N/2-by-N/2 orthogonal transform modes, and enters the pixel data into the same orthogonal transform operation unit in a manner suitable for each of these two different modes.

This feature allows the N/2-by-N/2 orthogonal transformation to be executed on the N-pixels-by-N-lines-formed pixel block.

As a result, the orthogonal transform apparatus is activated at the same number of times or rather once when performing the N-by-N orthogonal transformation on the data on the N-pixels-by-N-lines-formed pixel block and when executing the N/2-by-N/2 orthogonal transformation on the data on N/2 pixels-by-N/2-lines-formed four blocks that are obtained by dividing the N-pixels-by-N-lines-formed pixel block into four parts.

Consequently, the N/2-by-N/2 orthogonal transformation can be executed at high-processing speeds.

Another feature is that the same orthogonal transform operation unit is used in both of the N-by-N and N/2-by-N/2 orthogonal transform modes, while coefficient data suitable for each of these two different modes are entered into the orthogonal transform operation unit.

This means that the same orthogonal transform operation unit is usable in each of the N-by-N and N/2-by-N/2 orthogonal transformation. This feature inhibits an increase in hardware size of the orthogonal transform apparatus.

A further feature is that the input unit can receive the N-number of pixel data in the same order in each of the N-by-N and N/2-by-N/2 orthogonal transform modes.

As a result, easy address control is achievable because the input unit need not receive the N-number of pixel data in the different order for each of the N-by-N and N/2-by-N/2 orthogonal transform modes.

A tenth aspect of the present invention provides an orthogonal transform apparatus as defined in the ninth aspect of the present invention, wherein the orthogonal transform operation unit comprises: a first coefficient storage unit operable to contain the N-by-N orthogonal transformation-related coefficient data; a second coefficient storage unit operable to contain the N/2-by-N/2 orthogonal transformation-related coefficient data; and N-number of multiply-and-accumulation (MAC) operation units, each of which is operable to perform a multiply-and-accumulation (MAC) operation in the N-by-N orthogonal transform mode using the N-by-N orthogonal transformation-related coefficient data from the first coefficient storage unit, thereby producing one of the orthogonal transform coefficients, wherein, in the N/2-by-N/2 orthogonal transform mode, the input unit in receipt of the N-pieces of pixel data is operable to feed the N/2-pieces of first pixel data into each of N/2-number of first MAC operation units, while entering the N/2-pieces of second pixel data into each of N/2-number of second MAC operation units, the N-number of the MAC operation units being formed by the N/2-number of first MAC operation units and the N/2-number of second MAC operation units, wherein, in the N/2-by-N/2 orthogonal transform mode, each of the N/2-number of first MAC operation units is operable to perform the MAC operation using the entered N/2-pieces of first pixel data and the N/2-by-N/2 orthogonal transformation-related coefficient data from the second coefficient storage unit, thereby providing one of the orthogonal transform coefficients, and wherein, in the N/2-by-N/2 orthogonal transform mode, each of the N/2-number of second MAC operation units is operable to perform the MAC operation using the entered N/2-pieces of second pixel data and the N/2-by-N/2 orthogonal transformation-related coefficient data from the second coefficient storage unit, thereby providing one of the orthogonal transform coefficients.

This system uses the N-number of MAC operation units, and allows the N-by-N orthogonal transformation to parallel-produce the N-number of orthogonal transform coefficients in the N-by-N orthogonal transform mode.

The above system uses the N-number of MAC operation units in the N/2-by-N/2 orthogonal transform mode, and allows the N/2-by-N/2 orthogonal transformation to be executed in a two-parallel manner. In addition, the above system practices a multiply-and-accumulation (MAC) operation in an N/2-parallel manner for each of the N/2-by-N/2 orthogonal transformations to be executed in the two-parallel manner. As a result, the N/2-by-N/2 orthogonal transformation can parallel-produce two sets of the N/2-number of orthogonal transform coefficients.

Consequently, the orthogonal transformation is executable in high-processing speeds.

An eleventh aspect of the present invention provides an orthogonal transform apparatus as defined in the ninth or tenth aspect of the present invention, further comprising: a maximum value-detecting unit operable to, in the N-by-N orthogonal transform mode, detect a maximum value from among orthogonal transform coefficients on the N-pixels-by-N-lines-formed pixel block; and the maximum value-detecting unit operable to, in the N/2-by-N/2 orthogonal transform mode, detect a maximum value from among orthogonal transform coefficients for each of N/2-pixels-by-N/2-lines-formed four pixel blocks, the N/2-pixels-by-N/2-lines-formed four pixel blocks being obtained by dividing the N-pixels-by-N-lines-formed pixel block into four parts, wherein, in the N-by-N orthogonal transform mode, the maximum value-detecting unit is operable to detect the maximum value from among the orthogonal transform coefficients on the N-pixels-by-N-lines-formed pixel block by comparison with the sequentially entered orthogonal transform coefficients, while the orthogonal transform operation unit is operable to perform the N-by-N orthogonal transformation in the N-by-N orthogonal transform mode, and wherein, in the N/2-by-N/2 orthogonal transform mode, the maximum value-detecting unit is operable to detect the maximum value from among the orthogonal transform coefficients on the N/2-pixels-by-N/2-lines-formed pixel block by comparison with the sequentially entered orthogonal transform coefficients, while the orthogonal transform operation unit is operable to practice the N/2-by-N/2 orthogonal transformation in the N/2-by-N/2 orthogonal transform mode.

This system detects a maximum value while executing the orthogonal transformation in the N-by-N orthogonal transform mode. This feature reduces the entire processing time, when compared with the way in which the maximum value is determined by comparison with all of the orthogonal transform coefficients on the N-pixels-by-N-lines-formed pixel block after the orthogonal transformation is executed.

The above system detects a maximum value while executing the orthogonal transformation in the N/2-by-N/2 orthogonal transform mode. This feature reduces the entire processing time, when compared with the way in which the maximum value is determined by comparison with all of the orthogonal transform coefficients on the N/2-pixels-by-N/2-lines-formed pixel block after the orthogonal transformation is executed.

Following the orthogonal transformation, a quantized value is compared, before quantization, with a maximum value from among orthogonal transform coefficients on an N-pixels-by-N-lines-formed pixel block. When the maximum value from among the orthogonal transform coefficients is smaller than the quantized value, then all of the orthogonal transform coefficients resulting from the N-by-N orthogonal transformation on the N-pixels-by-N-lines-formed pixel block can be processed to have a value equal to zero without the need for operations to quantize the orthogonal transform coefficients. As a result, inter-images can be quantized in a reduced processing time.

Following the orthogonal transformation, a quantized value is compared, before quantization, with a maximum value from among orthogonal transform coefficient for each of N/2-pixels-by-N/2-lines-formed four pixel blocks. When the maximum value from among the orthogonal transform coefficients is smaller than the quantized value, then all of the orthogonal transform coefficients resulting from the N/2-by-N/2 orthogonal transformation on the N/2-pixels-by-N/2-lines-formed pixel block can be processed to have a value equal to zero without the need for operations to quantize the orthogonal transform coefficients. As a result, inter-images can be quantized in a reduced processing time.

A twelfth aspect of the present invention provides an orthogonal transform apparatus as defined in the ninth or tenth aspect of the present invention, further comprising: a maximum value-detecting unit operable to, in the N-by-N orthogonal transform mode, detect a maximum value from among orthogonal transform coefficients on the N-pixels-by-N-lines-formed pixel block; and the maximum value-detecting unit operable to, in the N/2-by-N/2 orthogonal transform mode, detect a maximum value from among orthogonal transform coefficients on the N-pixels-by-N-lines-formed pixel block, wherein, in the N-by-N orthogonal transform mode, the maximum value-detecting unit is operable to detect the maximum value from among the orthogonal transform coefficients on the N-pixels-by-N-lines-formed pixel block by comparison with the sequentially entered orthogonal transform coefficients, while the orthogonal transform operation unit is operable to perform the N-by-N orthogonal transformation in the N-by-N orthogonal transform mode, and wherein, in the N/2-by-N/2 orthogonal transform mode, the maximum value-detecting unit is operable to detect the maximum value from among the orthogonal transform coefficients on the N-pixels-by-N-lines-formed pixel block by comparison with the sequentially entered orthogonal transform coefficients, while the orthogonal transform operation unit is operable to practice the N/2-by-N/2 orthogonal transformation in the N/2-by-N/2 orthogonal transform mode.

This system detects a maximum value while executing the orthogonal transformation in the N-by-N orthogonal transform mode. This feature reduces the entire processing time, when compared with the way in which the maximum value is determined by comparison with all of the orthogonal transform coefficients on the N-pixels-by-N-lines-formed pixel block after the orthogonal transformation is executed.

The above system detects a maximum value while executing the orthogonal transformation in the N/2-by-N/2 orthogonal transform mode. This feature reduces the entire processing time, when compared with the way in which the maximum value is determined by comparison with all of the orthogonal transform coefficients on the N-pixels-by-N-lines-formed pixel block after the orthogonal transformation is executed.

Following the orthogonal transformation, a quantized value is compared, before quantization, with a maximum value from among orthogonal transform coefficients on an N-pixels-by-N-lines-formed pixel block. When the maximum value from among the orthogonal transform coefficients is smaller than the quantized value, then all of the orthogonal transform coefficients on the N-pixels-by-N-lines-formed pixel block can be processed to have a value equal to zero without the need for operations to quantize the orthogonal transform coefficients. As a result, inter-images can be quantized in a reduced processing time.

The above system determines a single maximum value from among the orthogonal transform coefficients on the N-pixels-by-N-lines-formed pixel block in the N/2-by-N/2 orthogonal transform mode.

This feature allows a quantized value to be compared with a maximum value at a fewer number of times than the way in which the maximum value is determined for each of N/2-pixels-by-N/2-lines-formed four pixel blocks in the N/2-by-N/2 orthogonal transform mode. As a result, the quantized value is compared with the maximum value at high-processing speeds.

A thirteenth aspect of the present invention provides an orthogonal transform apparatus as defined in the ninth or tenth aspect of the present invention, further comprising: a maximum value-detecting unit operable to, in the N-by-N orthogonal transform mode, detect a maximum value from among AC coefficients in orthogonal transform coefficients on the N-pixels-by-N-lines-formed pixel block; and the maximum value-detecting unit operable to, in the N/2-by-N/2 orthogonal transform mode, detect a maximum value from among AC coefficients in orthogonal transform coefficients for each of N/2-pixels-by-N/2-lines-formed four pixel blocks, the N/2-pixels-by-N/2-lines-formed four pixel blocks being obtained by dividing the N-pixels-by-N-lines-formed pixel block into four parts, wherein, in the N-by-N orthogonal transform mode, the maximum value-detecting unit is operable to detect the maximum value from among the AC coefficients on the N-pixels-by-N-lines-formed pixel block by comparison with the AC coefficients in the sequentially entered orthogonal transform coefficients, while the orthogonal transform operation unit is operable to practice the N-by-N orthogonal transformation in the N-by-N orthogonal transform mode, and wherein, in the N/2-by-N/2 orthogonal transform mode, the maximum value-detecting unit is operable to detect the maximum value from among the AC coefficients in the orthogonal transform coefficients on the N/2-pixels-by-N/2-lines-formed pixel block by comparison with the AC coefficients in the sequentially entered orthogonal transform coefficients, while the orthogonal transform operation unit is operable to practice the N/2-by-N/2 orthogonal transformation in the N/2-by-N/2 orthogonal transform mode.

This system detects a maximum value while executing the orthogonal transformation in the N-by-N orthogonal transform mode. This feature reduces the entire processing time, when compared with the way in which the maximum value is determined by comparison with all of the AC coefficients on the N-pixels-by-N-lines-formed pixel block after the orthogonal transformation is executed.

The above system detects a maximum value while executing the orthogonal transformation in the N/2-by-N/2 orthogonal transform mode. This feature reduces the entire processing time, when compared with the way in which the maximum value is determined by comparison with all of the AC coefficients on the N/2-pixels-by-N/2-lines-formed pixel block after the orthogonal transformation is executed.

Following the orthogonal transformation, a quantized value is compared, before quantization, with a maximum value from among AC coefficients on an N-pixels-by-N-lines-formed pixel block. When the maximum value from among the AC coefficients is smaller than the quantized value, then all of the AC coefficients resulting from the N-by-N orthogonal transformation on the N-pixels-by-N-lines-formed pixel block can be processed to have a value equal to zero without the need for operations to quantize the AC coefficients. As a result, intra-images can be quantized in a reduced processing time.

Following the orthogonal transformation, a quantized value is compared, before quantization, with a maximum value from among AC coefficients for each of N/2-pixels-by-N/2-lines-formed four pixel blocks. When the maximum value from among the AC coefficients is smaller than the quantized value, then all of the AC coefficients resulting from the N/2-by-N/2 orthogonal transformation on the N/2-pixels-by-N/2-lines-formed pixel block can be processed to have a value equal to zero without the need for operations to quantize the AC coefficients. As a result, intra-images can be quantized in a reduced processing time.

A fourteenth aspect of the present invention provides an orthogonal transform apparatus as defined in the ninth or tenth aspect of the present invention, further comprising: a maximum value-detecting unit operable to, in the N-by-N orthogonal transform mode, detect a maximum value from among AC coefficients in orthogonal transform coefficients on the N-pixels-by-N-lines-formed pixel block; and the maximum value-detecting unit operable to, in the N/2-by-N/2 orthogonal transform mode, detect a maximum value from among AC coefficients in orthogonal transform coefficients on the N-pixels-by-N-lines-formed pixel block, wherein, in the N-by-N orthogonal transform mode, the maximum value-detecting unit is operable to detect the maximum value from among the AC coefficients on the N-pixels-by-N-lines-formed pixel block by comparison with the AC coefficients in the sequentially entered orthogonal transform coefficients, while the orthogonal transform operation unit is operable to perform the N-by-N orthogonal transformation in the N-by-N orthogonal transform mode, and wherein, in the N/2-by-N/2 orthogonal transform mode, the maximum value-detecting unit is operable to detect the maximum value from among the AC coefficients on the N-pixels-by-N-lines-formed pixel block by comparison with the AC coefficients in the sequentially entered orthogonal transform coefficients, while the orthogonal transform operation unit is operable to execute the N/2-by-N/2 orthogonal transformation in the N/2-by-N/2 orthogonal transform mode.

This system detects a maximum value while executing the orthogonal transformation in the N-by-N orthogonal transform mode. This feature reduces the entire processing time, when compared with the way in which the maximum value is determined by comparison with all of the AC coefficients on the N-pixels-by-N-lines-formed pixel block after the orthogonal transformation is executed.

The above system detects a maximum value while executing the orthogonal transformation in the N/2-by-N/2 orthogonal transform mode. This feature reduces the entire processing time, when compared with the way in which the maximum value is determined by comparison with all of the AC coefficients on the N-pixels-by-N-lines-formed pixel block after the orthogonal transformation is executed.

Following the orthogonal transformation, a quantized value is compared, before quantization, with a maximum value from among AC coefficients on an N-pixels-by-N-lines-formed pixel block. When the maximum value from among the orthogonal transform coefficients is smaller than the quantized value, then all of the AC coefficients on the N-pixels-by-N-lines-formed pixel block can be processed to have a value equal to zero without the need for operations to quantize the AC coefficients. As a result, intra-images can be quantized in a reduced processing time.

The above system determines a single maximum value from among the AC coefficients on the N-pixels-by-N-lines-formed pixel block in the N/2-by-N/2 orthogonal transform mode.

This feature allows a quantized value to be compared with a maximum value at a fewer number of times than the way in which the maximum value is determined for each of the N/2-pixels-by-N/2-lines-formed four pixel blocks in the N/2-by-N/2 orthogonal transform mode. As a result, in intra-images, the quantized value is compared with the maximum value at high-processing speeds.

A fifteenth aspect of the present invention provides an orthogonal transform apparatus as defined in the ninth or tenth aspect of the present invention, further comprising: a DC coefficient operation unit operable to, in the N/2-by-N/2 orthogonal transform mode, obtain four DC coefficients on N/2-pixels-by-N/2-lines-formed four pixel blocks, while the orthogonal transform operation unit is operable to execute the N/2-by-N/2 orthogonal transformation in the N/2-by-N/2 orthogonal transform mode, the N/2-pixels-by-N/2-lines-formed four pixel blocks being obtained by dividing the N-pixels-by-N-lines-formed pixel block into four parts; and the DC coefficient operation unit operable to perform a predetermined operation on the obtained four DC coefficients, wherein the DC coefficient operation unit is operable to start executing the predetermined operation when obtaining as many the DC coefficients as are able to start performing the predetermined operation.

This system starts executing the predetermined operation before producing all of the (N-by-N-number of) orthogonal transform coefficients on the N/2-pixels-by-N/2-lines-formed four pixel blocks.

This means that the predetermined operation on the DC coefficients is executed while the N/2-by-N/2 orthogonal transformation is performed.

This feature reduces the entire processing time, when compared with the way in which the four DC coefficients are searched to experience the predetermined operation after all of the (N-by-N-number of) orthogonal transform coefficients on the N/2-pixels-by-N/2-lines-formed four pixel blocks are produced. As a result, high processing is achievable.

A sixteenth aspect of the present invention provides an orthogonal transform apparatus as defined in the fifteenth aspect of the present invention, wherein in the N/2-by-N/2 orthogonal transform mode, AC coefficients obtained by removing the four DC coefficients from N-by-N number of orthogonal transform coefficients are outputted to the outside, the N-by-N number of orthogonal transform coefficients being produced using the N/2-pixels-by-N/2-lines-formed four pixel blocks in the N/2-by-N/2 orthogonal transform mode.

This system is suitable for and effective in encoding chroma components in a next generation coding system.

A seventeenth aspect of the present invention provides an encoding method comprising steps of: encoding data on an N-pixels-by-N-lines-formed pixel block, where N is equal to 2x (x is an exponent); in an N-by-N orthogonal transform mode, entering N-pieces of pixel data after receipt of the N-pieces of pixel data into an operation block in which an orthogonal transform operation is practiced; in an N/2-by-N/2 orthogonal transform mode, entering N/2-pieces of first pixel data and N/2-pieces of second pixel data after receipt of N-pieces of pixel data into a first operation block of the operation block and a second operation block of the operation block, respectively; in the N-by-N orthogonal transform mode, practicing an N-by-N orthogonal transformation in the operation block using the entered N-pieces of pixel data and given N-by-N orthogonal transformation-related coefficient data, thereby producing N-number of orthogonal transform coefficients; in the N/2-by-N/2 orthogonal transform mode, practicing an N/2-by-N/2 orthogonal transformation in the first operation block using the entered N/2-pieces of first pixel data and given N/2-by-N/2 orthogonal transformation-related coefficient data, thereby producing N/2-number of orthogonal transform coefficients; in the N/2-by-N/2 orthogonal transform mode, practicing the N/2-by-N/2 orthogonal transformation in the second operation block using the entered N/2-pieces of second pixel data and the given N/2-by-N/2 orthogonal transformation-related coefficient data, thereby producing N/2-number of orthogonal transform coefficients; quantizing the produced orthogonal transform coefficients, thereby producing quantized data; and performing variable length encoding of the quantized data, thereby producing encoded data.

This system receives the same number of pieces (N-pieces) of pixel data in each of the N-by-N and N/2-by-N/2 orthogonal transform modes in the step of entering the pixel data, and enters the pixel data into the same operation block in a manner suitable for each of these two different modes.

This feature allows the N/2-by-N/2 orthogonal transformation to be executed on the N-pixels-by-N-lines-formed pixel block.

As a result, an orthogonal transform unit in an encoding apparatus that incorporates the encoding method according to the present invention therein is activated at the same number of times or rather once when performing the N-by-N orthogonal transformation on the data on the N-pixels-by-N-lines-formed pixel block and when executing the N/2-by-N/2 orthogonal transformation on the data on N/2 pixels-by-N/2-lines-formed four pixel blocks that are obtained by dividing the N-pixels-by-N-lines-formed pixel block into four parts.

Consequently, the N/2-by-N/2 orthogonal transformation can be executed at high-processing speeds. The encoding apparatus incorporating the encoding method according to the present invention therein provides high-speed processing.

Another feature is that the same operation block is used in both of the N-by-N and N/2-by-N/2 orthogonal transform modes in the step of producing the orthogonal transform coefficients, while coefficient data suitable for each of these two different modes are entered into the operation block.

In this way, the use of the encoding method according to the present invention allows the same orthogonal transform unit in the encoding apparatus that incorporates the encoding method according to the present invention therein to be used in each of the N-by-N and N/2-by-N/2 orthogonal transformations.

As a result, the use of the encoding method according to the present invention inhibits an increase in hardware size of the orthogonal transform unit, and accordingly inhibits an increase in hardware size of the encoding apparatus that embodies the encoding method according to the present invention.

A further feature is that, in the step of entering the pixel data, the N-pieces of pixel data can be received in the same order in each of the N-by-N and N/2-by-N/2 orthogonal transform modes. As a result, easy address control is achievable.

An eighteenth aspect of the present invention provides an encoding apparatus comprising: an orthogonal transform unit operable to orthogonally transform data on an N-pixels-by-N-lines-formed pixel block, where N is equal to 2x (x is an exponent), thereby producing orthogonal transform coefficient data; a quantizing unit operable to quantize the produced orthogonal transform coefficient data, thereby producing quantized data; and a variable length encoding unit operable to perform variable length encoding of the quantized data, thereby producing encoded data, wherein the orthogonal transform unit comprises: an input unit operable to enter N-pieces of pixel data after receipt of the N-pieces of pixel data in an N-by-N orthogonal transform mode; the input unit operable to enter N/2-pieces of first pixel data and N/2 pieces of second pixel data after receipt of N-pieces of pixel data in an N/2-by-N/2 orthogonal transform mode; an orthogonal transform operation unit operable to, in the N-by-N orthogonal transform mode, practice an operation on the entered N-pieces of pixel data and given N-by-N orthogonal transformation-related coefficient data, thereby producing N-pieces of orthogonal transform coefficient data; the orthogonal transform operation unit operable to, in the N/2-by-N/2 orthogonal transform mode, practice an operation on the entered N/2-pieces of first pixel data and given N/2-by-N/2 orthogonal transformation-related coefficient data, thereby producing N/2-pieces of orthogonal transform coefficient data; and the orthogonal transform operation operable to, in the N/2-by-N/2 orthogonal transform mode, practice an operation on the entered N/2-pieces of second pixel data and the given N/2-by-N/2 orthogonal transformation-related coefficient data, thereby producing N/2-pieces of orthogonal transform coefficient data.

This system allows the input unit to receive the same number of pieces (N-pieces) of pixel data in each of the N-by-N and N/2-by-N/2 orthogonal transform modes, and to enter the pixel data into the same orthogonal transform operation unit in a manner suitable for each of these two different modes.

This feature allows the N/2-by-N/2 orthogonal transformation to be executed on the N-pixels-by-N-lines-formed pixel block.

As a result, the orthogonal transform unit is activated at the same number of times or rather once when performing the N-by-N orthogonal transformation on the data on the N-pixels-by-N-lines-formed pixel block and when executing the N/2-by-N/2 orthogonal transformation on the data on N/2 pixels-by-N/2-lines-formed four pixel blocks that are obtained by dividing the N-pixels-by-N-lines-formed pixel block into four parts.

Consequently, the N/2-by-N/2 orthogonal transformation can be executed at high-processing speeds, and the encoding apparatus according to the present invention provides high-speed processing.

Another feature is that the same orthogonal transform operation unit is used in both of the N-by-N and N/2-by-N/2 orthogonal transform modes, while coefficient data suitable for each of these two different modes are entered into the orthogonal transform operation unit.

This means that the same orthogonal transform operation unit is usable in each of the N-by-N and N/2-by-N/2 orthogonal transformations.

This feature inhibits an increase in hardware size of the orthogonal transform unit, and consequently inhibits an increase in hardware size of the encoding apparatus according to the present invention.

A further feature is that the input unit can receive the N-pieces of pixel data in the same order in each of the N-by-N and N/2-by-N/2 orthogonal transform modes.

As a result, easy address control is achievable because the input unit need not receive the N-pieces of pixel data in the different order for each of the N-by-N and N/2-by-N/2 orthogonal transform modes.

A nineteenth aspect of the present invention provides an inverse orthogonal transform method comprising steps of: performing one of an N-by-N inverse orthogonal transformation and an N/2-by-N/2 inverse orthogonal transformation on orthogonal transform coefficient data on an N-pixels-by-N-lines-formed block, where N is equal to 2x (x is an exponent); in an N-by-N inverse orthogonal transform mode, entering N-number-of-pixels-based orthogonal transform coefficient data after receipt of the N-number-of-pixels-based orthogonal transform coefficient data into an operation block in which an inverse orthogonal transform operation is practiced; in an N/2-by-N/2 inverse orthogonal transform mode, entering N/2-number-of-first pixels-based orthogonal transform coefficient data and N/2-number-of-second pixels-based orthogonal transform coefficient data after receipt of N-number-of-pixels-based orthogonal transform coefficient data into a first operation block of the operation block and a second operation block of the operation block, respectively; in the N-by-N inverse orthogonal transform mode, practicing the N-by-N inverse orthogonal transformation in the operation block using the entered N-number-of-pixels-based orthogonal transform coefficient data and given N-by-N inverse orthogonal transformation-related coefficient data, thereby producing N-pieces of pixel data; in the N/2-by-N/2 orthogonal transform mode, practicing the N/2-by-N/2 inverse orthogonal transformation in the first operation block using the entered N/2-number-of-first pixels-based orthogonal transform coefficient data and given N/2-by-N/2 inverse orthogonal transformation-related coefficient data, thereby producing N/2-pieces of pixel data; and in the N/2-by-N/2 orthogonal transform mode, practicing the N/2-by-N/2 inverse orthogonal transformation in the second operation block using the entered N/2-number-of-second pixels-based orthogonal transform coefficient data and the given N/2-by-N/2 inverse orthogonal transformation-related coefficient data, thereby producing N/2-pieces of pixel data.

This system receives the same number (N-number)-of-pixels-based orthogonal transform coefficient data in each of the N-by-N and N/2-by-N/2 inverse orthogonal transform modes, and enters the orthogonal transform coefficient data into the same operation block in a manner suitable for each of these two different modes.

This feature allows the N/2-by-N/2 inverse orthogonal transformation to be executed on the N-pixels-by-N-lines-formed block.

As a result, an inverse orthogonal transform apparatus incorporating the inverse orthogonal transform method according to the present invention therein is activated at the same number of times or rather once when performing the N-by-N inverse orthogonal transformation on the orthogonal transform coefficient data on the N-pixels-by-N-lines-formed block and when executing the N/2-by-N/2 inverse orthogonal transformation on the orthogonal transform coefficient data on N/2-pixels-by-N/2-lines-formed four blocks that are obtained by dividing the N-pixels-by-N-lines-formed block into four parts.

Consequently, the N/2-by-N/2 inverse orthogonal transformation can be executed at high-processing speeds.

Another feature is that the same operation block is used in both of the N-by-N and N/2-by-N/2 inverse orthogonal transform modes, while coefficient data suitable for each of these two different modes are entered into the operation block.

In this way, the same inverse orthogonal transform apparatus incorporating the inverse orthogonal transform method according to the present invention therein is usable for each of the N-by-N and N/2-by-N/2 inverse orthogonal transformation.

This feature inhibits an increase in hardware size of the inverse orthogonal transform apparatus that incorporates the inverse orthogonal transform method according to the present invention therein.

A further feature is that, in the step of entering the orthogonal transform coefficient data, the N-number-of-pixels-based orthogonal transform coefficient data can be received in the same order in each of the N-by-N and N/2-by-N/2 inverse orthogonal transform modes. As a result, easy address control is realized.

A twentieth aspect of the present invention provides an inverse orthogonal transform method as defined in the nineteenth aspect of the present invention, wherein the step of producing the N-pieces of pixel data in the N-by-N inverse orthogonal transform mode comprises a step of performing a multiply-and accumulation (MAC) operation in an N-parallel manner in the operation block, wherein the step of producing the N/2-pieces of pixel data in the N/2-by-N/2 inverse orthogonal transform mode comprises a step of performing the N/2-by-N/2 inverse orthogonal transformation on the N/2-number-of-first pixels-based orthogonal transform coefficient data and the N/2-by-N/2 inverse orthogonal transformation on the N/2-number-of-second pixels-based orthogonal transform coefficient data in a two-parallel manner in the operation block, wherein the step of performing the N/2-by-N/2 inverse orthogonal transformation on the N/2-number-of-first pixels-based orthogonal transform coefficient data comprises a step of performing the MAC operation in an N/2-parallel manner in the first operation block, and wherein the step of performing the N/2-by-N/2 inverse orthogonal transformation on the N/2-number-of-second pixels-based orthogonal transform coefficient data comprises a step of performing the MAC operation in the N/2-parallel manner in the second operation block.

This system allows the N-by-N inverse orthogonal transformation to parallel-produce the N-pieces of pixel data in the N-by-N inverse orthogonal transform mode.

The above system allows the N/2-by-N/2 inverse orthogonal transformation to parallel-produce two sets of the N/2-pieces of pixel data in the N/2-by-N/2 inverse orthogonal transform mode.

As a result, the inverse orthogonal transformation is executable in high-processing speeds.

A twenty-first aspect of the present invention provides an inverse orthogonal transform method as defined in the nineteenth or twentieth aspect of the present invention, further comprising a step of: in the N/2-by-N/2 inverse orthogonal transform mode, obtaining original data of four DC coefficients on N/2-pixels-by-N/2-lines-formed four blocks, the N/2-pixels-by-N/2-lines-formed four blocks being obtained by dividing the N-pixels-by-N-lines-formed block into four parts, and performing a predetermined operation on the obtained original data, thereby providing the four DC coefficients, wherein since data received through the step of entering the orthogonal transform coefficient data in the N/2-by-N/2 inverse orthogonal transform mode contains no DC coefficient, the step of entering the orthogonal transform coefficient data in the N/2-by-N/2 inverse orthogonal transform mode comprises a step of entering the DC coefficients obtained through the step of providing the four DC coefficients into the operation block when the DC coefficients must be entered into the operation block, and wherein the step of providing the four DC coefficients comprises a step of starting to execute the predetermined operation before data acceptance to enter the received data into the operation block is completed in the step of entering the orthogonal transform coefficient data in the N/2-by-N/2 inverse orthogonal transform mode.

This system starts executing the predetermined operation before data acceptance to enter the received data into the operation block is completed in the step of entering the orthogonal transform coefficient data. This feature reduces the entire processing time, when compared with steps of practicing the predetermined operation after the data acceptance is completed in the step of entering the orthogonal transform coefficient data, writing or inserting the DC coefficients into the data at the positions of the DC coefficients after all of the four DC coefficients are obtained, and thereafter starting to execute an N/2-by-N/2 inverse orthogonal transform operation. As a result, high processing is realized.

According to the above system, the orthogonal transform coefficient data received through the step of entering the orthogonal transform coefficient data in the N/2-by-N/2 inverse orthogonal transform mode contains no DC coefficients, but contains only AC coefficients. This feature is suitable for and effective in decoding chroma components in a next generation coding system.

A twenty-second aspect of the present invention provides an inverse orthogonal transform apparatus operable to perform one of an N-by-N inverse orthogonal transformation and an N/2-by-N/2 inverse orthogonal transformation on orthogonal transform coefficient data on an N-pixels-by-N-lines-formed block, where N is equal to 2x (x is an exponent), comprising: an input unit operable to, in an N-by-N inverse orthogonal transform mode, enter N-number-of-pixels-based orthogonal transform coefficient data after receipt of the N-number-of-pixels-based orthogonal transform coefficient data; the input unit operable to, in an N/2-by-N/2 inverse orthogonal transform mode, enter N/2-number-of-first pixels-based orthogonal transform coefficient data and N/2 number-of-second pixels-based orthogonal transform coefficient data after receipt of N-number-of-pixels-based orthogonal transform coefficient data; an inverse orthogonal transform operation unit operable to, in the N-by-N inverse orthogonal transform mode, practice an operation on the entered N-number-of-pixels-based orthogonal transform coefficient data and given N-by-N inverse orthogonal transformation-related coefficient data, thereby producing N-pieces of pixel data; the inverse orthogonal transform operation unit operable to, in the N/2-by-N/2 inverse orthogonal transform mode, practice an operation on the entered N/2-number-of-first pixels-based orthogonal transform coefficient data and given N/2-by-N/2 inverse orthogonal transformation-related coefficient data, thereby producing N/2-pieces of pixel data; and the inverse orthogonal transform operation unit operable to, in the N/2-by-N/2 inverse orthogonal transform mode, practice an operation on the entered N/2-number-of-second pixels-based orthogonal transform coefficient data and the given N/2-by-N/2 inverse orthogonal transformation-related coefficient data, thereby producing N/2-pieces of pixel data.

This system receives the same number (N-number)-of-pixels-based orthogonal transform coefficient data in each of the N-by-N and N/2-by-N/2 inverse orthogonal transform modes, and enters the orthogonal transform coefficient data into the same inverse orthogonal transform operation unit in a manner suitable for each of these two different modes.

This feature allows the N/2-by-N/2 inverse orthogonal transformation to be executed on the N-pixels-by-N-lines-formed block.

As a result, the inverse orthogonal transform apparatus is activated at the same number of times or rather once when performing the N-by-N inverse orthogonal transformation on orthogonal transform coefficient data on the N-pixels-by-N-lines-formed block and when executing the N/2-by-N/2 inverse orthogonal transformation on orthogonal transform coefficient data on N/2 pixels-by-N/2-lines-formed four blocks that are obtained by dividing the N-pixels-by-N-lines-formed block into four parts.

Consequently, the N/2-by-N/2 inverse orthogonal transformation can be executed at high-processing speeds.

Another feature is that the same inverse orthogonal transform operation unit is used in both of the N-by-N and N/2-by-N/2 inverse orthogonal transform modes, while coefficient data suitable for each of these two different modes are entered into the inverse orthogonal transform operation unit.

This means that the same inverse orthogonal transform operation unit is usable in each of the N-by-N and N/2-by-N/2 inverse orthogonal transformation. This feature inhibits an increase in hardware size of the inverse orthogonal transform apparatus.

A further feature is that the input unit can receive the N-number-of-pixels-based orthogonal transform coefficient data in the same order in each of the N-by-N and N/2-by-N/2 inverse orthogonal transform modes.

As a result, easy address control is achievable because the input unit need not receive the data in the different order for each of the N-by-N and N/2-by-N/2 inverse orthogonal transform modes.

A twenty-third aspect of the present invention provides an inverse orthogonal transform apparatus as defined in the twenty-second aspect of the present invention, wherein the inverse orthogonal transform operation unit comprises: a first coefficient storage unit operable to contain the N-by-N inverse orthogonal transformation-related coefficient data; a second coefficient storage unit operable to contain the N/2-by-N/2 inverse orthogonal transformation-related coefficient data; and N-number of multiply-and-accumulation (MAC) operation units, each of which is operable to perform a multiply-and-accumulation (MAC) operation in the N-by-N inverse orthogonal transform mode using the N-by-N inverse orthogonal transformation-related coefficient data from the first coefficient storage unit, thereby producing a piece of the pixel data, wherein, in the N/2-by-N/2 inverse orthogonal transform mode, the input unit in receipt of the N-number-of-pixels-based orthogonal transform coefficient data is operable to feed the N/2-number-of-first pixels-based orthogonal transform coefficient data into each of N/2-number of first MAC operation units, while entering the N/2-number-of-second pixels-based orthogonal transform coefficient data into each of N/2-number of second MAC operation units, the N-number of the MAC operation units being formed by the N/2-number of first MAC operation units and the N/2-number of second MAC operation units, wherein, in the N/2-by-N/2 inverse orthogonal transform mode, each of the N/2-number of first MAC operation units is operable to perform the, MAC operation using the entered N/2-number-of-first pixels-based orthogonal transform coefficient data and the N/2-by-N/2 inverse orthogonal transformation-related coefficient data from the second coefficient storage unit, thereby providing a piece of the pixel data, and wherein, in the N/2-by-N/2 inverse orthogonal transform mode, each of the N/2-number of second MAC operation units is operable to perform the MAC operation using the entered N/2-number-of-second pixels-based orthogonal transform coefficient data and the N/2-by-N/2 inverse orthogonal transformation-related coefficient data from the second coefficient storage unit, thereby providing a piece of the pixel data.

This system uses the N-number of MAC operation units, and allows the N-by-N inverse orthogonal transformation to parallel-produce the N-pieces of pixel data in the N-by-N inverse orthogonal transform mode.

The above system uses the N-number of MAC operation units in the N/2-by-N/2 inverse orthogonal transform mode, and allows the N/2-by-N/2 inverse orthogonal transformation to be executed in a two-parallel manner. In addition, the above system practices a multiply-and-accumulation (MAC) operation in an N/2-parallel manner for each of the N/2-by-N/2 inverse orthogonal transformations to be executed in the two-parallel manner. As a result, the N/2-by-N/2 inverse orthogonal transformation can parallel-produce two sets of the N/2-piceses of pixel data.

Consequently, the inverse orthogonal transformation is executable in high-processing speeds.

A twenty-fourth aspect of the present invention provides an inverse orthogonal transform apparatus as defined in twenty-second or twenty-third aspect of the present invention, further comprising: a DC coefficient operation unit operable to obtain original data of four DC coefficients on N/2-pixels-by-N/2-lines-formed four blocks in the N/2-by-N/2 inverse orthogonal transform mode, the N/2-pixels-by-N/2-lines-formed four blocks being obtained by dividing the N-pixels-by-N-lines-formed block into four parts, and to perform a predetermined operation on the obtained original data, thereby providing the four DC coefficients, wherein since data received by the input unit in the N/2-by-N/2 inverse orthogonal transform mode contains no DC coefficient, the input unit feeds the DC coefficients provided by the DC coefficient operation unit into the inverse orthogonal transform operation unit when the input unit must enter the DC coefficients into the inverse orthogonal transform operation unit in the N/2-by-N/2 inverse orthogonal transform mode, and wherein the DC coefficient operation unit starts executing the predetermined operation before the input unit completes data acceptance to enter the received data into the operation block.

This system allows the DC coefficient operation unit to start executing the predetermined operation before the input unit completes data acceptance to enter the received data into the operation block. This feature reduces the entire processing time, when compared with the way in which the DC coefficient operation unit starts executing the predetermined operation after the input unit completes the data acceptance, the input unit writes or inserts the DC coefficients into the data at the positions of the DC coefficients after obtaining all of the four DC coefficients, and thereafter an N/2-by-N/2 inverse orthogonal transform operation is performed. As a result, high processing is realized.

According to the above system, the orthogonal transform coefficient data received by the input unit in the N/2-by-N/2 inverse orthogonal transform mode contains no DC coefficients, but contains only AC coefficients. This feature is suitable for and effective in decoding chroma components in a next generation coding system.

A twenty-fifth aspect of the present invention provides a decoding method comprising steps of: decoding data on an N-pixels-by-N-lines-formed block, where N is equal to 2x (x is an exponent); performing variable length decoding of encoded data, thereby producing quantized data; inversely quantizing the quantized data, thereby producing orthogonal transform coefficient data; in an N-by-N inverse orthogonal transform mode, entering N-number-of-pixels-based orthogonal transform coefficient data after receipt of the N-number-of-pixels-based orthogonal transform coefficient data into an operation block in which an inverse orthogonal transform operation is practiced; in an N/2-by-N/2 inverse orthogonal transform mode, entering N/2-number-of-first pixels-based orthogonal transform coefficient data and N/2-number-of-second pixels-based orthogonal transform coefficient data after receipt of N-number-of-pixels-based orthogonal transform coefficient data into a first operation block of the operation block and a second operation block of the operation block, respectively; in the N-by-N inverse orthogonal transform mode, practicing an N-by-N inverse orthogonal transformation in the operation block using the entered N-number-of-pixels-based orthogonal transform coefficient data and given N-by-N inverse orthogonal transformation-related coefficient data, thereby producing N-pieces of pixel data; in the N/2-by-N/2 inverse orthogonal transform mode, practicing an N/2-by-N/2 inverse orthogonal transformation in the first operation block using the entered N/2-number-of-first pixels-based orthogonal transform coefficient data and given N/2-by-N/2 inverse orthogonal transformation-related coefficient data, thereby producing N/2-pieces of pixel data; and in the N/2-by-N/2 inverse orthogonal transform mode, practicing the N/2-by-N/2 inverse orthogonal transformation in the second operation block using the entered N/2-number-of-second pixels-based orthogonal transform coefficient data and the given N/2-by-N/2 inverse orthogonal transformation-related coefficient data, thereby producing N/2-pieces of pixel data.

This system receives the same number (N-number)-of-pixels-based orthogonal transform coefficient data in each of the N-by-N and N/2-by-N/2 inverse orthogonal transform modes, and enters the orthogonal transform coefficient data into the same operation block in a manner suitable for each of these two different modes.

This feature allows the N/2-by-N/2 inverse orthogonal transformation to be executed on the N-pixels-by-N-lines-formed block.

As a result, an inverse orthogonal transform unit in an decoding apparatus that incorporates the decoding method according to the present invention therein is activated at the same number of times or rather once when performing the N-by-N inverse orthogonal transformation on the orthogonal transform coefficient data on the N-pixels-by-N-lines-formed block and when executing the N/2-by-N/2 inverse orthogonal transformation on the orthogonal transform coefficient data on N/2-pixels-by-N/2-lines-formed four blocks that are obtained by dividing the N-pixels-by-N-lines-formed block into four parts.

Consequently, the N/2-by-N/2 inverse orthogonal transformation can be executed at high-processing speeds. The decoding apparatus incorporating the decoding method according to the present invention therein provides high-speed processing.

Another feature is that the same operation block is used in both of the N-by-N and N/2-by-N/2 inverse orthogonal transform modes, while coefficient data suitable for each of these two different modes are entered into the operation block.

In this way, the use of the decoding method according to the present invention allows the same inverse orthogonal transform unit in the decoding apparatus incorporating the decoding method according to the present invention therein to be used in each of the N-by-N and N/2-by-N/2 inverse orthogonal transformations.

As a result, the use of the decoding method according to the present invention inhibits an increase in hardware size of the inverse orthogonal transform unit, and accordingly inhibits an increase in hardware size of the decoding apparatus that embodies the decoding method according to the present invention.

A further feature is that, in the step of entering the orthogonal transform coefficient data, the N-number-of-pixels-based orthogonal transform coefficient data can be received in the same order in each of the N-by-N and N/2-by-N/2 inverse orthogonal transform modes. As a result, easy address control is achievable.

A twenty-sixth aspect of the present invention provides a decoding apparatus for decoding data on an N-pixels-by-N-lines-formed block, where N is equal to 2x (x is an exponent), comprising: a variable length decoding unit operable to perform variable length decoding of encoded data, thereby producing quantized data; an inverse quantizing unit operable to inversely quantize the quantized data, thereby producing orthogonal transform coefficient data; and an inverse orthogonal transform unit operable to inversely orthogonally transform the produced orthogonal transform coefficient data, thereby producing pixel data, wherein the inverse orthogonal transform unit comprises: an input unit operable to, in an N-by-N inverse orthogonal transform mode, enter N-number-of-pixels-based orthogonal transform coefficient data after receipt of the N-number-of-pixels-based orthogonal transform coefficient data; the input unit operable to, in an N/2-by-N/2 inverse orthogonal transform mode, enter N/2-number-of-first pixels-based orthogonal transform coefficient data and N/2-number-of-second pixels-based orthogonal transform coefficient data after receipt of N-number-of-pixels-based orthogonal transform coefficient data; an inverse orthogonal transform operation unit operable to, in the N-by-N inverse orthogonal transform mode, practice an operation on the entered N-number-of-pixels-based orthogonal transform coefficient data and given N-by-N inverse orthogonal transformation-related coefficient data, thereby producing N-pieces of pixel data; the inverse orthogonal transform operation unit operable to, in the N/2-by-N/2 inverse orthogonal transform mode, practice an operation on the entered N/2-number-of-first pixels-based orthogonal transform coefficient data and given N/2-by-N/2 inverse orthogonal transformation-related coefficient data, thereby producing N/2-pieces of pixel data; and the inverse orthogonal transform operation unit operable to, in the N/2-by-N/2 inverse orthogonal transform mode, practice an operation on the entered N/2-number-of-second pixels-based orthogonal transform coefficient data and the given N/2-by-N/2 inverse orthogonal transformation-related coefficient data, thereby producing N/2-pieces of pixel data.

This system allows the input unit to receive the same number (N-number)-of-pixels-based orthogonal transform coefficient data in each of the N-by-N and N/2-by-N/2 inverse orthogonal transform modes, and to enter the orthogonal transform coefficient data into the same inverse orthogonal transform operation unit in a manner suitable for each of these two different modes.

This feature allows the N/2-by-N/2 inverse orthogonal transformation to be executed on the N-pixels-by-N-lines-formed block.

As a result, the inverse orthogonal transform unit in the decoding apparatus according to the present invention is activated at the same number of times or rather once when performing the N-by-N inverse orthogonal transformation on the orthogonal transform coefficient data on the N-pixels-by-N-lines-formed block and when executing the N/2-by-N/2 inverse orthogonal transformation on the orthogonal transform coefficient data on N/2-pixels-by-N/2-lines-formed four blocks that are obtained by dividing the N-pixels-by-N-lines-formed block into four parts.

Consequently, the N/2-by-N/2 inverse orthogonal transformation can be executed at high-processing speeds, and the decoding apparatus according to the present invention provides high-speed processing.

Another feature is that the same inverse orthogonal transform operation unit is used in both of the N-by-N and N/2-by-N/2 inverse orthogonal transform modes, while coefficient data suitable for each of these two different modes are entered into the inverse orthogonal transform operation unit.

This means that the same inverse orthogonal transform operation unit is usable in each of the N-by-N and N/2-by-N/2 inverse orthogonal transformations. This feature inhibits an increase in hardware size of the inverse orthogonal transform unit in the decoding apparatus according to the present invention, and consequently inhibits an increase in hardware size of the decoding apparatus according to the present invention.

A further feature is that the input unit can receive the N-number-of-pixels-based orthogonal transform coefficient data in the same order in each of the N-by-N and N/2-by-N/2 inverse orthogonal transform modes.

As a result, easy address control is achievable because the input unit need not receive the data in the different order for each of the N-by-N and N/2-by-N/2 inverse orthogonal transform modes.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Embodiments of the present invention will now be described with reference to the drawings.

(Embodiment 1)

Figure 1:
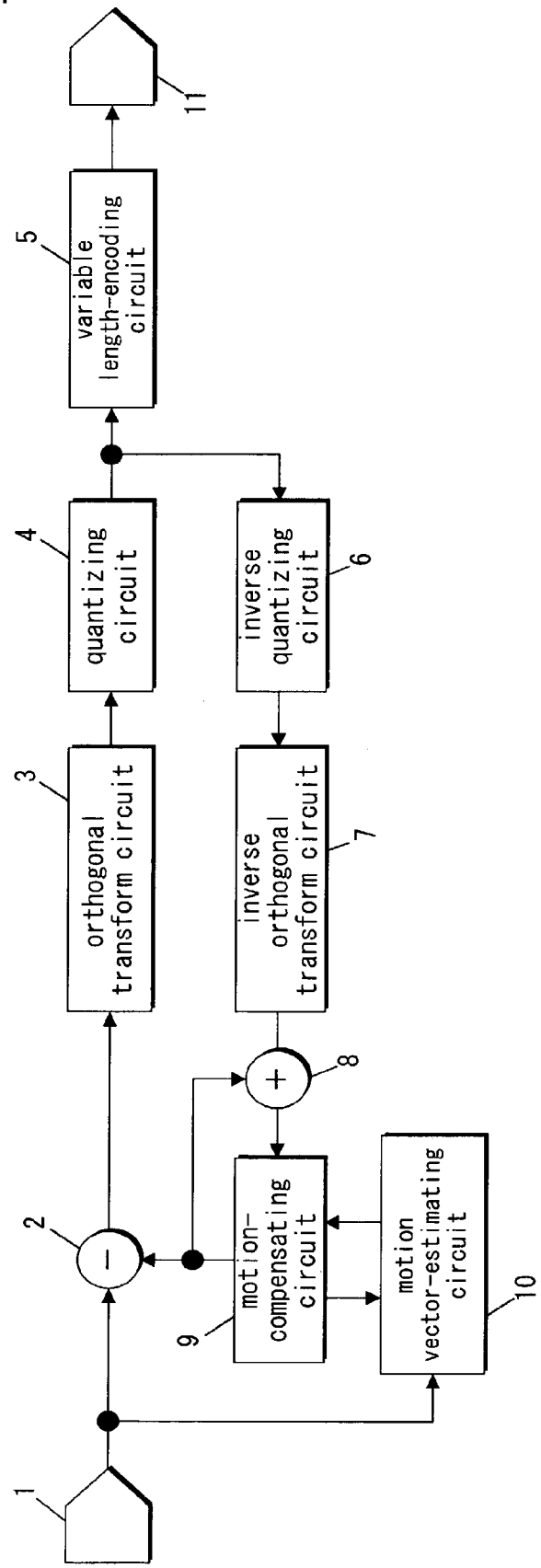
FIG. 1 is a block diagram, illustrating an exemplary encoding apparatus according to a first embodiment of the present invention.

FIG. 1 is a block diagram, illustrating an exemplary encoding apparatus according to a first embodiment. As illustrated in FIG. 1, the encoding apparatus includes an input port 1, a subtraction circuit 2, an orthogonal transform circuit 3, a quantizing circuit 4, a variable length-encoding circuit 5, an inverse quantizing circuit 6, an inverse orthogonal transform circuit 7, an addition circuit 8, a motion-compensating circuit 9, a motion vector-estimating circuit 10, and an output port 11.

The motion vector-estimating circuit 10 compares a candidate encode image with a reference image (an encoded image), thereby detecting a motion vector. The candidate encode image is entered into the encoding apparatus through the input port 1.

The motion-compensating circuit 9 moves the reference image by an amount of the motion vector, thereby generating a predicted image.

The subtraction circuit 2 removes differences between the candidate encode image and the predicted image, thereby generating a predictive error image.

The orthogonal transform circuit 3 orthogonally transforms the predictive error image, thereby producing orthogonal transform coefficient data.

The orthogonal transform circuit 3 receives intra-images as well as inter-images. The orthogonal transform circuit 3 orthogonally transforms these two types of images.

The term "inter-image" usually refers to a screen-to-screen encode-caused image using the motion vector. The term "intra-image" usually refers to an in-screen encode-caused image.

The quantizing circuit 4 quantizes the orthogonal transform coefficient data from the orthogonal transform circuit 3, thereby generating quantized data.

The variable length-encoding circuit 5 practices the variable-length encoding of the quantized data, thereby producing encoded data. The encoded data is diverted to the output port 11 for output and the inverse quantizing circuit 6.

The inverse quantizing circuit 6 inversely quantizes the quantized data, thereby producing orthogonal transform coefficient data.

The inverse orthogonal transform circuit 7 inversely orthogonally transforms the orthogonal transform coefficient data from the inverse quantizing circuit 6, thereby generating a difference image.

The addition circuit 8 adds the difference image to the predicted image from the motion-compensating circuit 9, thereby producing a reference image.

The reference image is entered into the motion-compensating circuit 9 and the motion vector-estimating circuit 10.

The following discusses the orthogonal transform circuit 3. The present embodiment illustrates DCT (discrete cosine transformation) as an example of orthogonal transformation.

Figure 2:
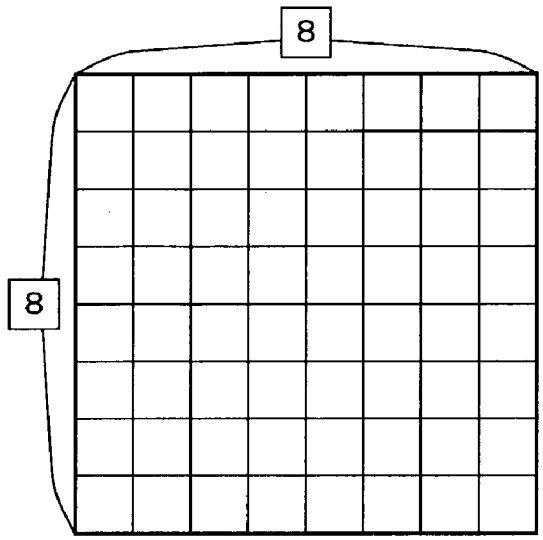
FIG. 2(a) is a schematic view, illustrating an exemplary eight pixels-by-eight lines-formed pixel block.
FIG. 2(b) is a descriptive illustration, showing an eight-by-eight orthogonal transform mode.
FIG. 2(c) is a descriptive illustration, showing a four-by-four orthogonal transform mode.
Figure 2:
Figure 2:
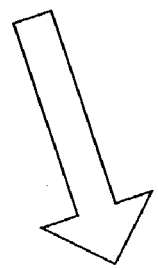

FIG. 2 is a descriptive illustration, showing exemplary modes that the orthogonal transform circuit 3 according to the present embodiment assumes.

FIG. 2(*a*) is a schematic illustration, showing an exemplary eight pixels-by-eight lines-formed pixel block. FIG. 2(*b*) is a descriptive illustration, showing an exemplary eight-by-eight orthogonal transform mode. FIG. 2(*b*) is a descriptive illustration, showing an exemplary four-by-four orthogonal transform mode.

As illustrated in FIG. 2(*a*), the eight pixels-by-eight lines-formed pixel block consists of eight pixels by eight pixels. The eight pixels-by-eight lines-formed pixel block is described as an object to be orthogonally transformed.

As illustrated in FIG. 2(*b*), the orthogonal transform circuit 3 in the eight-by-eight orthogonal transform mode performs eight-by-eight orthogonal transformation on the eight pixels-by-eight lines-formed pixel block. The eight-by-eight orthogonal transformation produces a DC (direct current) coefficient and sixty-three AC (alternating current) coefficients.

As illustrated in FIG. 2(*c*), the orthogonal transform circuit 3 in the four-by-four orthogonal transform mode practices four-by-four orthogonal transformation on four blocks that are obtained by dividing the eight pixels-by-eight lines-formed pixel block into four equal parts. The four-by-four orthogonal transformation produces a DC coefficient and fifteen AC coefficients for each of the blocks.

The eight-by-eight orthogonal transform mode is now described with reference to the drawings and mathematical expressions.

Figure 3:
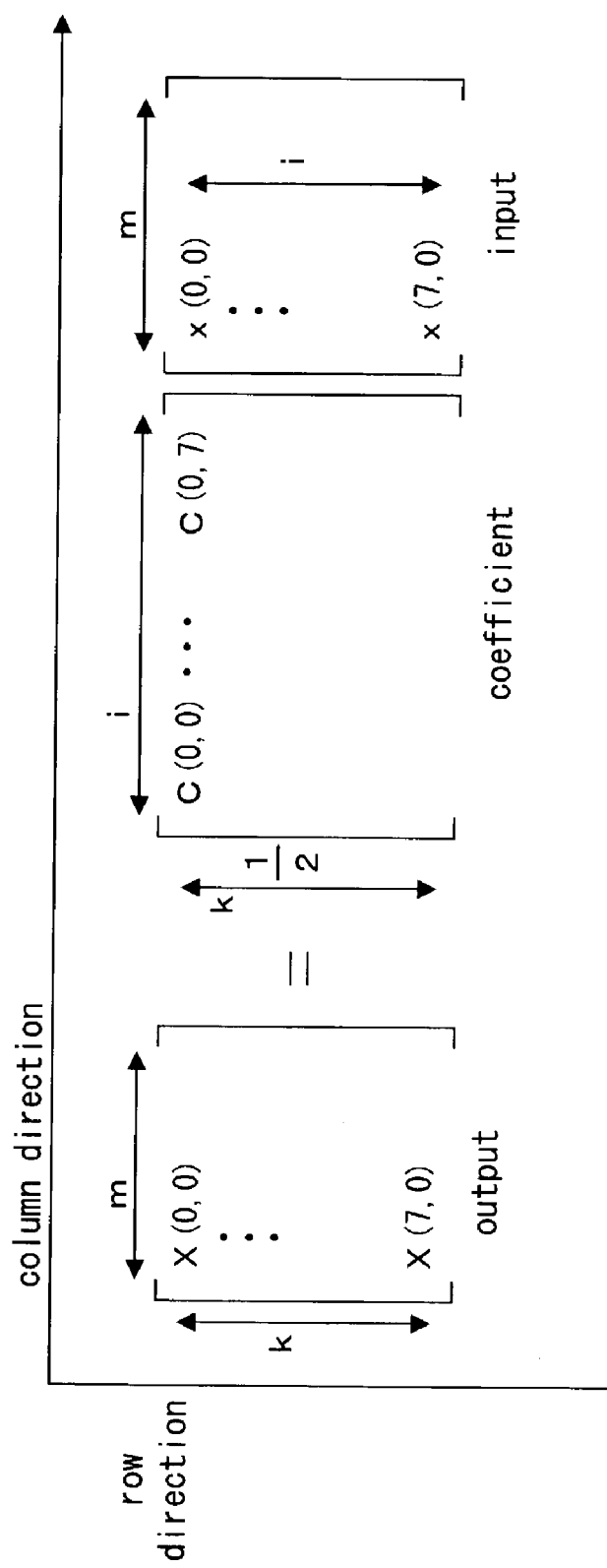
FIG. 3 is a descriptive illustration, showing exemplary processing in the eight-by-eight orthogonal transform mode.

FIG. 3 is a descriptive illustration, showing an exemplary eight-by-eight orthogonal transform mode.

The orthogonal transform circuit 3 in the eight-by-eight orthogonal transform mode executes the eight-by-eight orthogonal transformation on the eight pixels-by-eight lines-formed pixel block, as illustrated by the following expression:

[ME1]

$$X(k, m) = \frac{1}{2} C(k, m) \sum_{i=0}^{7} a_{ik} x(i, m)$$

$$k = 0, 1, \ldots, 7 \quad m = 0, 1, \ldots, 7$$

(ME1) is now described with reference to FIG. 3. In (ME1), the character "k" denotes a cosine coefficient row and an output data (orthogonal transform coefficient data) row. The character "m" denotes an input data (pixel data) column and an output data (orthogonal transform coefficient data) column.

In (ME1), the character "i" denotes a cosine coefficient column and an input data (pixel data) row. The characters "x (i, m)" denote input data (pixel data). The characters "aik" denote a cosine coefficient. The characters "X (k, m)" denote output data (orthogonal transform coefficient data).

In (ME1), the characters "C (k, m)" denotes a coefficient, where "C" is $1/\sqrt{2}$ when "k" is equal to zero, and "C" is one when "k" is equal to one to seven. In FIG. 3, the character "C" represents "C (k, m) x aik" of (ME1).

The orthogonal transform circuit 3 in the eight-by-eight orthogonal transform mode performs the eight-by-eight orthogonal transformation on the eight pixels-by-eight lines-formed pixel block in accordance with (ME1).

At this time, the orthogonal transform circuit 3 executes the eight-by-eight orthogonal transformation on eight pixels-based pixel data, as illustrated by the following expression:

[ME2]

$$X(k, 0) = \frac{1}{2} C(k, 0) \sum_{i=0}^{7} a_{ik} x(i, 0)$$

$$k = 0, 1, \ldots, 7$$

(ME2) is substantially equivalent to (ME1) except for the character "m" replaced by zero in (ME1). The orthogonal transform circuit 3 practices the eight-by-eight orthogonal transformation on the eight pixels-based pixel data in accordance with (ME2), thereby producing eight orthogonal transform coefficients.

The character "m" is replaced by numerals zero to seven, thereby producing a total of sixty-four orthogonal transform coefficients from the eight pixels-by-eight lines-formed pixel block.

(ME2) can be expressed by the following matrix:

[ME3]

$$\begin{bmatrix} X_0 \\ X_1 \\ X_2 \\ X_3 \\ X_4 \\ X_5 \\ X_6 \\ X_7 \end{bmatrix} = \frac{1}{2} \begin{bmatrix} A & A & A & A & A & A & A & A \\ D & E & F & G & -G & -F & -E & -D \\ B & C & -C & -B & -B & -C & C & B \\ E & -G & -D & -F & F & D & G & -E \\ A & -A & -A & A & A & -A & -A & A \\ F & -D & G & E & -E & -G & D & -F \\ C & -B & B & -C & -C & B & -B & C \\ G & -F & E & -D & D & -E & F & -G \end{bmatrix} \begin{bmatrix} x_0 \\ x_1 \\ x_2 \\ x_3 \\ x_4 \\ x_5 \\ x_6 \\ x_7 \end{bmatrix}$$

The characters "X0" to "X7" of (ME3) correspond to "X (0, 0)" to "X (7, 0)" of (ME2), respectively. The characters "x0" to "x7" of (ME3) correspond to "x (0, 0)" to "x (7, 0)" of (ME2), respectively. An eight row-by-eight column matrix as illustrated by (ME3) corresponds to the characters C (k, 0) x aik"of (ME2).

Next, the four-by-four orthogonal transform mode is described with reference to mathematical expressions. As illustrated by a mathematic expression given below, the orthogonal transform circuit 3 in the four-by-four orthogonal transform mode performs the four-by-four orthogonal transformation on four pixels-by-four lines-formed four blocks that are obtained by dividing the eight pixels-by-eight lines-formed pixel block into four equal parts.

[ME4]

$$X(k, m) = \frac{1}{\sqrt{2}} C(k, m) \sum_{i=0}^{3} A_{ik} x(i, m)$$

$$k = 0, 1, 2, 3 \quad m = 0, 1, 2, 3$$

In (ME4), the character "k" denotes a cosine coefficient row and an output data (orthogonal transform coefficient data) row. The character "m" denotes an input data (pixel data) column and an output data (orthogonal transform coefficient data) column.

In (ME4), the character "i" denotes a cosine coefficient column and an input data (pixel data) row. The characters "x (i, m)" denote input data (pixel data). The characters "Aik" denote a cosine coefficient. The characters "X (k, m)" denote output data (orthogonal transform coefficient data).

In (ME4), the characters "C (k, m)" denotes an coefficient, where "C" is $1/\sqrt{2}$ when "k" is equal to zero, and "C" is one when "k" is equal to one to seven.

In the above description of (ME4), the terms "row" and "column" are the same as those of FIG. 3.

The orthogonal transform circuit 3 in the four-by-four orthogonal transform mode performs the four-by-four orthogonal transformation on the four pixels-by-four lines-formed four blocks in accordance with (ME4).

At this time, the orthogonal transform circuit 3 executes the four-by-four orthogonal transformation on four pixels-based pixel data, as illustrated by the following expression:

[ME5]

$$X(k, 0) = \frac{1}{\sqrt{2}} C(k, 0) \sum_{i=0}^{3} A_{ik} x(i, 0)$$

$$k = 0, 1, 2, 3$$

(ME5) is substantially equivalent to (ME4) except for the character "m" replaced by zero in (ME4). The orthogonal transform circuit 3 practices the four-by-four orthogonal transformation on the four pixels-based pixel data in accordance with (ME5), thereby producing four orthogonal transform coefficients.

The character "m" is replaced by numerals zero to three, thereby providing sixteen orthogonal transform coefficients from each of the four pixels-by-four lines-formed four pixel blocks.

(ME5) can be expressed by the following matrix:
[ME6]

$$\begin{bmatrix} X_0 \\ X_1 \\ X_2 \\ X_3 \end{bmatrix} = \frac{1}{\sqrt{2}} \begin{bmatrix} A & A & A & A \\ B & C & -C & -B \\ A & -A & -A & A \\ C & -B & B & -C \end{bmatrix} \begin{bmatrix} x_0 \\ x_1 \\ x_2 \\ x_3 \end{bmatrix}$$

The characters "X0" to "X3"of (ME6) correspond to "X (0, 0)" to "X (3, 0)" of (ME5), respectively. The characters "x0" to "x3" of (ME6) correspond to "x (0, 0)" to "x (3, 0)" of (ME5), respectively. An four row-by-four column matrix as illustrated by (ME6) corresponds to the characters "C (k, 0) x Aik" of (ME5).

Next, a specific structure of the orthogonal transform circuit 3 is described.

Figure 4:
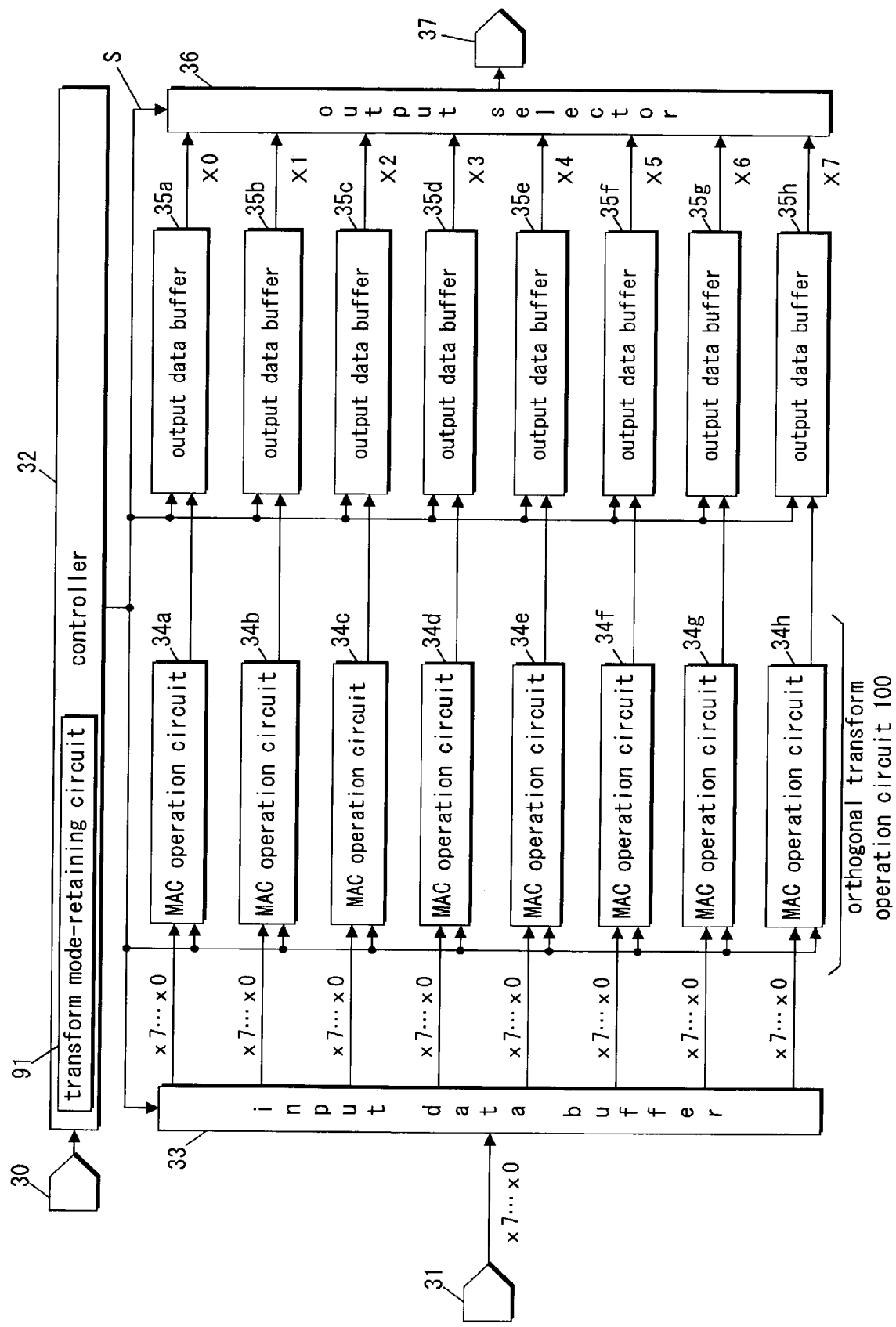
FIG. 4 is a block diagram, illustrating an exemplary orthogonal transform circuit.

FIG. 4 is a block diagram, illustrating the exemplary orthogonal transform circuit 3 of FIG. 1. As illustrated in FIG. 4, the orthogonal transform circuit 3 includes a mode-setting port 30, an input port 31, a controller 32, an input data buffer 33, eight multiply-and-accumulation (MAC) operation circuits "34a" to "34h", eight output data buffers "35a" to "35h", an output data selector 36, and an output port 37.

The controller 32 includes a transform mode-retaining circuit 91.

The eight MAC operation circuits "34a" to "34h" form an orthogonal transform operation circuit 100.

The following briefly describes how the circuits of FIG. 4 work. The controller 32 sets the orthogonal transform circuit 3 into either the eight-by-eight or four-by-four transform mode. The controller 32 controls, using a control signal "S" therefrom, the circuits that form the orthogonal transform circuit 3.

The input data buffer 33 tentatively retains eight pixels-based pixel data that are entered into the orthogonal transform circuit 3 through the input port 31. The input data buffer 33 is, e.g., an input buffer.

Each of the MAC operation circuits "34a" to "34h" executes multiply-and-accumulation (MAC) operations on the eight pixels-based pixel data from the input data buffer 33, thereby producing an orthogonal transform coefficient.

Each of the MAC operation circuits "34a" to "34h" is connected to corresponding one of the output data buffers "35a" to "35h". Each of the output data buffers "35a" to "35h" retains one piece of orthogonal transform coefficient data from corresponding one of the MAC operation circuits "34a" to "34h".

The output data buffers "35a" to "35h" send the respective pieces of orthogonal transform coefficient data to the output data selector 36. The output data selector 36 selectively feeds the eight pieces of orthogonal transform coefficient data into the output port 37.

The following describes details of the processing in the orthogonal transform circuit 3. Assume that the orthogonal transform circuit 3 in the eight-by-eight orthogonal transform mode performs the eight-by-eight orthogonal transformation on the eight pixels-by-eight lines-formed pixel block.

Figure 5:
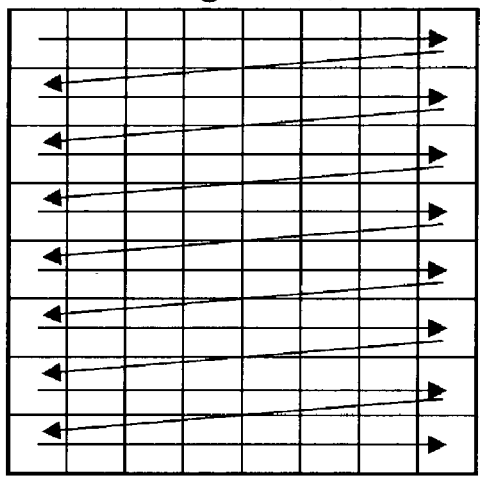
FIG. 5(a) is an illustration, showing an exemplary first example of data input sequence.
FIG. 5(b) is an illustration, showing an exemplary second example of data input sequence.
FIG. 5(c) is an illustration, showing an exemplary third example of data input sequence.
FIG. 5(d) is an illustration, showing an exemplary fourth example of data input sequence.
FIG. 5(e) is an illustration, showing an exemplary fifth example of data input sequence.
FIG. 5(f) is an illustration, showing an exemplary sixth example of data input sequence.
Figure 5:
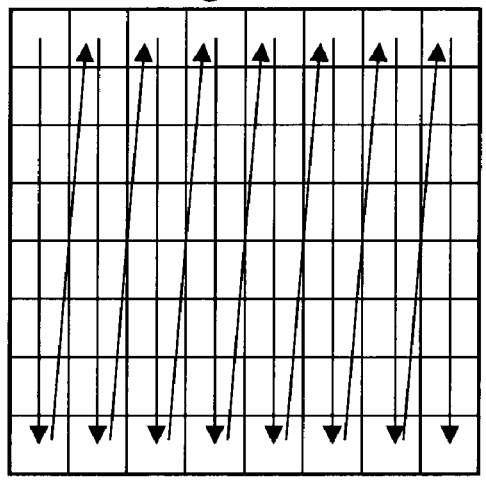
Figure 5:
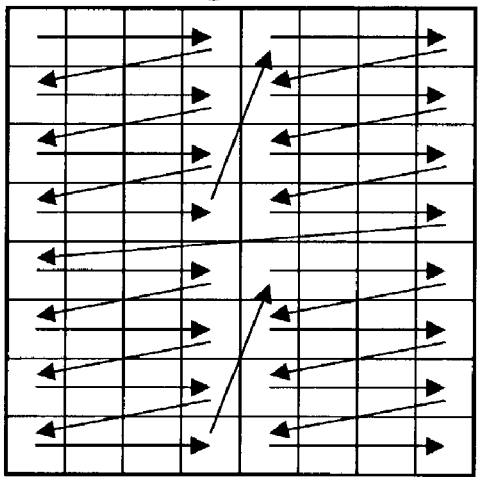
Figure 5:
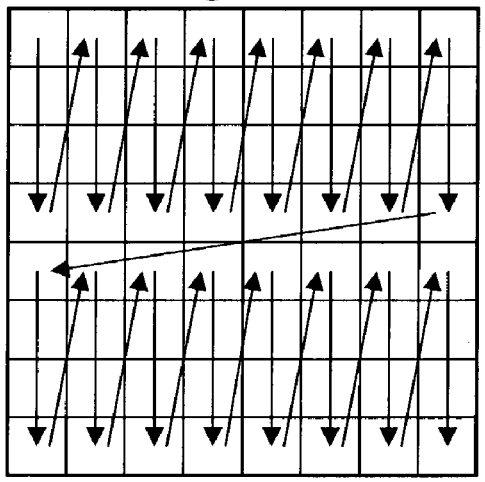
Figure 5:
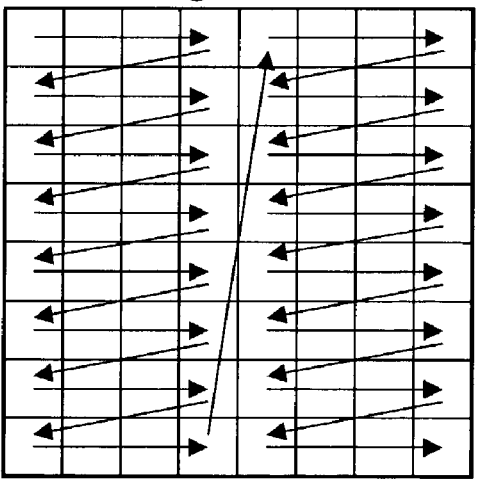
Figure 5:
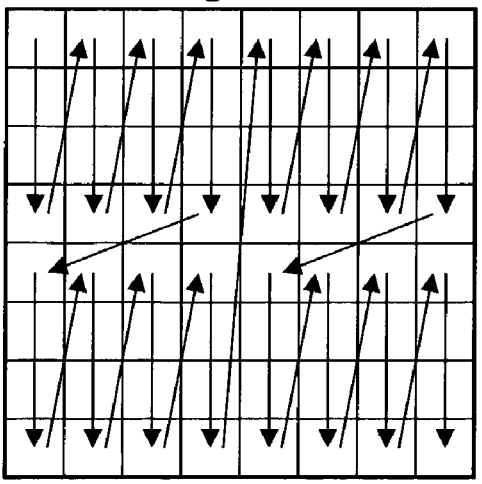

FIG. 5 is an illustration, showing exemplary examples of data input sequences in which the pixel data are entered in order into the orthogonal transform circuit 3. FIG. 5(a) is an illustration, showing an exemplary first example of a pixel data input sequence. FIG. 5(b) is an illustration, showing an exemplary second example of the pixel data input sequence. FIG. 5(c) is an illustration, showing an exemplary third example thereof. FIG. 5(d) is an illustration, showing an exemplary fourth example thereof. FIG. 5(e) is an illustration, showing an exemplary fifth example thereof. FIG. 5(f) is an illustration, showing an exemplary sixth example thereof.

FIGS. 5(a) to 5(f) illustrate the eight pixels-by-eight lines-formed pixel block, from which the pixel data are entered for each pixel into the orthogonal transform circuit 3 through the input port 31, as illustrated by arrows of FIGS. 5(a) to 5(f).

The following assumes that the pixel data are entered into the orthogonal transform circuit 3 in accordance with the data input sequence as illustrated by FIG. 5(d). The following describes the way in which the orthogonal transform circuit 3 orthogonally transforms the eight pixels-based pixel data in accordance with (ME3).

The mode-setting port 30 receives a mode-instructing signal for setting the orthogonal transform circuit 3 into the eight-by-eight orthogonal transform mode.

In the controller 32, the transform mode-retaining circuit 91 sets the orthogonal transform circuit 3 into the eight-by-eight orthogonal transform mode in response to the received mode-instructing signal.

The pixel data are entered for each pixel into the orthogonal transform circuit 3 through the input port 31. The input data buffer 33 tentatively retains the entered pixel data until all of the eight pixels-based pixel data "x0" to "x7" reach the input data buffer 33.

At this time, the pixel data are entered through the input port 31 in the order of "x0" to "x7".

When all of the eight pixels-based pixel data "x0" to "x7" reach the input data buffer 33, then the input data buffer 33 feeds them to each of the MAC operation circuits "34*a*" to "34*h*".

The MAC circuit "34*a*" performs the MAC operations on the sequentially entered pixel data "x0" to "x7" and eight pieces of eight-by-eight orthogonal transformation-related coefficient data "(½) A" to "(½) A", thereby providing a series of added data. The MAC circuit "34*a*" feeds the series of added data into the output data buffer "35*a*". An easy understanding of the above step is realized by (ME3).

The ultimately added data is orthogonal transfer coefficient data "X0". This will be described later in detail.

The output data buffer "35*a*" retains the ultimately added data or rather the orthogonal transform coefficient data "X0", and then feeds it into the output data selector 36. This step is also described later in detail.

The remaining MAC operation circuits "34*b*" to "34*h*" behave in a manner similar to the way in which the MAC operation circuit "34*a*" works. The remaining output data buffers "35*b*" to "35*h*" behave in a manner similar to the way in which the output data buffer "35*a*" works.

The MAC operation circuits "34*a*" to "34*h*" practices multiply-and-accumulation in an eight-parallel manner, thereby producing a total of eight pieces of orthogonal transform coefficient data "X0" to "X7". The output data buffers "35*a*" to "35*h*" send the produced eight pieces of orthogonal transform coefficient data "X0" to "X7" to the output data selector 36.

The output data selector 36 selectively feeds the eight pieces of orthogonal transform coefficient data "X0" to "X7" into the output port 37 in response to the control signal from the controller 32.

The orthogonal transform coefficient data "X0" to "X7" are one by one driven out of the output port 37 in the order in which the output data selector 36 selects them.

The above step is repeated eight times that correspond to eight columns of FIG. 5(*d*). As a result, the orthogonal transform circuit 3 executes the eight-by-eight orthogonal transformation on the eight pixels-by-eight lines-formed pixel block, thereby producing a total of sixty-four orthogonal transform coefficients.

Any one of the pixel data input sequences as illustrated in FIGS. 5(*a*) to 5(*f*) similarly practices the multiply-and-accumulation in the eight-parallel manner, and provides the total of sixty-four orthogonal transform coefficients.

The MAC operation circuits "34*a*" to "34*h*" and the output data buffers "35*a*" to "35*h*" are now described in further detail.

Figure 6:
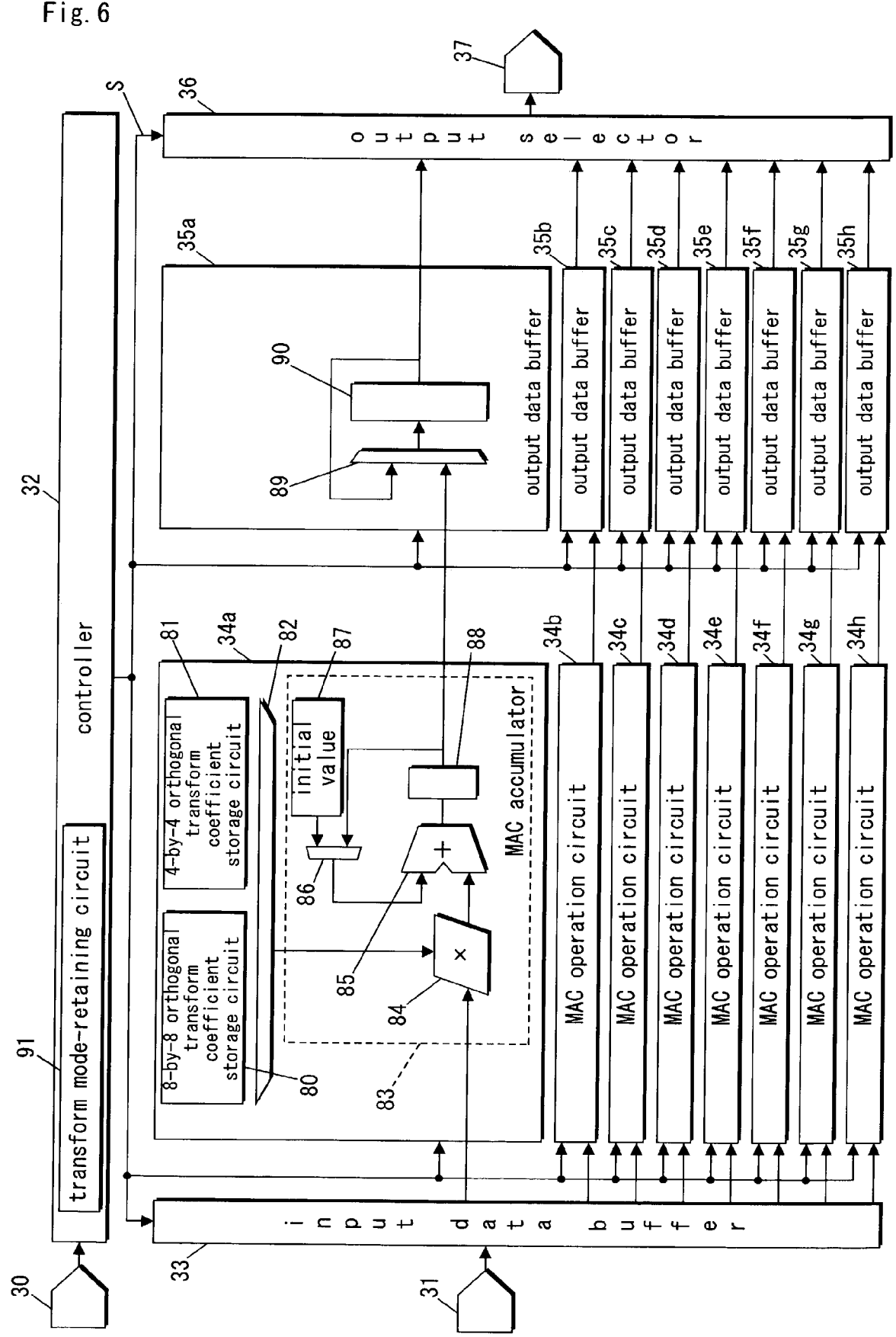
FIG. 6 is a descriptive illustration, showing details of an exemplary multiply-and-accumulation (MAC) operation circuit.

FIG. 6 is a detailed descriptive illustration, showing the exemplary MAC operation circuits "34*a*" to "34*h*" and the exemplary output data buffers "35*a*" to "35*h*". In FIG. 6, the same components as those of FIG. 4 are identified by the same reference characters, and therefore descriptions related thereto are omitted.

As illustrated in FIG. 6, the MAC operation circuit "34*a*" includes an eight-by-eight orthogonal transform coefficient storage circuit 80, a four-by-four orthogonal transform coefficient storage circuit 81, a selector 82, and a multiply-and-accumulation (MAC) accumulator 83.

The MAC accumulator 83 includes a multiplier 84, an adder 85, an initial value input circuit 87, a selector 86, and a register 88.

The MAC accumulator 83 performs multiply-and-accumulation as described later, and may be considered as an arithmetic operation block that is provided with a function of performing the multiply-and-accumulation.

Although not illustrated in the drawings, each of the other MAC operation circuits "34*b*" to "34*h*" includes the eight-by-eight orthogonal transform coefficient storage circuit 80, the four-by-four orthogonal transform coefficient storage circuit 81, the selector 82, and the MAC accumulator 83.

The eight-by-eight orthogonal transform coefficient storage circuit 80 and the four-by-four orthogonal transform coefficient storage circuit 81 are now described with reference to (ME3) and (ME6).

In the MAC operation circuit "34*a*", the eight-by-eight orthogonal transform coefficient storage circuit 80 stores coefficient data on the first row of the eight row-by-eight column matrix as illustrated by (ME3), while the four-by-four orthogonal transform coefficient storage circuit 81 stores coefficient data on the first row of the four row-by-four column matrix as illustrated by (ME6).

In the MAC operation circuit "34*b*", the eight-by-eight orthogonal transform coefficient storage circuit 80 stores coefficient data on the second row of the eight row-by-eight column matrix of (ME3), while the four-by-four orthogonal transform coefficient storage circuit 81 stores coefficient data on the second row of the four row-by-four column matrix of (ME6).

In the MAC operation circuit "34*c*", the eight-by-eight orthogonal transform coefficient storage circuit 80 stores coefficient data on the third row of the eight row-by-eight column matrix of (ME3), while the four-by-four orthogonal transform coefficient storage circuit 81 stores coefficient data on the third row of the four row-by-four column matrix of (ME6).

In the MAC operation circuit "34*d*", the eight-by-eight orthogonal transform coefficient storage circuit 80 stores coefficient data on the fourth row of the eight row-by-eight column matrix of (ME3), while the four-by-four orthogonal transform coefficient storage circuit 81 stores coefficient data on the fourth row of the four row-by-four column matrix of (ME6).

In the MAC operation circuit "34*e*", the eight-by-eight orthogonal transform coefficient storage circuit 80 stores coefficient data on the fifth row of the eight row-by-eight column matrix of (ME3), while the four-by-four orthogonal transform coefficient storage circuit 81 stores coefficient data on the first row of the four row-by-four column matrix of (ME6).

In the MAC operation circuit "34*f*", the eight-by-eight orthogonal transform coefficient storage circuit 80 stores coefficient data on the sixth row of the eight row-by-eight column matrix of (ME3), while the four-by-four orthogonal transform coefficient storage circuit 81 stores coefficient data on the second row of the four row-by-four column matrix of (ME6).

In the MAC operation circuit "34g", the eight-by-eight orthogonal transform coefficient storage circuit 80 stores coefficient data on the seventh row of the eight row-by-eight column matrix of (ME3), while the four-by-four orthogonal transform coefficient storage circuit 81 stores coefficient data on the third row of the four row-by-four column matrix of (ME6).

In the MAC operation circuit "34h", the eight-by-eight orthogonal transform coefficient storage circuit 80 stores coefficient data on the eighth row of the eight row-by-eight column matrix of (ME3), while the four-by-four orthogonal transform coefficient storage circuit 81 stores coefficient data on the fourth row of the four row-by-four column matrix of (ME6).

The selector 82 selects either the output from the eight-by-eight orthogonal transform coefficient storage circuit 80 or that from the four-by-four orthogonal transform coefficient storage circuit 81 in response to the control signal from the controller 32.

More specifically, the selector 82 selects the eight-by-eight orthogonal transform coefficient storage circuit 80 when the orthogonal transform circuit 3 assumes the eight-by-eight orthogonal transform mode, but the selector 82 selects the four-by-four orthogonal transform coefficient storage circuit 81 when the orthogonal transform circuit 3 assumes the four-by-four orthogonal transform mode.

As illustrated in FIG. 6, the output data buffer "35a" includes a selector 89 and a register 90.

Although not illustrated, each of the remaining output data buffers "35b" to "35h" also includes the selectors 89 and the registers 90.

The following discusses in detail how the MAC operation circuit "34a" and the output data buffer "35a" work".

Assume that the orthogonal transform circuit 3 is in the eight-by-eight orthogonal transform mode, that the pixel data are entered into the orthogonal transform circuit 3 in the data input sequence as illustrated by FIG. 5(d), and that the orthogonal transform circuit 3 executes the eight-by-eight orthogonal transformation on the eight pixels-based pixel data "x0" to "x7" in accordance with (ME3). In each of the MAC operation circuits "34a" to "34h" as illustrated in FIG. 6, the eight-by-eight orthogonal transform coefficient storage circuit 80 contains coefficient data on a corresponding row of the eight row-by-eight column matrix as illustrated by (ME3).

When the orthogonal transform circuit 3 is placed into the eight-by-eight orthogonal transform mode, then the selector 82 selects the eight-by-eight orthogonal transform coefficient storage circuit 80 in response to the control signal from the controller 32 of FIG. 6. The eight-by-eight orthogonal transform coefficient storage circuit 80 contains eight pieces of coefficient data "(½) A" to "(½) A". The selector 82 sequentially feeds the eight pieces of coefficient data "(½) A" to "(½) A" from the eight-by-eight orthogonal transform coefficient storage circuit 80 into the multiplier 84.

Meanwhile, the input data buffer 33 enters the pixel data "x0" to "x7" into the multiplier 84.

The multiplier 84 multiplies the sequentially entered coefficient data "(½) A" to "(½) A" by the sequentially entered pixel data "x0" to "x7", thereby providing a series of multiplied data. The multiplier 84 feeds the series of multiplied data in sequence into the adder 85.

The selector 86 selects an initial value from the initial value input circuit 87 in response to the control signal from the controller 32 at the start of multiply-and-accumulation (MAC) operations.

As a result, the adder 85 receives the initial value when the first multiplied data is entered into the adder 85.

Accordingly, the adder 85 adds the first multiplied data and the initial value together at the start of the MAC operations, thereby providing first added data. The adder 85 feeds the first added data into the register 88.

The register 88 retains the first added data. The retained first added data is diverted into the output data buffer "35a" and the selector 86.

In this way, a subsequently series of added data are sequentially retained in the register 88. The selector 86 continues to select the subsequent series of added data from the register 88 until eight pixels-based pixel data on the next row of FIG. 5(d) are started to experience the MAC operations. This means that the selector 86 selects an initial value for each gang of eight pixels.

The adder 85 sequentially adds the retained added data from the register 88 to the multiplied data from the multiplier 84, thereby providing a series of added data, which is sent to the register 88. As a result, the multiplied data produced using the multiplier 84 is accumulated in the register 88.

The ultimately added data (the eighth added data) produced using the adder 85 is the orthogonal transform coefficient X0.

The series of added data sequentially entered into the register 88 is fed in sequence into the output data buffer "35a".

Each of the remaining MAC operation circuits "34b" to "34h" receives the eight pixels-based pixel data "x0" to "x7", and behaves in a manner similar to the way in which the MAC operation circuit "34a" works. As a result, the remaining MAC operation circuits "34b" to "34h" produce orthogonal transform coefficient data "X1" to "X7", respectively.

At this time, the MAC operation circuits "34a" to "34h" practice the MAC operations in the eight-parallel manner.

In the output data buffer "35a", the selector 89 selects, in response to the control signal from the, controller 32, either data retained in the register 90 or the added data entered from the MAC accumulator 83, and then feeds the selected data into the register 90.

More specifically, when the ultimately added data (the eighth added data) is entered from the adder 85 into the output data buffer "35a", then the selector 89 selects the ultimately added data. The register 90 retains the selected ultimately added data.

The selector 89 does not select the remaining seven pieces of added data, and the register 90 does not retain them.

Therefore, the register 90 retains only the orthogonal transform coefficient data. The retained orthogonal transform coefficient data is replaced by another piece of orthogonal transform coefficient data derived from subsequent eight pixels-based pixel data, when the register 90 receives such replacement data.

The orthogonal transform coefficient data X0 retained in the register 90 is sent to the output data selector 36.

The remaining output data buffers "35b" to "35h" work in a manner similar to the way in which the output data buffer "35a" behaves, and send the respective orthogonal transform coefficient data "X1" to "X7" to the output data selector 36.

The following discusses how the orthogonal transform circuit 3 in the four-by-four orthogonal transform mode practices the four-by-four orthogonal transformation.

Figure 7:
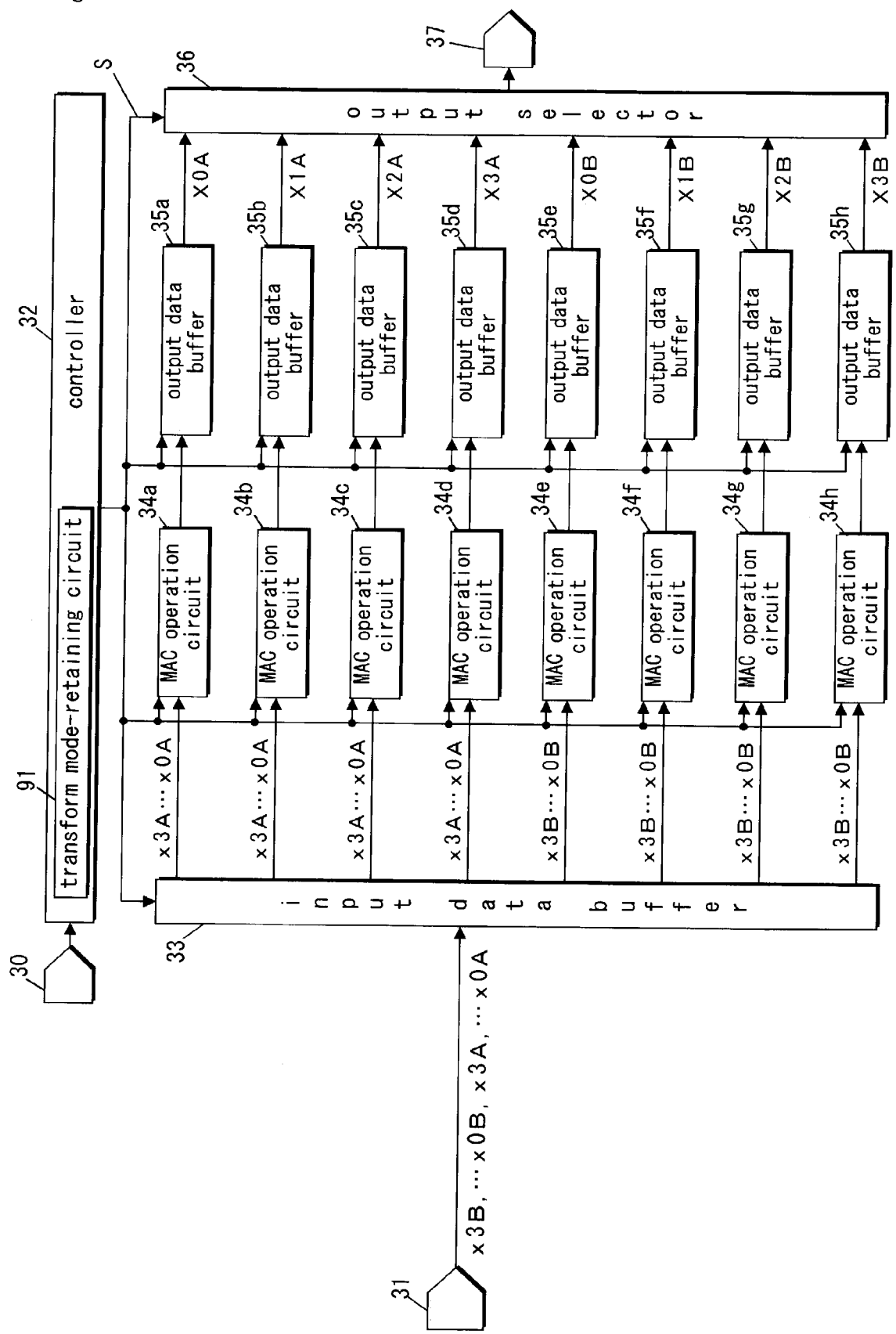
FIG. 7 is a descriptive illustration, showing exemplary processing in the four-by-four orthogonal transform mode.

FIG. 7 is a descriptive illustration, showing exemplary processing in the orthogonal transform circuit 3 of FIG. 1 in the four-by-four orthogonal transform mode. In FIG. 7, the same components as those of FIG. 4 are identified by the same reference characters.

Similarly to the eight-by-eight orthogonal transform mode, in the four-by-four orthogonal transform mode, the pixel data can be entered into the orthogonal transform circuit 3 through the input port 31 in accordance with any one of the data input sequences as illustrated in FIGS. 5(*a*) to 5(*f*).

In the following discussion, assume that the pixel data are entered into the orthogonal transform circuit 3 through the input port 31 in accordance with the input sequence as shown by FIG. 5(*d*).

The mode-setting port 30 receives a mode-instructing signal for setting the orthogonal transform circuit 3 into the four-by-four orthogonal transform mode.

In the controller 32, the transform mode-retaining circuit 91 puts the orthogonal transform circuit 3 into the four-by-four orthogonal transform mode in response to the mode-instructing signal.

Eight pixels-based pixel data "x0A" to "x3A" and "x0B" to "x3B" are entered for each pixel into the orthogonal transform circuit 3 through the input port 31. The input data buffer 33 tentatively retains the entered pixel data until all of the eight pixels-based pixel data "x0A" to "x3A" and "x0B" to "x3B" reach the input data buffer 33.

The input port 31 receives the pixel data in the order of "x0A", "x1A", "x2A", "x3A", "x0B", "x1B", "x2B", and "x3B".

When all of the eight pixels-based pixel data "x0A" to "x3B" reach the input data buffer 33, then the input data buffer 33 enters a first half of the eight pixels-based pixel data, i.e. "x0A" to "x3A", into each of the MAC operation circuits "34*a*" to "34*d*", while feeding a second half of the eight pixels-based pixel data, i.e., "x0B" to "x3B", into each of the MAC operation circuits "34*e*" to "34*h*".

The MAC operation circuits "34*a*" to "34*d*" perform the MAC operations in the four-parallel manner. At the same time, the remaining MAC operation circuits "34*e*" to "34*h*" carries out the MAC operations in the four-parallel manner. This means that the orthogonal transform circuit 3 practices the four-by-four orthogonal transformation in a two-parallel manner.

The following discussion focuses on the MAC operation circuit "34*a*". Assume that the orthogonal transform circuit 3 performs the four-by-four orthogonal transformation in accordance with (ME6). The characters "x0" to "x3" of (ME6) correspond to "x0A" to "x3A" of FIG. 7, respectively. The characters "X0" to "X3" of (ME6) correspond to "X0A" to "X3A" of FIG. 7, respectively.

The MAC operation circuit "34*a*" performs multiply-and-accumulation using the sequentially entered four pixels-based pixel data "x0A" to "x3A" and four-by-four orthogonal transformation-related four coefficient data "$(1/\sqrt{2})$ A" to "$(1/\sqrt{2})$ A". The MAC operation circuit "34*a*" thereby provides a series of added data, which are sent to the output data buffer "35*a*". An easy understanding of the above step is realized by (ME6).

The ultimately added data is orthogonal transfer coefficient data "X0A". This will be described later in detail.

The output data buffer "35*a*" retains the ultimately added data or rather the orthogonal transform coefficient data "X0A", and then feeds it into the output data selector 36. This step is also described later in detail.

The other MAC operation circuits "34*b*" to "34*d*" work in a manner similar to the way in which the MAC operation circuit "34*a*" behaves. The remaining output data buffers "35*b*" to "35*h*" work in a manner similar to the way in which the output data buffer "35*a*" behaves.

As a result, the MAC operation circuits "34*a*" to "34*d*", each of which is in receipt of the four pieces of pixel data "x0A" to "x3A", practice the multiply-and-accumulation in the four-parallel manner, thereby producing four pieces of orthogonal transform coefficient data "X0A" to "X3A", respectively.

The following description focuses on the MAC operation circuit "34*e*". Assume that the orthogonal transform circuit 3 practices the four-by-four orthogonal transformation in accordance with (ME6). The characters "x0" to "x3" of (ME6) correspond to the characters "x0B" to "x3B" of FIG. 7, respectively. The characters "X0" to "X3" of (ME6) correspond to those "X0B" to "X3B" of FIG. 7, respectively.

The MAC operation circuit "34*e*" performs multiply-and-accumulation using the sequentially entered four pixels-based pixel data "x0B" to "x3B" and four-by-four orthogonal transformation-related four coefficient data "$(1/\sqrt{2})$ A" to "$(1/\sqrt{2})$ A". The MAC operation circuit "34*e*" thereby provides a series of added data, which are sent to the output data buffer "35*e*". An easy understanding of the above step is realized by (ME6).

The ultimately added data is orthogonal transfer coefficient data "X0B". This will be described later in detail.

The output data buffer "35*e*" retains the ultimately added data or rather the orthogonal transform coefficient data "X0B", and then feeds it into the output data selector 36. This step is also described later in detail.

The remaining MAC operation circuits "34*f*" to "34*h*" work in a manner similar to the way in which the MAC operation circuit "34*e*" behaves. The remaining output data buffers "35*f*" to "35*h*" work in a manner similar to the way in which the output data buffer "35*e*" behaves.

As a result, the MAC operation circuits "34*e*" to "34*h*", each of which is in receipt of the four pieces of pixel data "x0B" to "x3B", practices the multiply-and-accumulation in the four-parallel manner, thereby producing four pieces of orthogonal transform coefficient data "X0B" to "X3B", respectively.

The output data buffers "35*a*" to "35*h*" sends the respective pieces of orthogonal transform coefficient data "X0A" to "X3B" into the output data selector 36. The output data selector 36 selectively feeds the eight pieces of orthogonal transform coefficient data "X0A" to "X3B" into the output port 37 in response to the control signal from the controller 32.

The orthogonal transform coefficient data "X0A" to "X3B" are, one by one, fed out of the output port 37 in the order in which the output data selector 36 selects them.

The above step is repeated four times that correspond to four columns of FIG. 5(*d*). As a result, the orthogonal transform circuit 3 executes the four-by-four orthogonal transformation on the four pixels-by-four lines-formed two blocks. Subsequently, a similar step is repeated four times that correspond to further four columns of FIG. 5(*d*). As a result, the orthogonal transform circuit 3 executes the four-by-four orthogonal transformation on the remaining four pixels-by-four lines-formed two blocks.

Consequently, the orthogonal transform circuit 3 practices the four-by-four orthogonal transformation on the four pixels-by-four lines-formed four blocks that are obtained by dividing the eight-by-eight based pixel block of FIG. 5(*d*) into four equal parts. As a result, a total of sixty-four orthogonal transform coefficients are produced.

Any one of the data input sequences as illustrated in FIGS. 5(*a*) to 5(*f*) similarly practices the four-by-four orthogonal transformation in the two-parallel manner, and provides the sixty-four orthogonal transform coefficients.

The following describes in further detail with reference to FIG. 6 how the MAC operation circuits "34a" and the output data buffers "35a" work.

Assume that the orthogonal transform circuit 3 assumes the four-by-four orthogonal transform mode, that the pixel data are entered into the orthogonal transform circuit 3 in accordance with the data input sequence as illustrated in FIG. 5(d), and that the orthogonal transform circuit 3 performs the four-by-four orthogonal transformation on the four pixels-based pixel data "x0A" to "x3A" in accordance with (ME6).

In each of the MAC operation circuits "34a" to "34d", the four-by-four orthogonal transform coefficient storage circuit 81 contains coefficient data on a corresponding row of the four row-by-four column matrix as illustrated by (ME6).

When the orthogonal transform circuit 3 is set into the four-by-four orthogonal transform modem, then the selector 82 selects the four-by-four orthogonal transform coefficient storage circuit 81 in response to the control signal from the controller 32 of FIG. 6. The four-by-four orthogonal transform coefficient storage circuit 81 contains four pieces of coefficient data "(1/$\sqrt{2}$) A" to "(1/$\sqrt{2}$) A". The selector 82 sequentially feeds the four pieces of coefficient data "(1/$\sqrt{2}$) A" to "(1/$\sqrt{2}$) A" into the multiplier 84 from the four-by-four orthogonal transform coefficient storage circuit 81.

Meanwhile, the input data buffer 33 enters the pixel data ("x0A" to "x3A") into the multiplier 84.

The multiplier 84 multiplies the sequentially entered coefficient data "(1/$\sqrt{2}$) A" to "(1/$\sqrt{2}$) A" by the sequentially entered pixel data "x0A" to "x3A", thereby providing a series of multiplied data. The multiplier 84 feeds the series of multiplied data into the adder 85.

The selector 86 selects an initial value from the initial value input circuit 87 in response to the control signal from the controller 32 at the start of the MAC operations.

As a result, the adder 85 receives the initial value when the first multiplied data is entered into the adder 85.

Accordingly, the adder 85 adds the first multiplied data and the initial value together at the start of the MAC operations, thereby providing first added data, which is sent to the register 88.

The register 88 retains the first added data from the adder 85. The retained first added data is diverted into the output data buffer "35a" and the selector 86.

In this way, a subsequent series of added data are retained in the register 88. The selector 86 continues to select the subsequent series of added data from the register 88 until the four pixels-based pixel data on the following row of FIG. 5(d) are started to experience the MAC operations. This means that the selector 86 selects an initial value for each gang of four pixels.

The adder 85 sequentially adds the regained added data from the register 88 to the multiplied data from the multiplier 84, thereby providing a series of added data, which is sent to the register 88. In this way, the multiplied data produced using the multiplier 84 are accumulated in the register 88.

The ultimately added data (the fourth added data) produced using the adder 85 is the orthogonal transform coefficient "X0A".

The series of added data sequentially entered into the register 88 is fed in sequence into the output data buffer "35a".

Each of the remaining MAC operation circuits "34b" to "34d" receives the four pixels-based pixel data "x0A" to "x3A", and behaves in a manner similar to the way in which the MAC operation circuit "34a" works. As a result, the remaining MAC operation circuits "34b" to "34d" produce the orthogonal transform coefficient data "X1A" to "X3A".

At this time, the MAC operation circuits "34a" to "34d" practice the MAC operations in the four-parallel manner.

In the output data buffer "35a", the selector 89 selects, in response to the control signal from the controller 32, either data retained in the register 90 or the added data entered from the MAC accumulator 83. The selector 89 feeds the selected data into the register 90.

More specifically, when the output data buffer 35a receives the ultimately added data (the fourth added data) from the adder 85, then the selector 89 selects the ultimately added data. The register 90 retains the ultimately added data from the selector 89.

The selector 89 does not select the remaining three pieces of added data. The register 90 does not retain them.

This means that the register 90 retains only the orthogonal transform coefficient data. The retained orthogonal transform coefficient data is replaced by another piece of orthogonal transform coefficient data derived from subsequent four pixels-based pixel data, when the register 90 receives such replacement data.

The orthogonal transform coefficient data "X0A" retained in the register 90 is sent to the output data selector 36.

The other output data buffers "35b" to "35d" work in a manner similar to the way in which the output data buffer "35a" behaves, and send the respective orthogonal transform coefficient data "X1A" to "X3A" to the output data selector 36.

Similarly to the eight-by-eight orthogonal transform mode, in the four-by-four orthogonal transform mode, the MAC operation circuits "34e" to "34h" are similar in detailed behavior to the MAC operation circuit "34a". In the four-by-four orthogonal transform mode, the output data buffers "35" to "35h" are similar in detailed behavior to the output data buffer "35a".

A flow of processing using the orthogonal transform circuit 3 of FIG. 1 is now described with reference to FIGS. 4 and 7, and a flowchart of FIG. 8.

Figure 8:
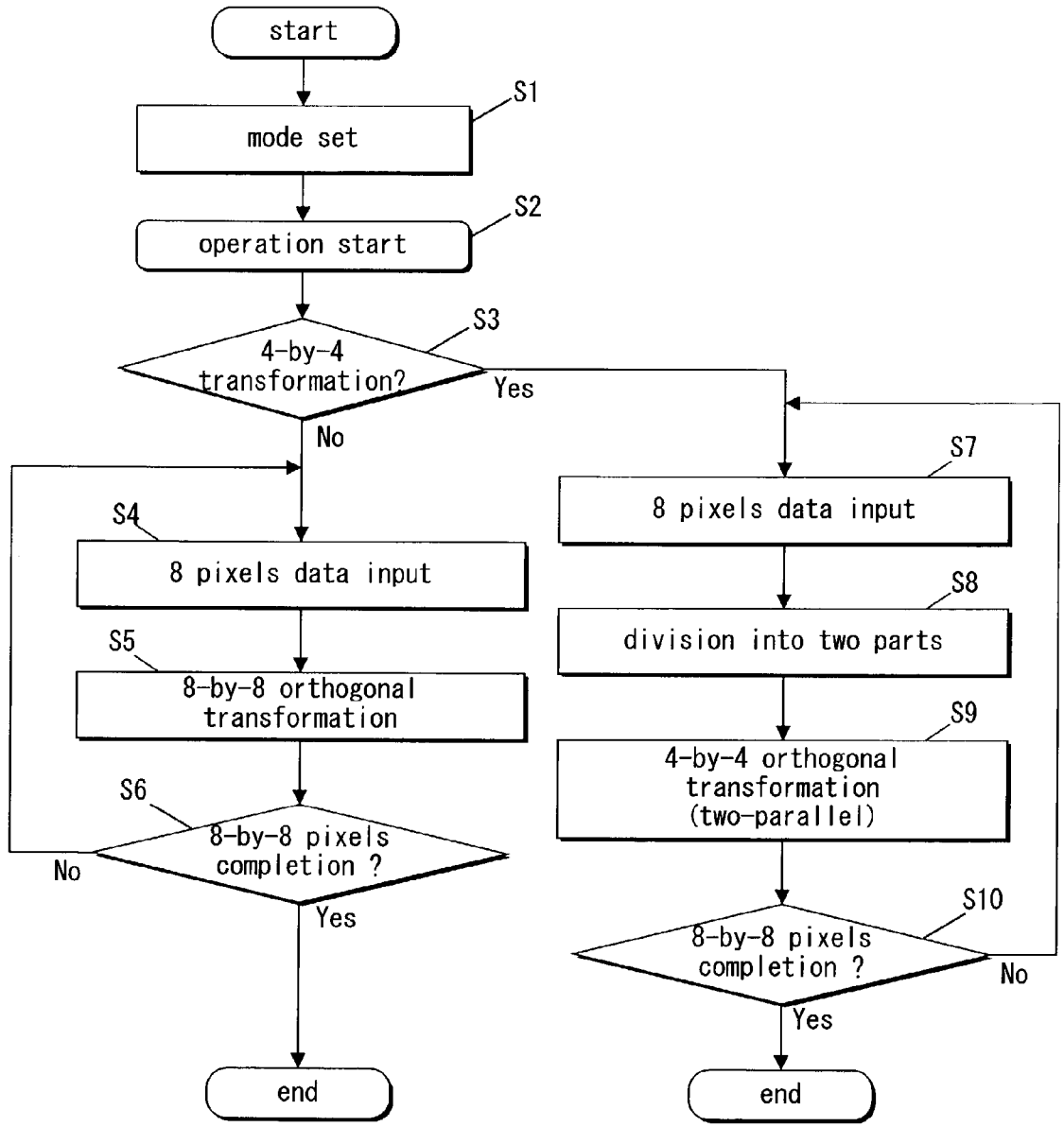
FIG. 8 is a flowchart, illustrating an exemplary flow of processing in the orthogonal transform circuit.

FIG. 8 is a flowchart, illustrating exemplary behaviors of the orthogonal transform circuit 3 of FIG. 1.

At step S1, the mode-instructing signal is entered into the mode-setting port 30. The controller 32 sets the orthogonal transform circuit 3 into either the eight-by-eight or four-by-four orthogonal transform mode in response to the mode-instructing signal.

Assume that the orthogonal transform circuit 3 is in the eight-by-eight orthogonal transform mode. At step 1, the orthogonal transform circuit 3 is set into the eight-by-eight orthogonal transform mode. At step 2, the orthogonal transform circuit 3 starts arithmetic operations.

At step S3, the routine is advanced to step S4S because the orthogonal transform circuit 3 assumes the eight-by-eight orthogonal transform mode.

At step S4, the input port 31 enters the eight pixels-based pixel data into the input data buffer 33.

The input data buffer 33 feeds the entered eight pixels-based pixel data into each of the MAC operation circuits "34a" to "34h".

At step S5, the MAC operation circuits "34a" to "34h" perform the MAC operations in the eight-parallel manner using the eight pixels-based pixel data and the eight pieces of eight-by-eight orthogonal transformation-related coefficient data. This means that the orthogonal transform circuit 3 practices the eight-by-eight orthogonal transformation on the eight pixels-based pixel data.

The eight-by-eight orthogonal transformation on the eight pixels-based pixel data is executed on the eight pixels-by-eight lines-formed pixel block.

At step S6, the routine is retuned to step S4 when orthogonal transform circuit 3 is still executing the eight-by-eight orthogonal transformation on the eight pixels-by-eight lines-formed pixel block in step S5.

At step S6, the orthogonal transform circuit 3 terminates the processing when the eight-by-eight orthogonal transformation on the eight pixels-by-eight lines-formed pixel block in step S5 is completed. As a result, the eight-by-eight orthogonal transformation provides a total of sixty-four orthogonal transform coefficients.

Next, assume that the orthogonal transform circuit 3 is in the four-by-four orthogonal transform mode. At step S1, the orthogonal transform circuit 3 is set into the four-by-four orthogonal transform mode. At step S2, the orthogonal transform circuit 3 starts arithmetic operations.

At step S3, the routine is advanced to step S7S because the orthogonal transform circuit 3 assumes the four-by-four orthogonal transform mode.

At step S7, the input port 31 enters the eight pixels-based pixel data into the input data buffer 33.

At step S8, the input data buffer 33 feeds a first half of the entered eight pixels-based pixel data into the MAC operation circuits "$34a$" to "$34d$", while feeding a second half of the entered eight pixels-based pixel data into the MAC operation circuits "$34e$" to "$34h$". That is, the eight piece-based pixel data is divided into two equal parts, which are entered into the MAC operation circuits "$34a$" to "$34h$" in a manner as described above.

At step S9, the MAC operation circuits "$34a$" to "$34d$" practice the MAC operations in the four-parallel manner using the first half of the eight pixels-based pixel data and the four pieces of four-by-four orthogonal transformation-related coefficient data. At the same time, the MAC operation circuits "$34e$" to "$34h$" perform the MAC operations in the four-parallel manner using the second half of the eight pixels-based pixel data and the four pieces of four by-four orthogonal transformation-related coefficient data.

This means that the orthogonal transform circuit 3 executes the four-by-four orthogonal transformation on the four pixels-based pixel data in the two-parallel manner.

At step S10, the routine is retuned to step S7 when the orthogonal transform circuit 3 is still executing the four-by-four orthogonal transformation on the eight pixels-by-eight lines-formed pixel block in step S9.

At step S10, the orthogonal transform circuit 3 terminates the processing when the four-by-four orthogonal transformation on the eight pixels-by-eight lines-formed pixel block in step S9 is completed. As a result, the four-by-four orthogonal transformation provides a total of sixty-four orthogonal transform coefficients.

As described above, according to the present embodiment, the input data buffer 33 receives the same number of pieces of pixel data, i.e., eight pieces of pixel data, in both of the eight-by-eight and four-by-four orthogonal transform modes, and enters the pixel data into each of the MAC operation circuits "$34a$" to "$34h$" in a manner suitable to each of these two different modes.

More specifically, when the orthogonal transform circuit 3 is in the eight-by-eight orthogonal transform mode, then the input data buffer 33 enters the eight pixels-based pixel data into each of the MAC operation circuits "$34a$" to "$34h$".

The MAC operation circuits "$34a$" to "$34h$" executes the MAC operations in the eight-parallel manner.

When the orthogonal transform circuit 3 is in the four-by-four orthogonal transform mode, then the input data buffer 33 in receipt of the eight pixels-based pixel data enters the four pixels-based pixel data thereof into each of the MAC operation circuits "$34a$" to "$34d$", while feeding the remaining four pixels-based pixel data into each of the MAC operation circuits "$34e$" to "$34h$".

The MAC operation circuits "$34a$" to "$34d$" perform the MAC operations in the four-parallel manner. The MAC operation circuits "$34e$" to "$34h$" perform the MAC operations in the four-parallel manner. This means that the orthogonal transform circuit 3 executes the four-by-four orthogonal transformation in the two-parallel manner.

As a result, the orthogonal transform circuit 3 is activated the same number of times or rather once in order to execute the eight-by-eight orthogonal transformation on the pixel data throughout the eight pixels-by-eight lines-formed pixel block, and to perform the four-by-four orthogonal transformation on the pixel data on the four pixels-by-four lines-formed four pixel blocks that are obtained by dividing the eight pixels-by-eight lines-formed pixel block into four equal parts.

Accordingly, the orthogonal transform circuit 3 in both of the four-by-four and eight-by-eight orthogonal transform modes is possible to perform orthogonal transform operations on the eight pixels-by-eight lines-formed pixel block at the same latency.

As a result, the orthogonal transform circuit 3 can execute the four-by-four orthogonal transformation at improved processing speeds, and high-speed processing is achievable.

A prior art orthogonal transform circuit is activated to execute the four-by-four orthogonal transformation at latency four times as great as that involved when the prior art orthogonal transform practices the eight-by-eight orthogonal transformation. In particular, the prior art orthogonal transform circuit performs the four-by-four orthogonal transformation at objectionably reduced processing speeds.

Another feature of the present embodiment is that the same MAC operation circuits "$34a$" to "$34h$" are used when the orthogonal transform circuit 3 is in both of the eighth-by-eight and four-by-four orthogonal transform modes.

In other words, the same MAC operation circuits "$34a$" to "$34h$" are used when the orthogonal transform circuit 3 practices the eighth-by-eight orthogonal transformation and the four-by-four orthogonal transformation. This feature inhibits an increase in size of the orthogonal transform circuit 3.

A further feature of the present embodiment is that the only eight-by-eight and four-by-four orthogonal transform coefficient storage circuits 80, 81 are added to the orthogonal transform circuit 3. These two storage circuits 80, 81 are smaller in total area than a combination of an eight-by-eight orthogonal transform apparatus and a four-by-four orthogonal transform apparatus. As a result, the orthogonal transform circuit 3 having a small circuit area is realized.

A yet further feature of the present embodiment is that the pixel data can be entered into the orthogonal transform circuit 3 through the input data buffer 33 in accordance with the same data input sequence when the orthogonal transform circuit 3 is in both of the eight-by-eight and four-by-four orthogonal transform modes. This feature provides easy address control. More specifically, in the eight-by-eight and four-by-four orthogonal transform modes, the data can be fed into the orthogonal transform circuit 3 in accordance with any one of the data input sequences as illustrated in FIG. 5.

Next, a variation of the orthogonal transform circuit 3 according to the present embodiment is described.

Figure 9:
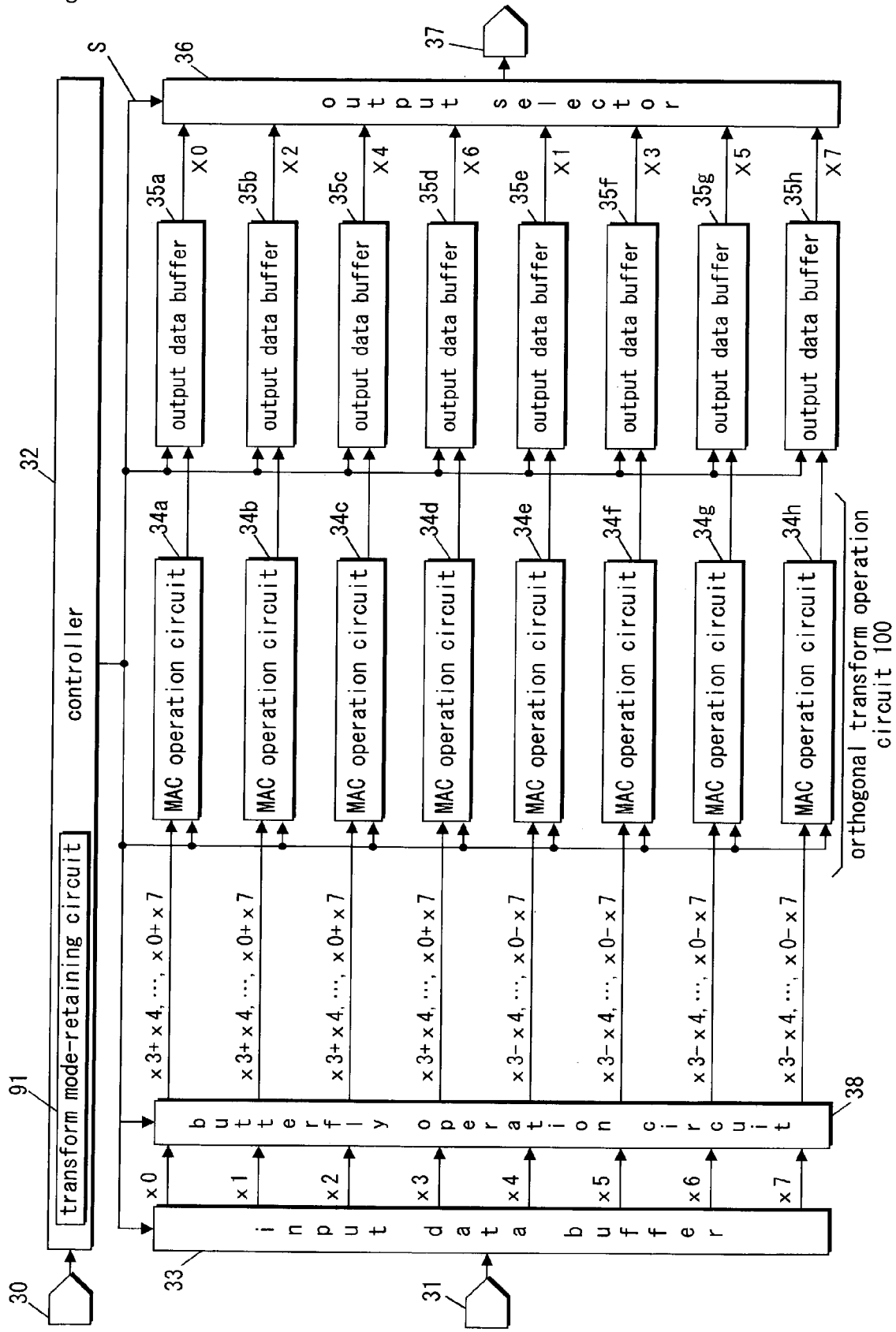
FIG. 9 is a block diagram, illustrating an exemplary variation of the orthogonal transform circuit.

FIG. 9 is a block diagram, illustrating an exemplary variation of the orthogonal transform circuit 3. In FIG. 9, the components similar to those of FIG. 4 are identified by the same reference characters, and descriptions related thereto are omitted.

The variation of FIG. 9 is characterized by a butterfly operation circuit 38, which is added to the orthogonal transform circuit 3 of FIG. 4. The butterfly operation circuit 38 is disposed between the input data buffer 33 and the MAC operation circuits "34a" to "34h".

The butterfly operation circuit 38 performs butterfly arithmetic operations on eight pieces of data in a four-parallel manner in accordance with a high-speed algorism. This step is now described in detail.

(ME3) can be transformed into (ME7) using the high-speed algorism.

[ME7]

$$\begin{bmatrix} X_0 \\ X_2 \\ X_4 \\ X_6 \end{bmatrix} = \frac{1}{2} \begin{bmatrix} A & A & A & A \\ B & C & -C & -B \\ A & -A & -A & A \\ C & -B & B & -C \end{bmatrix} \begin{bmatrix} x_0 + x_7 \\ x_1 + x_6 \\ x_2 + x_5 \\ x_3 + x_4 \end{bmatrix}$$

$$\begin{bmatrix} X_1 \\ X_3 \\ X_5 \\ X_7 \end{bmatrix} = \frac{1}{2} \begin{bmatrix} D & E & F & G \\ E & -G & -D & -F \\ F & -D & G & E \\ G & -F & E & -D \end{bmatrix} \begin{bmatrix} x_0 - x_7 \\ x_1 - x_6 \\ x_2 - x_5 \\ x_3 - x_4 \end{bmatrix}$$

In (ME7), arithmetic operations such as "x0±x7", "x1±x6", "x2±x5", and "x3±x4" are called the butterfly arithmetic operations.

An eight-by-eight orthogonal transform coefficient storage circuit 80 according to the variation is now described with reference to (ME7).

In the MAC operation circuit "34a", the eight-by-eight orthogonal transform coefficient storage circuit 80 stores coefficient data on the first row of a four row-by-four column matrix in an upper half of a determinant as illustrated by (ME7).

In the MAC operation circuit "34b", the eight-by-eight orthogonal transform coefficient storage circuit 80 stores coefficient data on the second row of the four row-by-four column matrix in the upper half of the determinant as illustrated by (ME7).

In the MAC operation circuit "34c", the eight-by-eight orthogonal transform coefficient storage circuit 80 stores coefficient data on the third row of the four row-by-four column matrix in the upper half of the determinant as illustrated by (ME7).

In the MAC operation circuit "34d", the eight-by-eight orthogonal transform coefficient storage circuit 80 stores coefficient data on the fourth row of the four row-by-four column matrix in the upper half of the determinant as illustrated by (ME7).

In the MAC operation circuit "34e", the eight-by-eight orthogonal transform coefficient storage circuit 80 stores coefficient data on the first row of the four row-by-four column matrix in a lower half of the determinant as illustrated by (ME7).

In the MAC operation circuit "34f", the eight-by-eight orthogonal transform coefficient storage circuit 80 stores coefficient data on the second row of the four row-by-four column matrix in the lower half of the determinant as illustrated by (ME7).

In the MAC operation circuit "34g", the eight-by-eight orthogonal transform coefficient storage circuit 80 stores coefficient data on the third row of the four row-by-four column matrix in the lower half of the determinant as illustrated by (ME7).

In the MAC operation circuit "34h", the eight-by-eight orthogonal transform coefficient storage circuit 80 stores coefficient data on the fourth row of the four row-by-four column matrix in the lower half of the determinant as illustrated by (ME7).

The following discusses the buttery arithmetic operations using the butterfly operation circuit 38 with reference to (ME7).

According to the present variation, the butterfly operation circuit 38 practices the butterfly arithmetic operations when the orthogonal transform circuit 3 assumes the eight-by-eight orthogonal transform mode. Therefore, the processing in the eight-by-eight orthogonal transform mode is now described.

The orthogonal transform circuit 3 is set into the eight-by-eight orthogonal transform mode. Upon the start of the processing, eight pixels-based pixel data "x0" to "x7" are entered for each pixel into the orthogonal transform circuit 3 through the input port 31.

The input data buffer 33 tentatively stores the entered pixel data until all of the eight pixels-based pixel data "x0" to "x7" reach the input data buffer 33.

The input data buffer 33 feeds the eight pixels-based pixel data "x0" to "x7" into the butterfly operation circuit 38.

The butterfly operation circuit 38 performs the butterfly arithmetic operations. The butterfly operation circuit 38 selectively feeds a series of added data {x0+x7, x1+x6, x2+x5, and x3+x4} from the results of the butterfly arithmetic operations into each of the MAC operation circuits "34a" to "34d".

At the same time, the butterfly operation circuit 38 feeds the remaining series of subtracted data {x0−x7, x1−x6, x2−x5, and x3−x4} into each of the MAC operation circuits "34e" to "34h".

In each of the MAC operation circuits "34a" to "34h", the eight-by-eight orthogonal transform coefficient storage circuit 80 is selected.

For example, the MAC operation circuit "34a" practices the MAC operations using the four pieces of added data {x0+x7, x1+x6, x2+x5, and x3+x4} and four pieces of coefficient data "(½) A" to "(½) A", thereby producing orthogonal transform coefficient data "X0".

Similarly, the remaining MAC operation circuits "34b" to "34h" practices the MAC operations, thereby producing the orthogonal transform coefficient data "X2", "X4", "X6", "X1", "X3", "X5", and "X7".

The MAC operation circuits "34a" to "34h" execute the MAC operations in an eight-parallel manner.

In the four-by-four orthogonal transform mode, the butterfly operation circuit 38 practices no butterfly arithmetic operation. Accordingly, the pixel data are simply passed through the butterfly operation circuit 38.

As described above, the use of the butterfly operation circuit 38 provides an eight-by-eight orthogonal transform operation at high speeds.

The present embodiment illustrates the orthogonal transform circuit 3 designed for both of the eight-by-eight and four-by-four orthogonal transform modes. Alternatively, the present invention is applicable to an orthogonal transform circuit operable to assume an N-by-N orthogonal transform mode and an N/2-by-N/2 orthogonal transform mode, where N is equal to 2x (x is an exponent).

The orthogonal transform circuit 3 according to the present embodiment and the variation thereof can be realized using software. Therefore, the present invention is not limited to being applicable to hardware.

Similarly, the encoding apparatus according to the present embodiment is achievable using both of the hardware and software.

(Embodiment 2)

Figure 10:
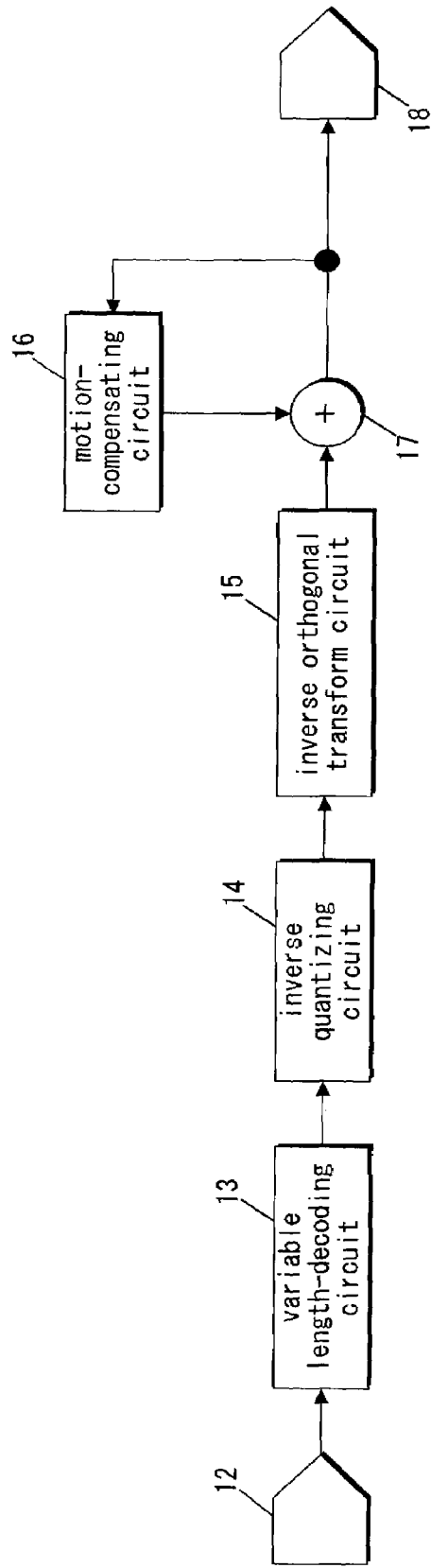
FIG. 10 is a block diagram, illustrating an exemplary decoding apparatus according to a second embodiment of the present invention.

FIG. 10 is a block diagram, illustrating an exemplary decoding apparatus according to a second embodiment. As illustrated in FIG. 10, the decoding apparatus includes an input port 12, a variable length-decoding circuit 13, an inverse quantizing circuit 14, an inverse orthogonal transform circuit 15, an addition circuit 17, a motion-compensating circuit 16, and an output port 18.

The variable length-decoding circuit 13 practices the variable-length decoding of encoded data that are entered into the decoding apparatus through the input port 12. As a result, the variable length-decoding circuit 13 produces quantized data.

The inverse quantizing circuit 14 inversely quantizes the quantized data, thereby producing orthogonal transform coefficient data.

The inverse orthogonal transform circuit 15 inversely orthogonally transforms the produced orthogonal transform coefficient data, thereby generating pixel data. The pixel data are sent to the addition circuit 17.

The addition circuit 17 adds predicted image data to the pixel data, thereby generating image data. The motion-compensating circuit 16 produces the predicted image data. The decoding apparatus according to the present embodiment receives encoded intra-images as well as encoded inter-images, and inversely orthogonally transforms these two types of encoded images.

An eight-by-eight inverse orthogonal transform mode is now described with reference to the drawings and mathematical expressions.

Figure 11:
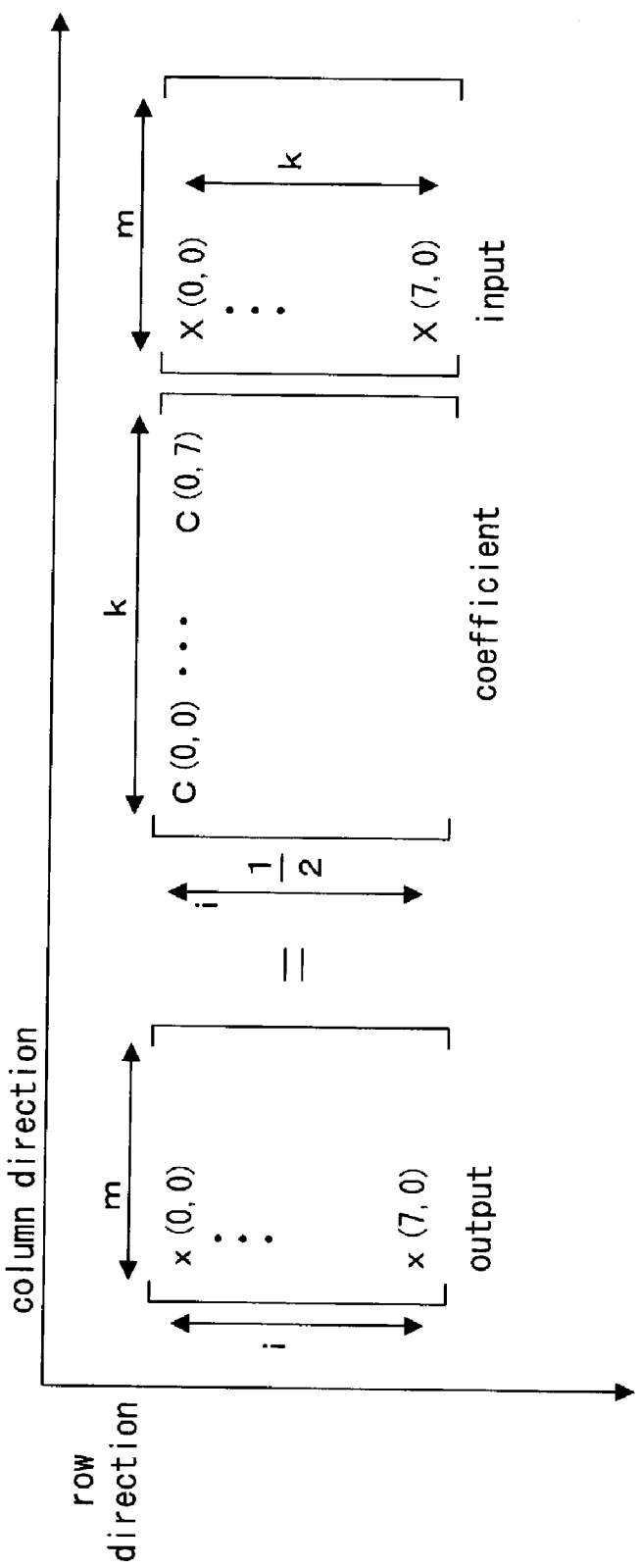
FIG. 11 is a descriptive illustration, showing exemplary processing in an eight-by-eight inverse orthogonal transform mode.

FIG. 11 is a descriptive illustration, showing an exemplary eight-by-eight inverse orthogonal transform mode.

As illustrated by an expressing given below, the inverse orthogonal transform circuit 15 in the eight-by-eight inverse orthogonal transform mode executes eight-by-eight inverse orthogonal transformation on an eight pixels-by-eight lines-formed block, i.e., a block that consists of a total of sixty-four pieces of orthogonal transform coefficient data.

[ME8]

[ME8] is now described with reference to FIG. 11. In (ME8), the character "k" denotes a cosine coefficient column and an input data (orthogonal transform coefficient data) row. The character "m" denotes an input data (orthogonal transform coefficient data) column and an output data (pixel data) column.

In (ME8), the character "i" denotes a cosine coefficient row and an output data (pixel data) row. The characters "x (i, m)" denote output data (pixel data). The characters "bki" denote a cosine coefficient. The characters "X (k, m)" denote input data (orthogonal transform coefficient data).

In (ME8), the characters "C (i, m)" denotes an coefficient, where "C" is $1/\sqrt{2}$ when "i" is equal to zero, and "C" is one when "i" is equal to one to seven. In FIG. 11, the character "C" represents "C (i, m) x bki" of (ME8).

The inverse orthogonal transform circuit 15 in the eight-by-eight inverse orthogonal transform mode performs the eight-by-eight inverse orthogonal transformation on the eight pixels-by-eight lines-formed block in accordance with (ME8).

At this time, as illustrated by an expression given below, the inverse orthogonal transform circuit 15 executes the eight-by-eight inverse orthogonal transformation on eight pieces of orthogonal transform coefficient data that correspond to eight pixels-based pixel data.

[ME9]

$$x(i, 0) = \frac{1}{2} C(i, 0) \sum_{k=0}^{7} b_{ki} X(k, 0)$$

$$i = 0, 1, \ldots, 7$$

(ME9) is substantially equivalent to (ME8) except for the character "m" replaced by zero in (ME8). The inverse orthogonal transform circuit 15 practices, in accordance with (ME9), the eight-by-eight inverse orthogonal transformation on the eight pieces of orthogonal transform coefficient data that correspond to the eight pixels-based pixel data, thereby producing the eight pixels-based pixel data.

The character "m" is replaced by numerals zero to seven, thereby providing sixty-four pixels-based pixel data.

(ME9) can be expressed by the following matrix:

[ME10]

$$\begin{bmatrix} x_0 \\ x_1 \\ x_2 \\ x_3 \\ x_4 \\ x_5 \\ x_6 \\ x_7 \end{bmatrix} = \frac{1}{2} \begin{bmatrix} A & D & B & E & A & F & C & G \\ A & E & C & -G & -A & -D & -B & -F \\ A & F & -C & -D & -A & G & B & E \\ A & G & -B & -F & A & E & -C & -D \\ A & -G & -B & F & A & -E & -C & D \\ A & -F & -C & D & -A & -G & B & -E \\ A & -E & C & G & -A & D & -B & F \\ A & -D & B & -E & A & -F & C & -G \end{bmatrix} \begin{bmatrix} X_0 \\ X_1 \\ X_2 \\ X_3 \\ X_4 \\ X_5 \\ X_6 \\ X_7 \end{bmatrix}$$

The characters "X0" to "X7" of (ME10) correspond to "X (0, 0)" to "X (7, 0)" of (ME9), respectively. The characters "x0" to "x7" of (ME10) correspond to "x (0, 0)" to "x (7, 0)" of (ME9), respectively. An eight row-by-eight column matrix as illustrated by (ME10) corresponds to the characters "C (i, 0) x bki" of (ME9).

Next, a four-by-four inverse orthogonal transform mode is described with reference to mathematical expressions. As illustrated by a mathematic expression given below, the inverse orthogonal transform circuit 15 in the four-by-four inverse orthogonal transform mode executes four-by-four inverse orthogonal transformation on four pixels-by-four lines-formed four blocks that are obtained by dividing the eight pixels-by-eight lines-formed block into four equal parts. Each of the four pixels-by-four lines-formed four blocks consists of sixteen pieces of orthogonal transform coefficient data.

[ME 11]

$$x(i, m) = \frac{1}{\sqrt{2}} C(i, m) \sum_{i=0}^{3} B_{ki} X(k, m)$$

$$i = 0, 1, 2, 3 \quad m = 0, 1, 2, 3$$

In [ME11], the character "k" denotes a cosine coefficient column and an input data (orthogonal transform coefficient data) row. The character "m" denotes an input data (orthogonal transform coefficient data) column and an output data (pixel data) column.

In (ME11), the character "i" denotes a cosine coefficient row and an output data (pixel data) row. The characters "x (i, m)" denote output data (pixel data). The characters "Bki" denote a cosine coefficient. The characters "X (k, m)" denote input data (orthogonal transform coefficient data).

In (ME11), the characters "C (i, m)" denotes an coefficient, where "C" is $1/\sqrt{2}$ when "i" is equal to zero, and "C" is one when "i" is equal to one, two, and three.

In the description of (ME11), the terms "row" and "column" are the same as those of FIG. 11.

The inverse orthogonal transform circuit 15 in the four-by-four inverse orthogonal transform mode performs the four-by-four inverse orthogonal transformation on the four pixels-by-four lines-formed four blocks in accordance with (ME11).

At this time, the inverse orthogonal transform circuit 15 executes the four-by-four inverse orthogonal transformation on four pieces of orthogonal transform coefficient data that correspond to four pixels-based pixel data, as illustrated by the following expression.

[ME12]

$$x(i, 0) = \frac{1}{\sqrt{2}} C(i, 0) \sum_{k=0}^{3} B_{ki} X(k, 0)$$

$$i = 0, 1, 2, 3$$

(ME12) is substantially equivalent to (ME11) except for the character "m" replaced by zero in (ME11). The inverse orthogonal transform circuit 15 practices, in accordance with (ME12), the four-by-four inverse orthogonal transformation on the four pieces of orthogonal transform coefficient data that correspond to the four pixels-based pixel data, thereby producing the four pixels-based pixel data.

The character "m" is replaced by numerals zero to three, thereby providing sixteen pixels-based pixel data.

(ME12) can be expressed by the following matrix:

[ME13]

$$\begin{bmatrix} x_0 \\ x_1 \\ x_2 \\ x_3 \end{bmatrix} = \frac{1}{\sqrt{2}} \begin{bmatrix} A & B & A & C \\ A & C & -A & -B \\ A & -C & -A & B \\ A & -B & A & -C \end{bmatrix} \begin{bmatrix} X_0 \\ X_1 \\ X_2 \\ X_3 \end{bmatrix}$$

The characters "X0" to "X3" of (ME13) correspond to "X (0, 0)" to "X (3, 0)" of (ME12), respectively. The characters "x0" to "x3" of (ME13) correspond to "x (0, 0)" to "x (3, 0)" of (ME12), respectively. An four row-by-four column matrix as illustrated by (ME13) corresponds to the characters "C (i, 0) x Bki" of (ME12).

The following discusses a specific structure of the inverse orthogonal transform circuit 15.

Figure 12:
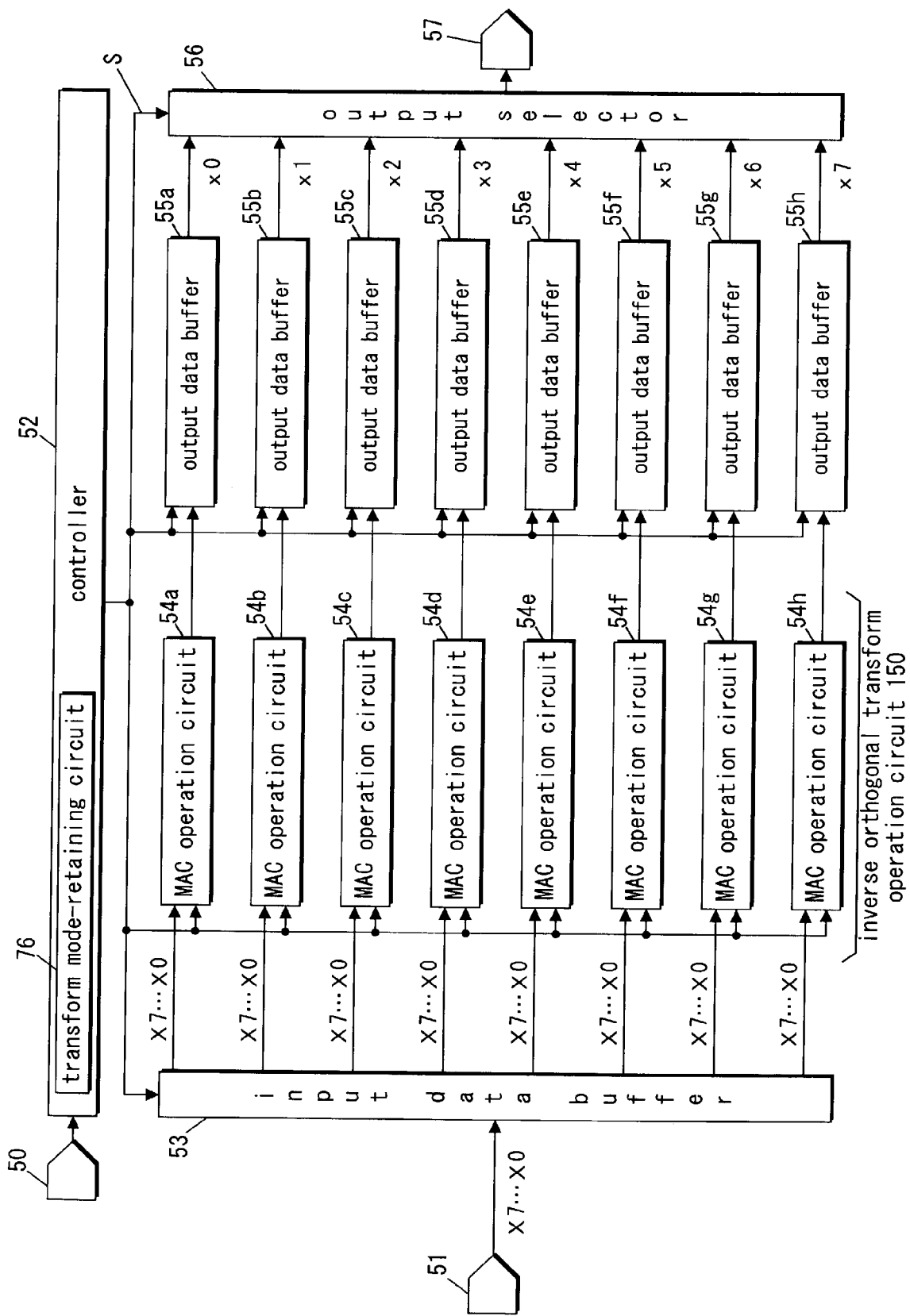
FIG. 12 is a block diagram, illustrating an exemplary inverse orthogonal transform circuit.

FIG. 12 is a block diagram, illustrating an exemplary orthogonal transform circuit 15 of FIG. 10. As illustrated in FIG. 12, the inverse orthogonal transform circuit 15 includes a mode-setting port 50, an input mode 51, a controller 52, an input data buffer 53, eight multiply-and-accumulation (MAC) operation circuits "54a" to "54h", eight output data buffers "55a" to "55h", an output data selector 56, and an output port 57.

The controller 52 includes a transform mode-retaining circuit 76.

The eight MAC operation circuits "54a" to "54h" form an inverse orthogonal transform operation circuit 150.

The following briefly describes how the circuits of FIG. 12 work. The controller 52 sets the inverse orthogonal transform circuit 15 into either the eight-by-eight or four-by-four transform mode. The controller 32 controls, using a control signal "S", the circuits that form the inverse orthogonal transform circuit 15.

The input data buffer 53 tentatively retains eight pieces of orthogonal transform coefficient data that are entered into the inverse orthogonal transform circuit 15 through the input port 51. The input data buffer 53 is, e.g., an input buffer.

Each of the MAC operation circuits "54a" to "54h" executes multiply-and-accumulation (MAC) operations on the eight pieces of orthogonal transform coefficient data from the input data buffer 53, thereby producing a piece of pixel data.

Each of the MAC operation circuits "54a" to "54h" is connected to corresponding one of the output data buffers "55a" to "55h". Each of the output data buffers "55a" to "55h" retains the pixel data from corresponding one of the MAC operation circuits "54a" to "54h".

The output data buffers "55a" to "55h" send the respective pieces of pixel data to the output data selector 56. The output data selector 56 selectively feeds the received pixel data into the output port 57.

The following describes details of the processing in the inverse orthogonal transform circuit 15. Assume that the inverse orthogonal transform circuit 15 in the eight-by-eight inverse orthogonal transform mode performs the eight-by-eight inverse orthogonal transformation on the eight pixels-by-eight lines-formed block.

A data input sequence in which the orthogonal transform coefficient data are entered in order into the inverse orthogonal transform circuit 15 is now described.

Pursuant to the present embodiment, the eight pixels-by-eight lines-formed pixel block in FIGS. 5(a) to 5(f) is assumed as the eight pixels-by-eight lines-formed block, i.e., a block that consists of the sixty-four pieces of orthogonal transform coefficient data.

In FIGS. 5(a) to 5(f), the orthogonal transform coefficient data are entered, one by one, into the inverse orthogonal transform circuit 15 through the input port 51, as illustrated by arrows of FIGS. 5(a) to 5(f).

The following assumes that the orthogonal transform coefficient data are entered into the inverse orthogonal transform circuit 15 in accordance with the data input sequence as illustrated in FIG. 5(d). The following describes the way in which the inverse orthogonal transform circuit 15 inversely orthogonally transforms the eight pieces of orthogonal transform coefficient data in accordance with (ME10).

The mode-setting port 50 receives a mode-instructing signal for setting the inverse orthogonal transform circuit 15 into an eight-by-eight inverse orthogonal transform mode.

In the controller 52, the transform mode-retaining circuit 76 sets the inverse orthogonal transform circuit 15 into the eight-by-eight inverse orthogonal transform mode in response to the entered mode-instructing signal.

The orthogonal transform coefficient data are entered, one by one, into the input port 51. The input data buffer 53 tentatively retains the entered orthogonal transform coefficient data until all of the orthogonal transform coefficient data "X0" to "X7" reach the input data buffer 53.

At this time, the orthogonal transform coefficient data are sequentially entered into the inverse orthogonal transform circuit 15 through the input port 51 in the order of "X0" to "X7".

When the eight pieces of orthogonal transform coefficient data "X0" to "X7" all reach the input data buffer 53, then the input data buffer 53 feeds them to each of the MAC operation circuits "54*a*" to "54*h*".

The MAC circuit "54*a*" performs multiply-and-accumulation using the sequentially entered eight pieces of orthogonal transform coefficient data "X0" to "X7" and eight pieces of eight-by-eight inverse orthogonal transformation-related coefficient data "(½) A" to "(½) G", thereby providing a series of added data. The MAC circuit "54*a*" feeds the series of added data into the output data buffer "55*a*". An easy understanding of the above step is realized by (ME10).

The ultimately added data is pixel data "x0". This will be described later in detail.

The output data buffer "55*a*" retains the ultimately added data or rather the pixel data "x0", and then feeds it into the output data selector 56. This step is also described later in detail.

The remaining MAC operation circuits "54*b*" to "54*h*" behave in a manner similar to the way in which the MAC operation circuit "54*a*" works. The remaining output data buffers "55*b*" to "55*h*" behave in a manner similar to the way in which the output data buffer "55*a*" works.

As a result, the MAC operation circuits "54*a*" to "54*h*" practice the multiply-and-accumulation in an eight-parallel manner, thereby producing a total of eight pieces of pixel data "x0" to "x7". The output data buffers "55*a*" to "55*h*" send the produced eight pieces of pixel data "x0" to "x7" to the output data selector 56.

The output data selector 56 selectively feeds the received eight pieces of pixel data "x0" to "x7" into the output port 57 in response to the control signal from the controller 52.

The pixel data "x0" to "x7" are, one by one, fed out of the output port 57 in the order in which the output data selector 56 selects them.

This step is repeated eight times that corresponds to eight columns of FIG. 5(*d*). As a result, the inverse orthogonal transform circuit 15 executes the eight-by-eight inverse orthogonal transformation on the eight pixels-by-eight lines-formed block, thereby producing a total of sixty-four pieces of pixel data.

Any one of the data input sequences as illustrated in FIGS. 5(*a*) to 5(*f*) similarly practices the multiply-and-accumulation in the eight-parallel manner, and provides the total of sixty-four pieces of pixel data.

The MAC operation circuits "54*a*" to "54*h*" and the output data buffers "55*a*" to "55*h*"as illustrated in FIG. 12 are now described in further detail.

Figure 13:
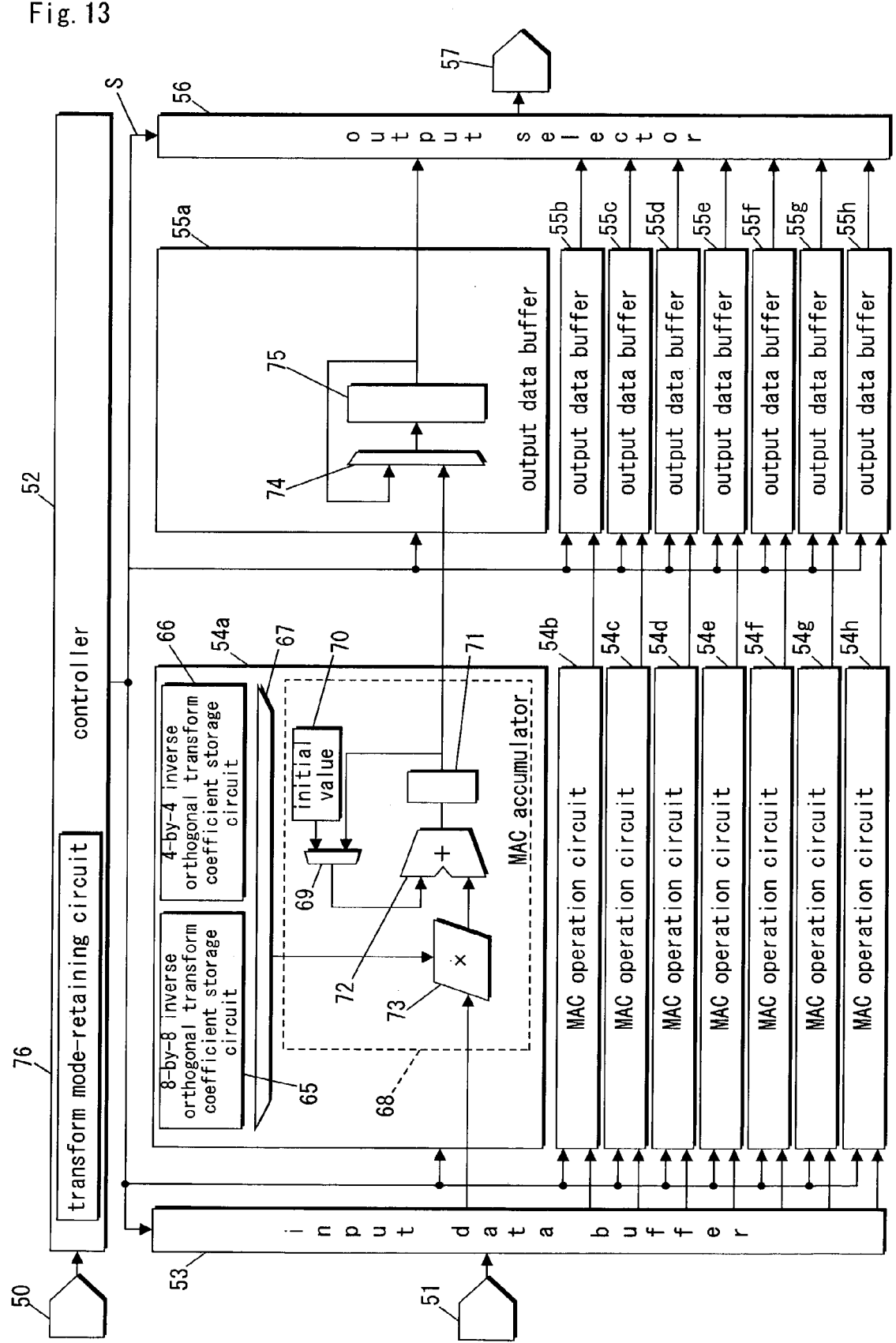
FIG. 13 is a descriptive illustration, showing details of an exemplary multiply-and-accumulation (MAC) operation circuit.

FIG. 13 is a detailed descriptive illustration, showing the exemplary MAC operation circuits "54*a*" to "54*h*" and the exemplary output data buffers "55*a*" to "55*h*". In FIG. 13, the same components as those of FIG. 12 are identified by the same reference characters, and therefore descriptions related thereto are omitted.

As illustrated in FIG. 13, the MAC operation circuit "54*a*" includes an eight-by-eight inverse orthogonal transform coefficient storage circuit 65, a four-by-four inverse orthogonal transform coefficient storage circuit 66, a selector 67, and a multiply-and-accumulation (MAC) accumulator 68.

The MAC accumulator 68 includes a multiplier 73, an adder 72, an initial value input circuit 70, a selector 69, and a register 71.

The MAC accumulator 68 performs multiply-and-accumulation as described later. The MAC accumulator 83 may be considered as an arithmetic operation block that is provided with a function of performing the multiply-and-accumulation.

Although not illustrated in the drawings, each of the other MAC operation circuits "54*b*" to "54*h*" includes the eight-by-eight inverse orthogonal transform coefficient storage circuit 65, the four-by-four inverse orthogonal transform coefficient storage circuit 66, the selector 67, and the MAC accumulator 68.

The eight-by-eight inverse orthogonal transform coefficient storage circuit 65 and the four-by-four inverse orthogonal transform coefficient storage circuit 66 are now described with reference to (ME10) and (ME13).

In the MAC operation circuit "54*a*", the eight-by-eight inverse orthogonal transform coefficient storage circuit 65 stores coefficient data on the first row of an eight row-by-eight column matrix as illustrated by (ME10), while the four-by-four inverse orthogonal transform coefficient storage circuit 66 stores coefficient data on the first row of a four row-by-four column matrix as illustrated by (ME13).

In the MAC operation circuit "54*b*", the eight-by-eight inverse orthogonal transform coefficient storage circuit 65 stores coefficient data on the second row of the eight row-by-eight column matrix as illustrated by (ME10), while the four-by-four inverse orthogonal transform coefficient storage circuit 66 stores coefficient data on the second row of the four row-by-four column matrix as illustrated by (ME13).

In the MAC operation circuit "54*c*", the eight-by-eight inverse orthogonal transform coefficient storage circuit 65 stores coefficient data on the third row of the eight row-by-eight column matrix as illustrated by (ME10), while the four-by-four inverse orthogonal transform coefficient storage circuit 66 stores coefficient data on the third row of the four row-by-four column matrix as illustrated by (ME13).

In the MAC operation circuit "54*d*", the eight-by-eight inverse orthogonal transform coefficient storage circuit 65 stores coefficient data on the fourth row of the eight row-by-eight column matrix as illustrated by (ME10), while the four-by-four inverse orthogonal transform coefficient storage circuit 66 stores coefficient data on the fourth row of the four row-by-four column matrix as illustrated by (ME13).

In the MAC operation circuit "54*e*", the eight-by-eight inverse orthogonal transform coefficient storage circuit 65 stores coefficient data on the fifth row of the eight row-by-eight column matrix as illustrated by (ME10), while the four-by-four inverse orthogonal transform coefficient storage circuit 66 stores coefficient data on the first row of the four row-by-four column matrix as illustrated by (ME13).

In the MAC operation circuit "54*f*", the eight-by-eight inverse orthogonal transform coefficient storage circuit 65 stores coefficient data on the sixth row of the eight row-by-eight column matrix as illustrated by (ME10), while the four-by-four inverse orthogonal transform coefficient storage circuit 66 stores coefficient data on the second row of the four row-by-four column matrix as illustrated by (ME13).

In the MAC operation circuit "54*g*", the eight-by-eight inverse orthogonal transform coefficient storage circuit 65 stores coefficient data on the seventh row of the eight row-by-eight column matrix as illustrated by (ME10), while the four-by-four inverse orthogonal transform coefficient storage circuit 66 stores coefficient data on the third row of the four row-by-four column matrix as illustrated by (ME13).

In the MAC operation circuit "54h", the eight-by-eight inverse orthogonal transform coefficient storage circuit 65 stores coefficient data on the eighth row of the eight row-by-eight column matrix as illustrated by (ME10), while the four-by-four inverse orthogonal transform coefficient storage circuit 66 stores coefficient data on the fourth row of the four row-by-four column matrix as illustrated by (ME13).

The selector 67 selects either the output from the eight-by-eight inverse orthogonal transform coefficient storage circuit 65 or that from the four-by-four inverse orthogonal transform coefficient storage circuit 66 in response to the control signal from the controller 52.

More specifically, the selector 67 selects the eight-by-eight inverse orthogonal transform coefficient storage circuit 65 when the inverse orthogonal transform circuit 15 assumes the eight-by-eight inverse orthogonal transform mode. The selector 67 selects the four-by-four inverse orthogonal transform coefficient storage circuit 66 when the inverse orthogonal transform circuit 15 assumes-the four-by-four inverse orthogonal transform mode.

As illustrated in FIG. 13, the output data buffer "55a" includes a selector 74 and a register 75.

Although not illustrated, each of the remaining output data buffers "55b" to "55h" also includes the selector 74 and the register 75.

The following discusses in further detail how the MAC operation circuit "54a" and the output data buffer "55a" work.

Assume that the inverse orthogonal transform circuit 15 is set into the eight-by-eight inverse orthogonal transform mode, that the orthogonal transform coefficient data are entered into the inverse orthogonal transform circuit 15 in the data input sequence of FIG. 5(d), and that the inverse orthogonal transform circuit 15 practices the eight-by-eight orthogonal transformation on the eight pieces of the orthogonal transform coefficient data "X0" to "X7" in accordance with (ME10). In each of the MAC operation circuits "54a" to "54h", the eight-by-eight inverse orthogonal transform coefficient storage circuit 65 contains coefficient data on a corresponding row of the eight row-by-eight column matrix illustrated by (ME10).

When the inverse orthogonal transform circuit 15 is set into the eight-by-eight inverse orthogonal transform mode, then the selector 67 selects the eight-by-eight inverse orthogonal transform coefficient storage circuit 65 in response to the control signal from the controller 52 of FIG. 13. The eight-by-eight inverse orthogonal transform coefficient storage circuit 65 contains the eight pieces of coefficient data "(½) A" to "(½) G". The selector 67 sequentially feeds the eight pieces of coefficient data "(½) A" to "(½) G" into the multiplier 73 from the eight-by-eight inverse orthogonal transform coefficient storage circuit 65.

Meanwhile, the input data buffer 53 enters the orthogonal transform coefficient data "X0" to "X7" in sequence into the multiplier 73.

The multiplier 73 multiplies the sequentially entered coefficient data "(½) A" to "(½) G" by the sequentially entered orthogonal transform coefficient data "X0" to "X7", thereby providing a series of multiplied data. The multiplier 73 feeds the series of multiplied data in sequence into the adder 72.

The selector 69 selects an initial value from the initial value input circuit 70 in response to the control signal from the controller 32 at the start of multiply-and-accumulation (MAC) operations.

As a result, the adder 72 receives the initial value when the first multiplied data is entered into the adder 72.

Accordingly, the adder 72 adds the first multiplied data and the initial value together at the start of the MAC operations, thereby providing first added data. The adder 72 feeds the first added data into the register 71.

The register 71 retains the first added data. The retained first added data is diverted into the output data buffer "55a" and the selector 69.

In this way, a subsequent series of added data are sequentially retained in the register 71. The selector 69 continues to select the subsequent series of added data from the register 71 until eight pieces of orthogonal transform coefficient data on the next row (see FIG. 5(d)) are started to experience the MAC operations. This means that the selector 69 selects an initial value for each gang of the eight pieces of orthogonal transform coefficient data.

The adder 72 sequentially adds the retained added data from the register 71 to the multiplied data from the multiplier 73, thereby providing a series of added data. The adder 72 sends the series of added data to the register 71. As a result, the multiplied data produced using the multiplier 73 are accumulated in the register 71.

The ultimately added data (the eighth added data) produced using the adder 72 is the pixel data "x0".

The series of added data sequentially entered into the register 71 is fed in sequence into the output data buffer "55a".

Each of the remaining MAC operation circuits "54b" to "54h" receives the eight pieces of orthogonal transform coefficient data "X0" to "X7", and behaves in a manner similar to the way in which the MAC operation circuit "54a" works. As a result, the remaining MAC operation circuits "54b" to "54h" produce the pixel data "x1" to "x7", respectively.

At this time, the MAC operation circuits "54a" to "54h" practice the MAC operations in an eight-parallel manner.

In the output data buffer "55a", the selector 74 selects, in response to the control signal from the controller 52, either the data retained in the register 75 or the added data entered from the MAC accumulator 68. The selector 74 feeds the selected data into the register 75.

More specifically, when the output data buffer "55a" receives the ultimately added data (the eighth added data) from the adder 72, then the selector 74 selects the ultimately added data. The register 75 retains the ultimately added data.

The selector 74 does not select the remaining seven pieces of added data, and the register 75 does not retain them.

This means that the register 75 retains only the pixel data. The retained pixel data is replaced by another piece of pixel data derived from subsequent eight pieces of orthogonal transform coefficient data, when the register 75 receives such replacement data.

The pixel data "x0" retained in the register 75 is sent to the output data selector 56.

The remaining output data buffers "55b" to "55h" work in a manner similar to the way in which the output data buffer "55a" behaves. The remaining output data buffers "55b" to "55h" send the respective pixel data "x1" to "x7" to the output data selector 56. The following discusses how the inverse orthogonal transform circuit 15 in the four-by-four inverse orthogonal transform mode practices the four-by-four inverse orthogonal transformation.

Figure 14:
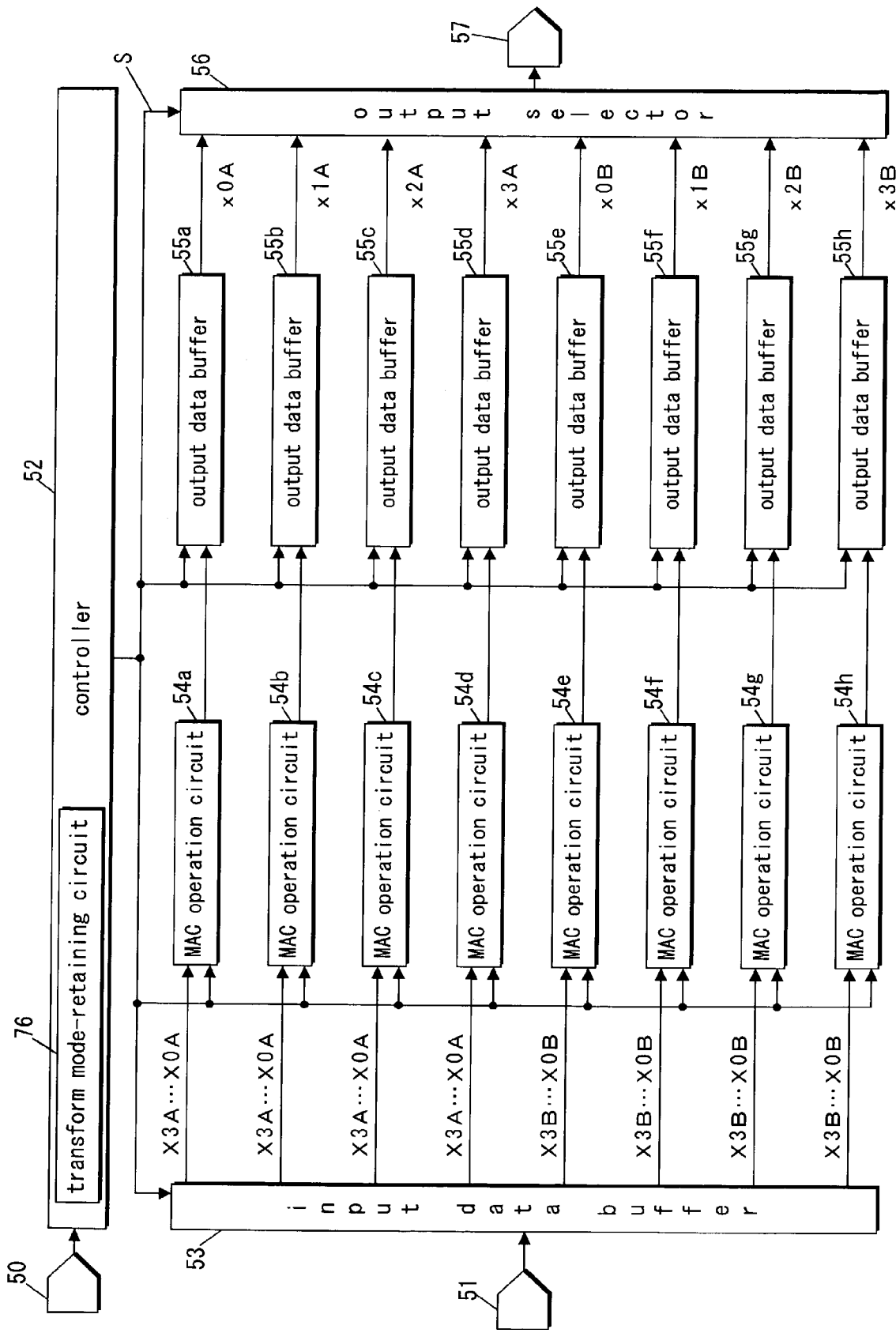
FIG. 14 is a descriptive illustration, showing exemplary processing in a four-by-four inverse orthogonal transform mode.

FIG. 14 is a descriptive illustration, showing exemplary processing in the inverse orthogonal transform circuit 15 of FIG. 10 in the four-by-four inverse orthogonal transform mode. In FIG. 14, the same components as those of FIG. 12 are identified by the same reference characters.

Similarly to the eight-by-eight inverse orthogonal transform mode, in the four-by-four inverse orthogonal transform mode, the orthogonal transform coefficient data are entered into the inverse orthogonal transform circuit 15 through the input port 51 in accordance with any one of the data input sequences as illustrated in FIGS. 5(*a*) to 5(*f*).

In the following discussion, assume that orthogonal transform coefficient data are entered into the inverse orthogonal transform circuit 15 in accordance with the data input sequence as illustrated by FIG. 5(*d*).

The mode-setting port 50 receives a mode-instructing signal for setting the inverse orthogonal transform circuit 15 into the four-by-four inverse orthogonal transform mode.

In the controller 52, the transform mode-retaining circuit 76 puts the orthogonal transform circuit 15 into the four-by-four inverse orthogonal transform mode in response to the mode-instructing signal.

Eight pieces of orthogonal transform coefficient data "X0A" to "X3A" and "X0B" to "X3B" are entered, one by one, into the inverse orthogonal transform coefficient circuit 15 through the input port 51. The input data buffer 33 tentatively retains the entered orthogonal transform coefficient data until all of the orthogonal transform coefficient data "X0A" to "X3A" and "X0B" to "X3B" reach the input data buffer 53.

At this time, the orthogonal transform coefficient data are entered into the inverse orthogonal transform coefficient circuit 15 through the input port 51 in the order of "X0A", "X1A", "X2A", "X3A", "X0B", "X1B", "X2B", and "X3B".

When all of the orthogonal transform coefficient data "X0A" to "X3B" reach the input data buffer 53, then the input data buffer 53 enters a first half of the eight pieces of orthogonal transform coefficient data, i.e., "X0A" to "X3A", into each of the MAC operation circuits "54*a*" to "54*d*". At the same time, the input data buffer 53 enters a second half of the eight pieces of orthogonal transform coefficient data, i.e., "X0B" to "X3B", into each of the MAC operation circuits "54*e*" to "54*h*".

The MAC operation circuits "54*a*" to "54*d*" perform the MAC operations in a four-parallel manner. At the same time, the remaining MAC operation circuits "54*e*" to "54*h*" perform the MAC operations in the four-parallel manner. This means that the inverse orthogonal transform circuit 15 practices the four-by-four orthogonal transformation in a two-parallel manner.

The following focuses on the MAC operation circuit "54*a*". Assume that the orthogonal transform circuit 15 executes the four-by-four orthogonal transformation in accordance with (ME13). The characters "x0" to "x3" of (ME13) correspond to "x0A" to "x3A" of FIG. 14, respectively. The characters "X0" to "X3" of (ME13) correspond to "X0A" to "X3A" of FIG. 14, respectively.

The MAC operation circuit "54*a*" performs multiply-and-accumulation using the sequentially entered four pieces of orthogonal transform coefficient data "X0A" to "X3A" and four pieces of four-by-four inverse orthogonal transformation-related coefficient data "$(1/\sqrt{2})$ A" to "$(1/\sqrt{2})$ C", thereby providing a series of added data. The MAC circuit "34*a*" feeds the series of added data into the output data buffer "55*a*". An easy understanding of this step is realized by (ME13).

The ultimately added data is orthogonal transfer coefficient data "x0A". This will be described later in detail.

The output data buffer "55*a*" retains the ultimately added data or rather the orthogonal transform coefficient data "x0A", and then feeds it into the output data selector 56. This step is also described later in detail.

The remaining MAC operation circuits "54*b*" to "54*d*" work in a manner similar to the way in which the MAC operation circuit "54*a*" behaves. The remaining output data buffers "55*b*" to "55*d*" work in a manner similar to the way in which the output data buffer "55*a*" behaves.

As a result, the MAC operation circuits "54*a*" to "54*d*", each of which is in receipt of the four pieces of orthogonal transform coefficient data "X0A" to "X3A", practice the multiply-and-accumulation in the four-parallel manner, thereby producing four pieces of pixel data "x0A" to "x3A", respectively.

The following focuses on the MAC operation circuit "54*e*". Assume that the orthogonal transform circuit 15 practices the four-by-four inverse orthogonal transformation in accordance with (ME13). The characters "x0" to "x3" of (ME13) correspond to the characters "x0B" to "x3B" of FIG. 14, respectively. The characters "X0" to "X3" of (ME13) correspond to those "X0B" to "X3B" of FIG. 14, respectively.

The MAC operation circuit "34*e*" performs multiply-and-accumulation using the sequentially entered four pieces of orthogonal transform coefficient data "X0B" to "X3B" and four pieces of four-by-four inverse orthogonal transformation-related coefficient data "$(1/\sqrt{2})$ A" to "$(1/\sqrt{2})$ C", thereby providing a series of added data. The MAC operation circuit "34*e*" feeds the series of added data into the output data buffer "55*e*". An easy understanding of this step is realized by (ME13).

The ultimately added data is orthogonal transfer coefficient data "x0B". This will be described later in detail.

The output data buffer "55*e*" retains the ultimately added data or rather the orthogonal transform coefficient data "x0B", and then feeds it into the output data selector 56. This step is also described later in detail.

The remaining MAC operation circuits "54*f*" to "54*h*" work in a manner similar to the way in which the MAC operation circuit "54*e*" behaves. The remaining output data buffers "55*f*" to "55*h*" work in a manner similar to the way in which the output data buffer "55*e*" behaves.

As a result, the MAC operation circuits "54*e*" to "54*h*", each of which is in receipt of the four pieces of orthogonal transform coefficient data "X0B" to "X3B", practice the multiply-and-accumulation in the four-parallel manner, thereby producing four pieces of pixel data "x0B" to "x3B", respectively.

The output data buffers "55*a*" to "55*h*" feed the respective eight pixel data "x0A" to "x3B" into the output data selector 56. The output data selector 56 selectively feeds the received eight pieces of pixel data "x0A" to "x3B" into the output port 57 in response to the control signal from the controller 32.

The pixel data "x0A" to "x3B" are, one by one, fed out of the output port 57 in the order in which the output data selector 56 selects them.

The above step is repeated eight times that correspond to four columns of FIG. 5(*d*). As a result, the inverse orthogonal transform circuit 15 executes the four-by-four inverse orthogonal transformation on the four pixels-by-four lines-formed two blocks. Subsequently, a similar step is repeated four times that correspond to further four columns of FIG. 5(*d*). As a result, the inverse orthogonal transform circuit 15 practices the four-by-four inverse orthogonal transformation on the remaining four pixels-by-four lines-formed two blocks.

Consequently, the inverse orthogonal transform circuit 15 performs the four-by-four inverse orthogonal transformation on the four pixels-by-four lines-formed four blocks that are obtained by dividing the eight pixels-by-eight lines-formed bock into four equal parts. As a result, a total of sixty-four pieces of pixel data are produced.

Any one of the data input sequences as illustrated in FIGS. 5(*a*) to 5(*f*) similarly conducts the four-by-four inverse orthogonal transformation in the two-parallel manner, and provides the sixty-four pieces of pixel data.

The following describes in further detail with reference to FIG. 13 how the MAC operation circuits "54*a*" and the output data buffers "55*a*" work.

Assume that the inverse orthogonal transform circuit 15 is set into the four-by-four orthogonal transform mode, that the orthogonal transform coefficient data are entered into the inverse orthogonal transform circuit 15 in accordance with the data input sequence as illustrated in FIG. 5(*d*), and that the inverse orthogonal transform circuit 15 practices the four-by-four orthogonal transformation on the four pieces of orthogonal transform coefficient data "X0A" to "X3A" in accordance with (ME13).

In each of the MAC operation circuits "54*a*" to "54*d*", the four-by-four inverse orthogonal transform coefficient storage circuit 66 contains coefficient data on a corresponding row of the four row-by-four column matrix as illustrated by (ME13).

When the inverse orthogonal transform circuit 15 is set into the four-by-four orthogonal transform mode, then the selector 67 selects the four-by-four inverse orthogonal transform coefficient storage circuit 66 in response to the control signal from the controller 32 of FIG. 13. The four-by-four inverse orthogonal transform coefficient storage circuit 66 contains the four pieces of coefficient data "(1/$\sqrt{2}$) A" to "(1/$\sqrt{2}$) C". The selector 67 sequentially feeds the four pieces of coefficient data "(1/$\sqrt{2}$) A" to "(1/$\sqrt{2}$) C" into the multiplier 73 from the four-by-four inverse orthogonal transform coefficient storage circuit 66.

Meanwhile, the input data buffer 53 enters the orthogonal transform coefficient data "X0A" to "X3A" into the multiplier 73.

The multiplier 73 multiplies the sequentially entered coefficient data "(1/$\sqrt{2}$) A" to "(1/$\sqrt{2}$) C" by the sequentially entered pixel data "X0A" to "X3A", thereby providing a series of multiplied data. The multiplier 73 feeds the series of multiplied data in sequence into the adder 72.

The selector 69 selects an initial value from the initial value input circuit 70 in response to the control signal from the controller 52 at the start of the MAC operations.

As a result, the adder 72 receives the initial value when first multiplied data is entered into the adder 72.

Accordingly, the adder 72 adds the first multiplied data and the initial value together at the start of the MAC operations, thereby providing first added data. The adder 72 feeds the first added data into the register 71.

The register 71 retains the first added data. The retained first added data is diverted into the output data buffer "55*a*" and the selector 69.

In this way, a subsequent series of added data are sequentially retained in the register 71. The selector 69 continues to select the subsequent series of added data from the register 71 until four pieces of orthogonal transform coefficient data on the next row (see FIG. 5(*d*)) are started to experience the MAC operations. This means that the selector 69 selects an initial value for each gang of the four pieces of orthogonal transform coefficient data.

The adder 72 sequentially adds the retained added data from the register 71 to the multiplied data from the multiplier 73, thereby providing a series of added data. The adder 72 sends the series of added data to the register 71. As a result, the multiplied data produced using the multiplier 73 are accumulated in the register 71.

The ultimately added data (the fourth added data) produced using the adder 72 is the orthogonal transform coefficient "x0A".

The series of added data sequentially entered into the register 71 is fed in sequence into the output data buffer "55*a*".

Each of the remaining MAC operation circuits "54*b*" to "54*d*" receives the four pieces of orthogonal transform coefficient data "X0A" to "X3A", and behaves in a manner similar to the way in which the MAC operation circuit "54*a*" works. As a result, the remaining MAC operation circuits "54*b*" to "54*d*" produce pixel data "x1A" to "x3A", respectively.

At this time, the MAC operation circuits "54*a*" to "54*d*" practice the MAC operations in the four-parallel manner.

In the output data buffer "55*a*", the selector 74 selects, in response to the control signal from the controller 52, either the data retained in the register 75 or the added data entered from the MAC accumulator 68. The selector 74 feeds the selected data into the register 75.

More specifically, when the output data buffer "55*a*" receives the ultimately added data (the fourth added data) from the adder 72, then the selector 74 selects the ultimately added data. The register 75 retains the ultimately added data.

The selector 74 does not select the remaining three pieces of added data. The register 75 does not retain them.

This means that the register 75 retains only the pixel data. The retained pixel data is replaced by another piece of pixel data derived from the next four pieces of orthogonal transform coefficient data, when the register 75 receives such replacement data.

The pixel data "x0A" retained in the register 75 is sent to the output data selector 56.

The remaining output data buffers "55*b*" to "55*d*" work in a manner similar to the way in which the output data buffer "55*a*" behaves, and send the respective pixel data "x1A" to "x3A" to the output data selector 56.

Similarly to the eight-by-eight inverse orthogonal transform mode, in the four-by-four inverse orthogonal transform mode, the MAC operation circuits "54*e*" to "54*h*" and the output data buffers "55" to "55*h*" are similar in detailed behavior to the MAC operation circuit "54*a*" and that of output data buffer "55*a*".

A flow of processing using the inverse orthogonal transform circuit 15 of FIG. 10 is now described with reference to FIGS. 12 and 14, and a flowchart of FIG. 15.

Figure 15:
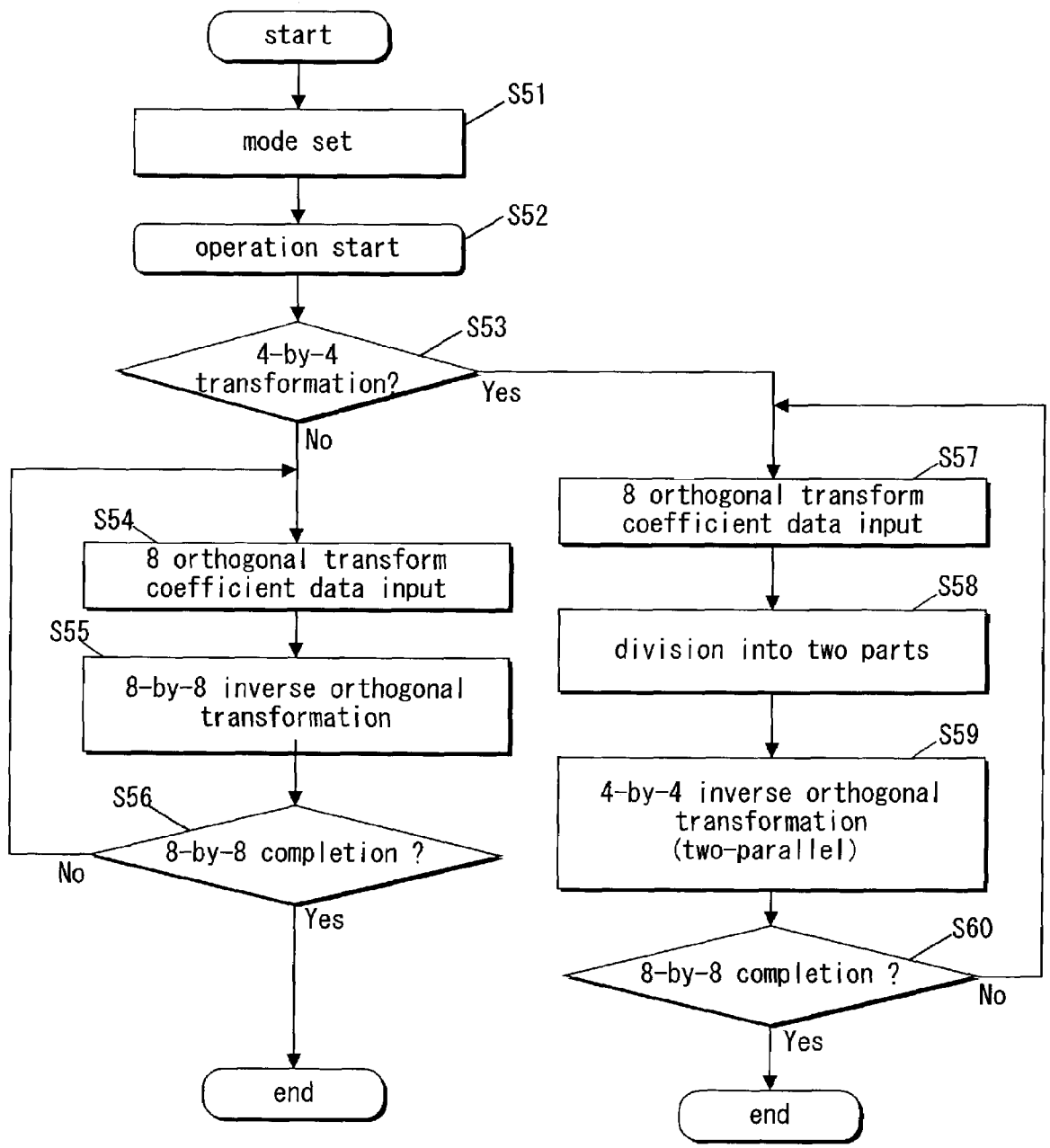
FIG. 15 is a flowchart, illustrating an exemplary flow of processing in the inverse orthogonal transform circuit.

FIG. 15 is the flowchart, illustrating exemplary processing in the orthogonal transform circuit 15 of FIG. 10.

At step S51, a mode-instructing signal is entered into the mode-setting port 30. The controller 52 sets the inverse orthogonal transform circuit 15 into either the eight-by-eight or four-by-four inverse orthogonal transform mode in response to the mode-instructing signal.

Assume that the inverse orthogonal transform circuit 3 is in the eight-by-eight inverse orthogonal transform mode. At step S51, the orthogonal transform circuit 15 is set into the eight-by-eight orthogonal transform mode. At step S52, the orthogonal transform circuit 15 starts arithmetic operations.

At step S53, the routine is advanced to step S54 because the inverse orthogonal transform circuit 15 assumes the eight-by-eight orthogonal transform mode.

At step S54, the eight pieces of orthogonal transform coefficient data are entered into the input data buffer 53 through the input port 51.

The input data buffer 53 feeds the entered eight pieces of orthogonal transform coefficient data into each of the MAC operation circuits "54a" to "54h".

At step S55, the MAC operation circuits "54a" to "54h" perform the MAC operations in the eight-parallel manner using the eight pieces of orthogonal transform coefficient data and eight pieces of eight-by-eight inverse orthogonal transformation-related coefficient data. This means that the orthogonal transform circuit 15 performs the eight-by-eight inverse orthogonal transformation on the eight pieces of orthogonal transform coefficient data.

The eight-by-eight inverse orthogonal transformation on the eight pieces of orthogonal transform coefficient data is executed on the eight pixels-by-eight lines-formed block.

At step S56, the routine is retuned to step S54 when the inverse orthogonal transform circuit 15 is still executing the eight-by-eight inverse orthogonal transformation on the eight pixels-by-eight lines-formed block in step S55.

At step S56, the inverse orthogonal transform circuit 15 terminates the processing when the eight-by-eight orthogonal inverse transformation on the eight pixels-by-eight lines-formed block in step S55 is completed. As a result, the eight-by-eight inverse orthogonal transformation provides a total of sixty-four pieces of pixel data.

Assume that the inverse orthogonal transform circuit 15 is in the four-by-four inverse orthogonal transform mode. At step S51, the inverse orthogonal transform circuit 15 is set into the four-by-four inverse orthogonal transform mode. At step S52, the inverse orthogonal transform circuit 15 starts arithmetic operations.

At step S53, the routine is advanced to step S57 because the inverse orthogonal transform circuit 15 assumes the four-by-four inverse orthogonal transform mode.

At step S57, the eight pieces of orthogonal transform coefficient data are entered into the input data buffer 53 through the input port 51.

At step S58, the input data buffer 53 feeds a first half of the entered eight pieces of orthogonal transform coefficient data into each of the MAC operation circuits "54a" to "54d", while feeding a second half of the entered eight pieces of orthogonal transform coefficient data into each of the MAC operation circuits "54e" to "54h". More specifically, the eight pieces of orthogonal transform coefficient data are divided into two equal parts, which are entered into the MAC operation circuits "54a" to "54h" in a manner just described above.

At step S59, the MAC operation circuits "54a" to "54d" practice the MAC operations in the four-parallel manner using the first half of the eight pieces of orthogonal transform coefficient data and the four pieces of four-by-four inverse orthogonal transformation-related coefficient data. At the same time, the MAC operation circuits "54e" to "54h" perform the MAC operations in the four-parallel manner using the second half of the eight pieces of orthogonal transform coefficient data and the four pieces of four-by-four inverse orthogonal transformation-related coefficient data.

This means that the orthogonal transform circuit 15 practices the four-by-four inverse orthogonal transformation on the four pieces of orthogonal transform coefficient data in the two-parallel manner.

At step S60, the routine is retuned to step S57 when the orthogonal transform circuit 15 is still practicing the four-by-four inverse orthogonal transformation on the eight pixels-by-eight lines-formed block in step S59.

At step S60, the orthogonal transform circuit 15 terminates the processing when the four-by-four inverse orthogonal transformation on the eight pixels-by-eight lines-formed block in step S59 is completed. As a result, the four-by-four inverse orthogonal transformation provides a total of sixty-four pieces of pixel data.

As described above, according to the present embodiment, the input data buffer 53 receives the same number of pieces of orthogonal transform coefficient data, i.e., the eight pieces of orthogonal transform coefficient data, in each of the eight-by-eight and four-by-four orthogonal transform modes, and enters the eight pieces of orthogonal transform coefficient data into each of the MAC operation circuits "54a" to "54h" in a manner suitable to each of the above two different modes.

More specifically, when the inverse orthogonal transform circuit 15 is in the eight-by-eight inverse orthogonal transform mode, then the input data buffer 53 enters the eight pieces of orthogonal transform coefficient data into each of the MAC operation circuits "54a" to "54h". The MAC operation circuits "54a" to "54h" perform the MAC operations in the eight-parallel manner.

When the inverse orthogonal transform circuit 15 is in the four-by-four inverse orthogonal transform mode, then the input data buffer 53 in receipt of the eight pieces of orthogonal transform coefficient data enters the four pieces thereof into each of the MAC operation circuits "54a" to "54d", while feeding the remaining four pieces thereof into each of the MAC operation circuits "54e" to "54h".

The MAC operation circuits "54a" to "54d" perform the MAC operations in the four-parallel manner. The MAC operation circuits "54e" to "54h" perform the MAC operations in the four-parallel manner. This means that the inverse orthogonal transform circuit 15 practices the four-by-four inverse orthogonal transformation in the two-parallel manner.

As a result, the inverse orthogonal transform circuit 15 is activated the same number of times, i.e., once when executing the eight-by-eight inverse orthogonal transformation on the orthogonal transform coefficient data throughout the eight pixels-by-eight lines-formed block and when performing the four-by-four orthogonal transformation on the orthogonal transform coefficient data throughout the four pixels-by-four lines-formed four blocks that are obtained by dividing the eight pixels-by-eight lines-formed block into four equal part.

Accordingly, the inverse orthogonal transform circuit 15 in both of the four-by-four and eight-by-eight orthogonal transform modes is able to practice the inverse orthogonal transform operation on the eight pixels-by-eight lines-formed block at the same latency.

As a result, the inverse orthogonal transform circuit 15 can practice the four-by-four inverse orthogonal transformation at improved processing speeds, and high-speed processing is achievable.

A prior art inverse orthogonal transform circuit is activated to practice the four-by-four inverse orthogonal transformation at latency four times as great as that involved when the prior art inverse orthogonal transform circuit performs the eight-by-eight inverse orthogonal transformation. In particular, the prior art inverse orthogonal transform circuit practices the four-by-four inverse orthogonal transformation at objectionably reduced processing speeds.

Another feature of the present embodiment is that the same MAC operation circuits "54a" to "54h" are used when the inverse orthogonal transform circuit 15 assumes both of the eighth-by-eight and four-by-four inverse orthogonal transform modes.

In other words, the same MAC operation circuits "54a" to "54h" are used when the orthogonal transform circuit 15 performs the eighth-by-eight inverse orthogonal transformation and the four-by-four inverse orthogonal transformation. This feature inhibits an increase in size of the inverse orthogonal transform circuit 15.

A further feature of the present embodiment is that only the eight-by-eight and four-by-four inverse orthogonal transform coefficient storage circuits 65, 66 are added to the inverse orthogonal transform circuit 15. These storage circuits 65, 66 are smaller in entire area than a combination of an eight-by-eight orthogonal transform apparatus and a four-by-four orthogonal transform apparatus. As a result, the inverse orthogonal transform circuit 15 having a small circuit area is realized.

A yet further feature of the present embodiment is that the data can be entered into the input data buffer 53 in accordance with the same data input sequence when the inverse orthogonal transform circuit 15 is in both of the eight-by-eight and four-by-four inverse orthogonal transform modes. This feature provides easy address control. More specifically, when the inverse orthogonal transform circuit 15 is in both of the eight-by-eight and four-by-four inverse orthogonal transform modes, then the data can be entered into the orthogonal transform circuit 15 in accordance with any one of the data input sequences as illustrated in FIG. 5.

Next, a variation of the inverse orthogonal transform circuit 15 according to the present embodiment is described.

Figure 16:
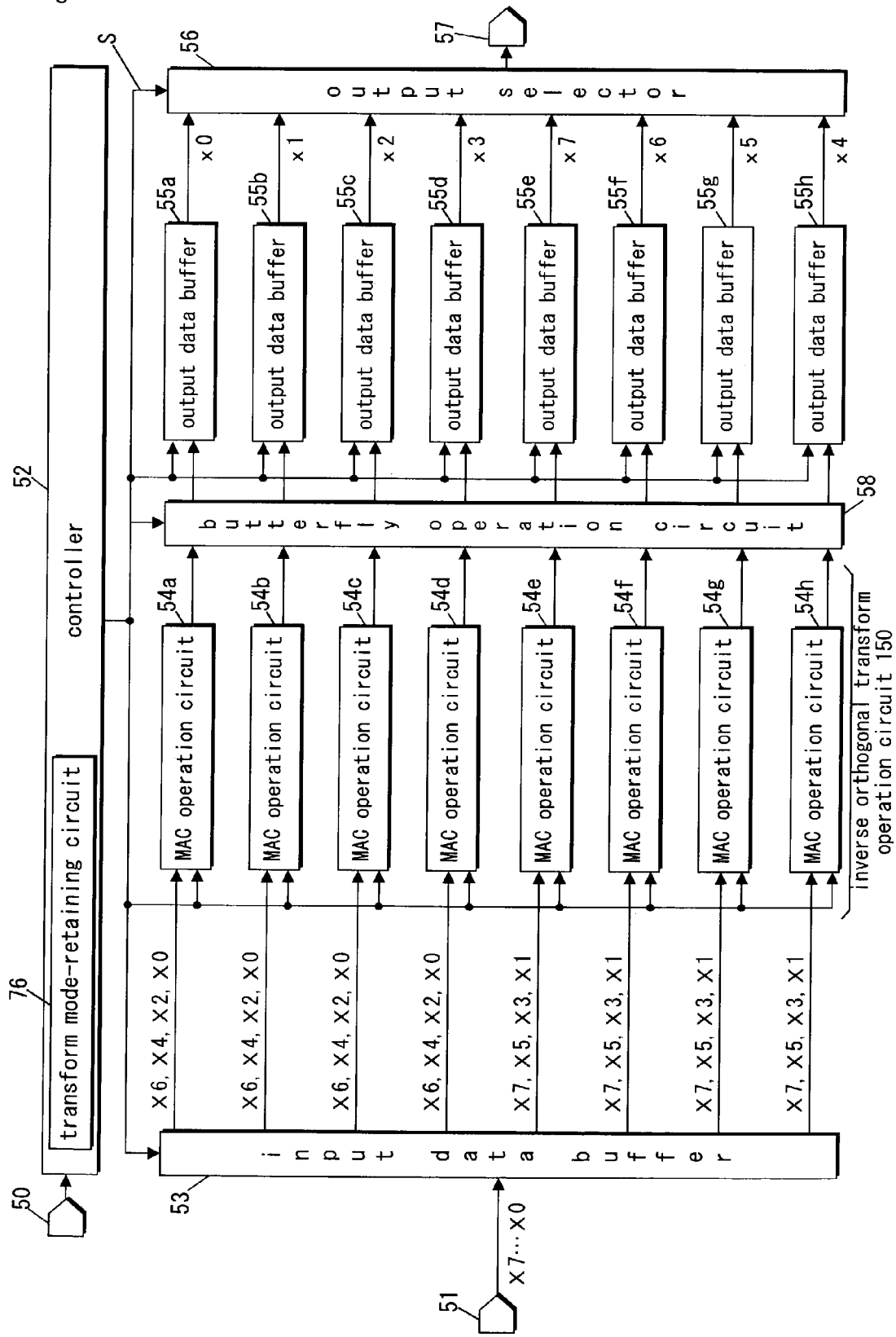
FIG. 16 is a block diagram, illustrating an exemplary variation of the inverse orthogonal transform circuit.

FIG. 16 is a block diagram, illustrating an exemplary variation of the inverse orthogonal transform circuit 15. In FIG. 16, the same components as those of FIG. 12 are identified by the same reference characters, and descriptions related thereto are omitted.

The variation of FIG. 16 is characterized by a butterfly operation circuit 58, which is added to the inverse orthogonal transform circuit 15 of FIG. 12. The butterfly operation circuit 58 is disposed between the MAC operation circuits "54a" to "54h" and the output data buffers "55a" to "55h".

The butterfly operation circuit 58 performs butterfly arithmetic operations on the data in accordance with a high-speed algorism. This step is now described in detail.

(ME10) can be transformed into (ME14) using the high-speed algorism.

[ME14]

$$\begin{bmatrix} x_0 \\ x_1 \\ x_2 \\ x_3 \end{bmatrix} = \frac{1}{2}\begin{bmatrix} A & B & A & C \\ A & C & -A & -B \\ A & -C & -A & B \\ A & -B & A & -C \end{bmatrix}\begin{bmatrix} X_0 \\ X_2 \\ X_4 \\ X_6 \end{bmatrix} + \frac{1}{2}\begin{bmatrix} D & E & F & G \\ E & -G & -D & -F \\ F & -D & G & E \\ G & -F & E & -D \end{bmatrix}\begin{bmatrix} X_1 \\ X_3 \\ X_5 \\ X_7 \end{bmatrix}$$

$$\begin{bmatrix} x_7 \\ x_6 \\ x_5 \\ x_4 \end{bmatrix} = \frac{1}{2}\begin{bmatrix} A & B & A & C \\ A & C & -A & -B \\ A & -C & -A & B \\ A & -B & A & -C \end{bmatrix}\begin{bmatrix} X_0 \\ X_2 \\ X_4 \\ X_6 \end{bmatrix} - \frac{1}{2}\begin{bmatrix} D & E & F & G \\ E & -G & -D & -F \\ F & -D & G & E \\ G & -F & E & -D \end{bmatrix}\begin{bmatrix} X_1 \\ X_3 \\ X_5 \\ X_7 \end{bmatrix}$$

An eight-by-eight inverse orthogonal transform coefficient storage circuit 65 according to the variation is now described with reference to (ME14).

In the MAC operation circuit "54a", the eight-by-eight inverse orthogonal transform coefficient storage circuit 65 stores coefficient data on the first row of a four row-by-four column matrix in an upper half of a determinant as illustrated by (ME14) on the first term thereof.

In the MAC operation circuit "54b", the eight-by-eight inverse orthogonal transform coefficient storage circuit 65 stores coefficient data on the second row of the four row-by-four column matrix in the upper half of the determinant as illustrated by (ME14) on the first term thereof.

In the MAC operation circuit "54c", the eight-by-eight inverse orthogonal transform coefficient storage circuit 65 stores coefficient data on the third row of the four row-by-four column matrix in the upper half of the determinant as illustrated by (ME14) on the first term thereof.

In the MAC operation circuit "54d", the eight-by-eight inverse orthogonal transform coefficient storage circuit 65 stores coefficient data on the fourth row of the four row-by-four column matrix in the upper half of the determinant as illustrated by (ME14) on the first term thereof.

In the MAC operation circuit "54e", the eight-by-eight inverse orthogonal transform coefficient storage circuit 80 stores coefficient data on the first row of the four row-by-four column matrix in the upper half of the determinant as illustrated by (ME14) on the second term thereof.

In the MAC operation circuit "54f", the eight-by-eight inverse orthogonal transform coefficient storage circuit 65 stores coefficient data on the second row of the four row-by-four column matrix in the upper half of the determinant as illustrated by (ME14) on the second term thereof.

In the MAC operation circuit "54g", the eight-by-eight inverse orthogonal transform coefficient storage circuit 65 stores coefficient data on the third row of the four row-by-four column matrix in the upper half of the determinant as illustrated by (ME14) on the second term thereof.

In the MAC operation circuit "54h", the eight-by-eight inverse orthogonal transform coefficient storage circuit 65 stores coefficient data on the fourth row of the four row-by-four column matrix in the upper half of the determinant as illustrated by (ME14) on the second term thereof.

The following discusses, with reference to (ME14), the butterfly arithmetic operations using the butterfly operation circuit 58.

According to the present variation, the butterfly operation circuit 58 practices the butterfly arithmetic operation when the orthogonal transform circuit 15 assumes the eight-by-eight inverse orthogonal transform mode. Therefore, the processing in the eight-by-eight inverse orthogonal transform mode is now described.

The inverse orthogonal transform circuit 15 is set into the eight-by-eight inverse orthogonal transform mode. Upon the start of the processing, eight pieces of orthogonal transform coefficient data "X0" to "X7" are entered, one by one, into the inverse orthogonal transform circuit 15 through the input port 51.

The input data buffer 53 tentatively stores the entered orthogonal transform coefficient data until all of the eight pieces of orthogonal transform coefficient data "X0" to "X7" reach the input data buffer 53.

The input data buffer 53 selectively feeds four pieces of orthogonal transform coefficient data "X0", "X2", "X4", and "X6" from among the eight pieces of orthogonal transform coefficient data "X0" to "X7" into each of the MAC operation circuits "54a" to "54d".

At the same time, the input data buffer 53 selectively feeds the remaining four pieces of orthogonal transform coefficient data "X1", "X3", "X5", and "X7" from among the eight pieces of orthogonal transform coefficient data "X0" to "X7" into each of the MAC operation circuits "54e" to "54h".

Each of the MAC operation circuits "54a" to "54h" performs arithmetic operations on the eight pieces of orthogonal transform coefficient data "X0" to "X7", thereby providing arithmetically operated data. The arithmetically operated data are sent to the butterfly operation circuit 58. The butterfly operation circuit 58 performs the butterfly operations on the arithmetically operated data, thereby providing a series of pixel data. Each of the output data buffers "55a" to "55h" retains a corresponding piece of the pixel data.

In the four-by-four inverse orthogonal transform mode, the butterfly operation circuit 58 practices no butterfly arithmetic operation, and the pixel data are passed through the butterfly operation circuit 58.

As described above, the use of the butterfly operation circuit 58 provides an eight-by-eight inverse orthogonal transform operation at high speeds.

The present embodiment illustrates the inverse orthogonal transform circuit 15 adapted for both of the eight-by-eight and four-by-four inverse orthogonal transform modes. Alternatively, the present invention is applicable to an inverse orthogonal transform circuit that is designed to assume an N-by-N inverse orthogonal transform mode and an N/2-by-N/2 inverse orthogonal transform mode, where N is 2x (x is an exponent).

The inverse orthogonal transform circuit 15 according to the present embodiment and the variation thereof can be realized using software. Therefore, the present invention is not limited to being applicable to hardware.

Similarly, the encoding apparatus according to the present embodiment is achievable using either the hardware or the software.

The inverse orthogonal transform circuit 15 according to the present embodiment and the variation thereof are usable as an inverse orthogonal transform circuit 7 of FIG. 1.

(Embodiment 3)

An encoding apparatus according to a third embodiment is entirely similar in structure to the encoding apparatus of FIG. 1. Therefore, the present embodiment is described with reference to FIG. 1 as well as FIGS. 17 and 18.

Figure 17:
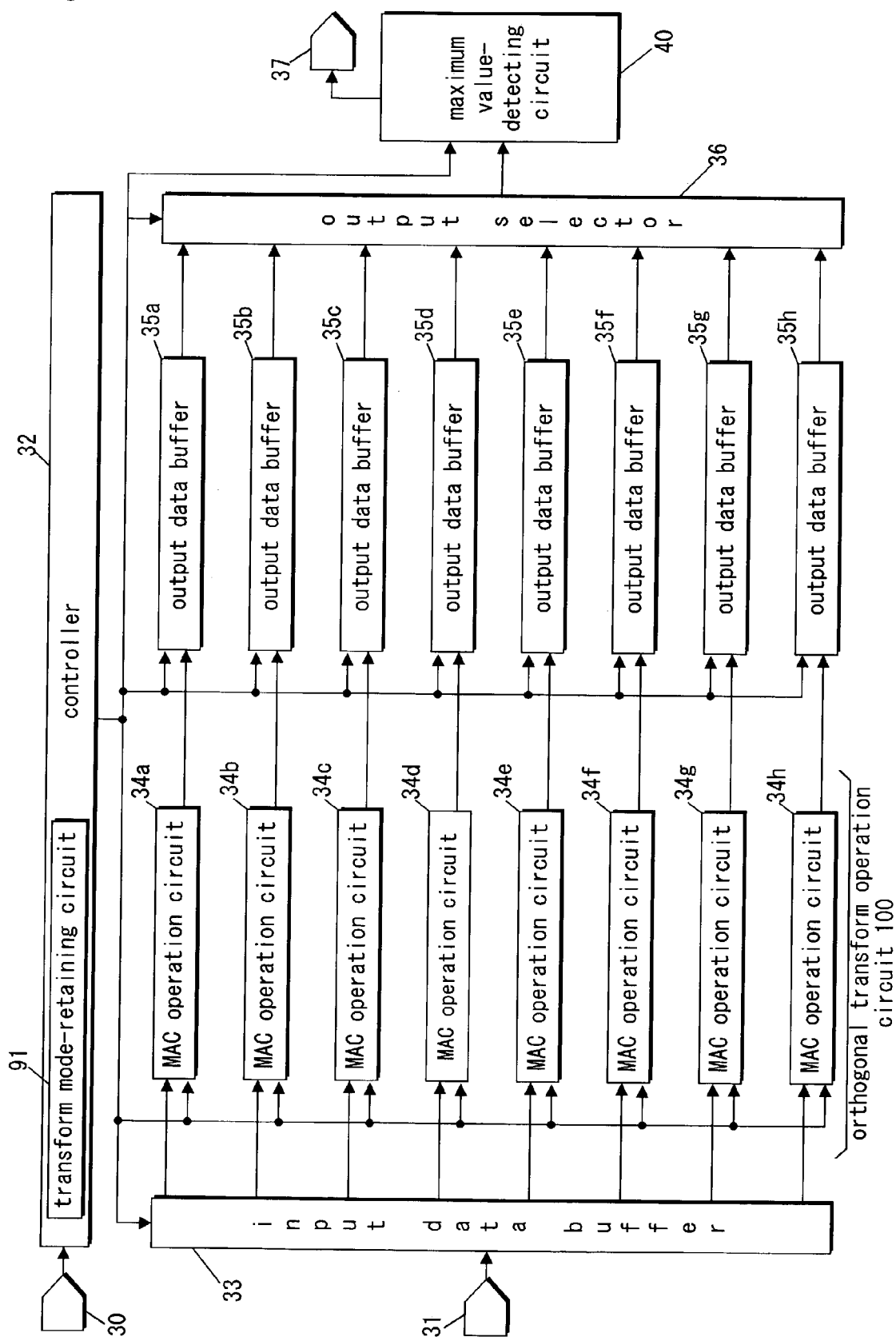
FIG. 17 is a block diagram, illustrating an exemplary orthogonal transform circuit according to a third embodiment of the present invention.

FIG. 17 is a block diagram, illustrating an exemplary orthogonal transform circuit 3 of FIG. 1 according to the present embodiment. In FIG. 17, components similar to those of FIG. 4 are identified by the same reference numerals, and descriptions related thereto are omitted.

As illustrated in FIG. 17, the orthogonal transform circuit 3 according to the present embodiment is characterized in that a maximum value-detecting circuit 40 is added to the orthogonal transform circuit 3 of FIG. 4. The following discusses mainly differences between the first embodiment and the present embodiment.

For convenience of description, assume pixel data are entered into the orthogonal transform circuit 3 through the input port 31 in accordance with the data input sequence as illustrated in FIG. 5(*d*).

Now, assume that the orthogonal transform circuit 3 is in an eight-by-eight orthogonal transform mode. Eight pixels-based pixel data on the first column as illustrated by FIG. 5(*d*) are entered, one by one, into the orthogonal transform circuit 3 through input port 31.

Similarly to the first embodiment, the MAC operation circuits "34a" to "34h" produce a total of eight pieces of orthogonal transform coefficient data. The MAC operation circuits "34a" to "34h" send the produced eight pieces of orthogonal transform coefficient data to output data buffers "35a" to "35h", respectively. The output data buffers "35a" to "35h" feed the received eight pieces of orthogonal transform coefficient data into the output data selector 36.

The output data selector 36 in receipt of the eight pieces of orthogonal transform coefficient data from the output data buffers "35a" to "35h" selectively feed them in sequence into the maximum value-determining circuit 40.

The maximum value-detecting circuit 40 compares each of the sequentially entered orthogonal transform coefficient data with maximum value data presently retained in the maximum value-determining circuit 40, thereby detecting a maximum value.

However, the first orthogonal transform coefficient data initially entered into the maximum value-detecting circuit 40 can be a maximum value because the maximum value-detecting circuit 40 has no object to be compared with the first orthogonal transform coefficient data.

The maximum value-detecting circuit 40 starts detecting a maximum value when the output data selector 36 starts feeding into the maximum value-detecting circuit 40 the orthogonal transform coefficient data that are derived from the eight pixels-based pixel data on the first column as illustrated by FIG. 5(*d*).

While the maximum value-detecting circuit 40 is executing such comparison processing, subsequent pixel data are entered in succession into the orthogonal transform circuit 3 through the input port 31 to undergo orthogonal transformation.

When the orthogonal transform circuit 3 completes eight-by-eight orthogonal transformation on an eight pixels-by-eight lines-formed pixel block, then the maximum value-detecting circuit 40 detects a maximum value from among a total of sixty-four pieces of orthogonal transform coefficient data.

The orthogonal transform coefficient data are sent to the output port 34 through the maximum value-detecting circuit 40.

Next, assume that the orthogonal transform circuit 3 is in a four-by-four orthogonal transform mode. Eight pixels-based pixel data on the first column as illustrated in FIG. 5(*d*) are entered, one by one, into the orthogonal transform circuit 3 through the input port 31.

Similarly to the first embodiment, the MAC operation circuits "34a" to "34h" practice four-by-four orthogonal transformation in a two-parallel manner, thereby producing a total of eight pieces of orthogonal transform coefficient data. The MAC operation circuits "34a" to "34h" send the produced eight pieces of orthogonal transform coefficient data to output data buffers "35a" to "35h", respectively. The output data buffers "35a" to "35h" feed the received eight pieces of orthogonal transform coefficient data into the output data selector 36.

The output data selector 36 in receipt of the eight pieces of orthogonal transform coefficient data from the output data buffers "35a" to "35h" selectively feeds them in sequence into the maximum value-determining circuit 40.

The maximum value-detecting circuit 40 compares each of the sequentially entered orthogonal transform coefficient data with maximum value data presently retained in the maximum value-determining circuit 40, thereby detecting a maximum value.

However, the first orthogonal transform coefficient data initially entered into the maximum value-detecting circuit 40 can be a maximum value because the maximum value-detecting circuit 40 has no object to be compared with the first orthogonal transform coefficient data.

The maximum value-detecting circuit 40 starts detecting a maximum value when the output data selector 36 starts feeding into the maximum value-detecting circuit 40 the eight pixels-based pixel data on the first column as illustrated by FIG. 5(d).

While the maximum value-detecting circuit 40 is executing such comparison processing, subsequent pixel data are entered in succession into the orthogonal transform circuit 3 through the input port 31 to undergo the orthogonal transformation.

The maximum value-detecting circuit 40 executes the comparison processing for each of four pixels-by-four lines-formed four pixel blocks, thereby detecting a maximum value for each of the four pixels-by-four lines-formed four pixel blocks.

For example, when the MAC operation circuits "34a" to "34h" complete the orthogonal transform operations on the pixel data on four columns as illustrated in FIG. 5(d), then the orthogonal transform circuit 3 completes the four-by-four orthogonal transformation on the four pixels-by-four lines-formed two blocks. As a result, the maximum value-detecting circuit 40 detects two maximum values.

Subsequently, when the MAC operation circuits "34a" to "34h" complete the orthogonal transform operation on the pixel data on the remaining four rows as illustrated in FIG. 5(d), then the orthogonal transform circuit 3 completes the four-by-four orthogonal transformation on the remaining four pixels-by-four lines-formed two blocks. As a result, the maximum value-detecting circuit 40 detects further two maximum values.

In this way, the maximum value-detecting circuit 40 detects a total of four maximum values on the four pixels-by-four lines-formed four pixel blocks. Each of the four maximum values is the greatest among a gang of sixteen pieces of orthogonal transform coefficient data.

The orthogonal transform coefficient data are sent to the output port 37 through the maximum value-detecting circuit 40.

A flow of processing using the orthogonal transform circuit 3 of FIG. 1 according to the present embodiment is now discussed with reference to FIG. 17 and a flowchart of FIG. 18.

Figure 18:
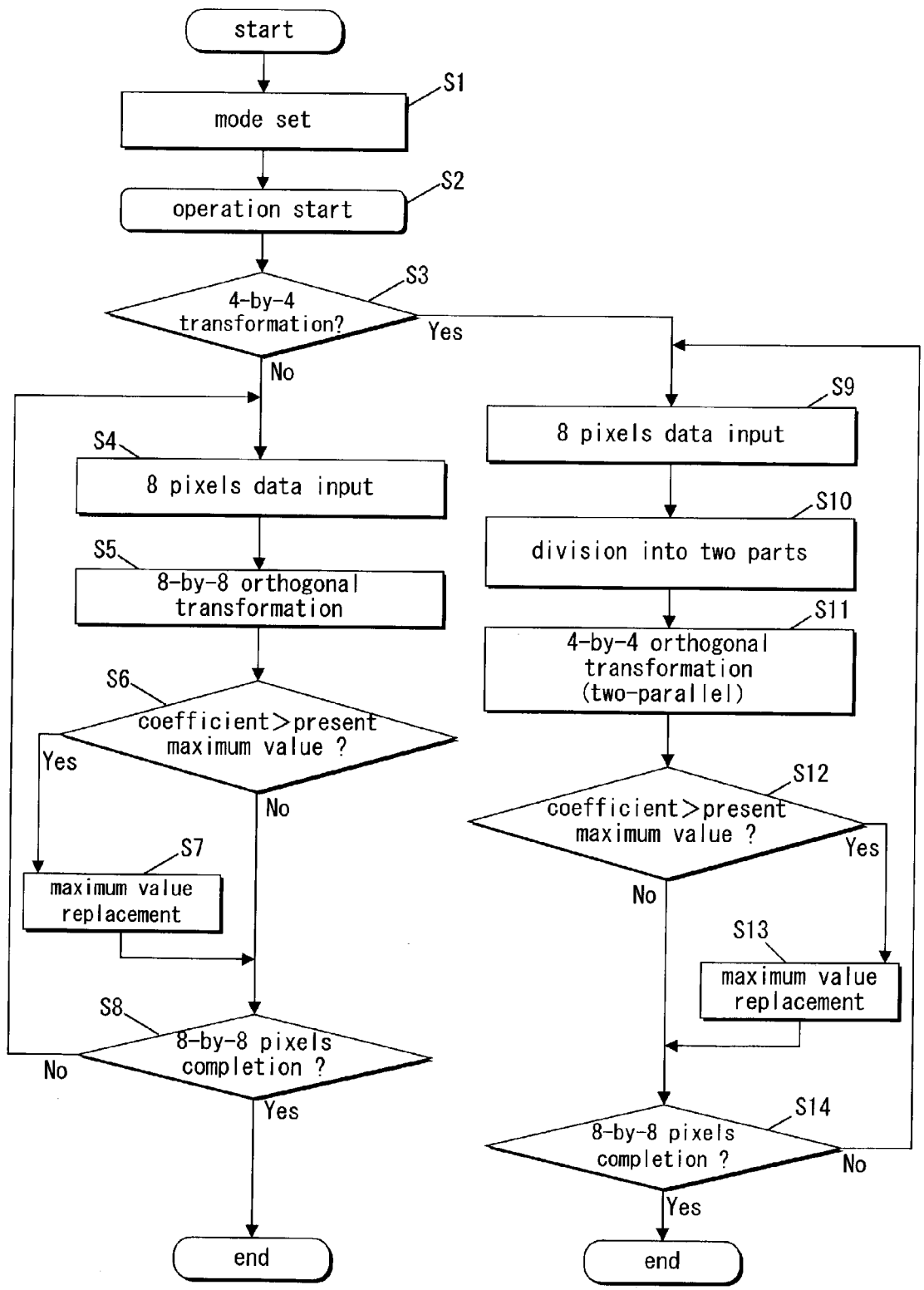
FIG. 18 is a flowchart, illustrating an exemplary flow of processing in the orthogonal transform circuit.

FIG. 18 is a flowchart, illustrating exemplary behaviors of the orthogonal transform circuit 3 of FIG. 1 according to the present embodiment.

At step S1, a mode-instructing signal enters the mode-setting port 30. The controller 32 sets the orthogonal transform circuit 3 into either an eight-by-eight or a four-by-four orthogonal transform mode in response to the mode-instructing mode.

Assume that the orthogonal transform circuit 3 is in the eight-by-eight orthogonal transform mode. At step S1, the orthogonal transform circuit 3 is set into the eight-by-eight orthogonal transform mode. At step S2, the orthogonal transform circuit 3 starts practicing arithmetic operations.

At step S3, the routine is advanced to step S4 because the orthogonal transform circuit 3 assumes the eight-by-eight orthogonal transform mode.

At step S4, eight pixels-based pixel data are entered into the input data buffer 33 through the input port 31.

The input data buffer 33 enters the eight pixels-based pixel data into each of the MAC operation circuits "34a" to "34h".

At step S5, the MAC operation circuits "34a" to "34h" execute the MAC operations in an eight-parallel manner using the eight pixels-based pixel data and eight pieces of eight-by-eight orthogonal transformation-related coefficient data. This means that the orthogonal transform circuit 3 practices the eight-by-eight orthogonal transformation on the eight pixels-based pixel data. As a result, the MAC operation circuits "34a" to "34h" produce a total of eight pieces of orthogonal transform coefficient data.

The output data selector 36 sends the eight pieces of orthogonal transform coefficient data in sequence into the maximum value-detecting circuit 40.

At step S6, the maximum value-detecting circuit 40 compares each piece of orthogonal transform coefficient data from the output data selector 36 with a maximum value presently retained in the maximum value-detecting circuit 40.

At step S7, the maximum value-detecting circuit 40 replaces the maximum value presently retained therein by a piece of subsequently entered orthogonal transform coefficient data when comparison results show that the piece of subsequently entered orthogonal transform coefficient data is greater than the maximum value presently retained in the maximum value-detecting circuit 40.

Conversely, the maximum value-detecting circuit 40 continues to retain the maximum value presently retained therein when the comparison results show that all of the subsequently entered orthogonal transform coefficient data are smaller than the maximum value presently retained in the maximum value-detecting circuit 40.

At step S8, a determination is made as to whether the orthogonal transform circuit 3 completes the eight-by-eight orthogonal transformation on the eight pixels-by-eight lines-formed pixel block while the maximum value-detecting circuit 40 is making a comparison to detect a maximum value. When the response to the determination in step S8 results in "NO", then the routine is returned to step S4. At step S4, subsequent pixel data are entered into the orthogonal transform circuit 3 through the input port 31. At step S5, the orthogonal transform circuit 3 performs the eight-by-eight orthogonal transformation on the entered pixel data.

Conversely, when the response to the determination in step S8 results in "YES", then the orthogonal transform circuit 3 terminates the processing at step 8. As a result, a total of sixty-four orthogonal transform coefficients resulting from the eight-by-eight orthogonal transformation and a maximum value among the total of sixty-four orthogonal transform coefficients on the eight pixels-by-eight lines-formed pixel block are detected.

Now, assume that the orthogonal transform circuit 3 is in the four-by-four orthogonal transform mode. At step S1, the orthogonal transform circuit 3 is set into the four-by-four orthogonal transform mode. At step S2, the orthogonal transform circuit 3 practices arithmetic operations.

At step S3, the routine is advanced to step S9 because the orthogonal transform circuit 3 assumes the four-by-four orthogonal transform mode.

At step S9, eight pixels-based pixel data are entered into the input data buffer 33 through the input port 31.

At step S10, the input data buffer 33 enters a first half of the eight pixels-based pixel data into each of the MAC operation circuits "34a" to "34d", while feeding a second half of the eight pixels-based pixel data into each of the MAC operation circuits "34e" to "34h". That is, the eight pixels-based pixel data are divided into two equal parts, which are entered into the MAC operation circuits "34a" to "34h" in a manner as just described.

At step S11, the MAC operation circuits "34a" to "34d" practice the MAC operations in the four-parallel manner using the first half of the eight pixels-based pixel data and four pieces of four-by-four orthogonal transformation-related coefficient data, while the MAC operation circuits "34e" to "34h" practice the MAC operations in the four-parallel manner using the second half of the eight pixels-based pixel data and the four pieces of four-by-four orthogonal transformation-related coefficient data.

This means that the orthogonal transform circuit 3 performs the four-by-four orthogonal transformation on four pixels-based pixel data in a two-parallel manner. As a result, a total of eight pieces of orthogonal transform coefficient data are produced.

The output data selector 36 feeds the eight pieces of orthogonal transform coefficient data into the maximum value-detecting circuit 40.

At step S12, the maximum value-detecting circuit 40 compares each piece of the orthogonal transform coefficient data from the output data selector 36 with a maximum value presently retained in the maximum value-detecting circuit 40.

At this time, the maximum value-detecting circuit 40 detects a maximum value for each of four pixels-by-four lines-formed four pixel blocks.

In this way, the maximum value-detecting circuit 40 retains a maximum value for each of the four pixels-by-four lines-formed four pixel blocks.

At step S13, the maximum value-detecting circuit 40 replaces the maximum value presently retained therein by a piece of subsequently entered orthogonal transform coefficient data when comparison results show that the piece of subsequently entered orthogonal transform coefficient data is greater than the maximum value presently retained in the maximum value-detecting circuit 40.

Conversely, at step S13, the maximum value-detecting circuit 40 continues to retain the maximum value presently retained therein when the comparison results show that all of the subsequently entered orthogonal transform coefficient data are smaller than the maximum value presently retained in the maximum value-detecting circuit 40.

At step S14, a determination is made as to whether the orthogonal transform circuit 3 completes the four-by-four orthogonal transformation on the eight pixels-by-eight lines-formed pixel block while the maximum value-detecting circuit 40 is making comparison to detect a maximum value. When the response to the determination in step S14 results in "NO", then the routine is returned to step S9. At step S9, subsequent pixel data are entered into the orthogonal transform circuit 3 through the input port 31. At step S11, the orthogonal transform circuit 3 executes the orthogonal transformation on the entered pixel data.

Conversely, when the response to the determination in step S14 results in "YES", then the orthogonal transform circuit 15 terminates the processing at step 14. As a result, a total of sixty-four orthogonal transform coefficients resulting from the four-by-four orthogonal transformation and four maximum values on the four pixels-by-four lines-formed four pixel blocks are detected. As a result, each of the maximum values is the greatest among a gang of sixteen pieces of orthogonal transform coefficient data.

As described above, pursuant to the present embodiment, the orthogonal transform circuit 3 in the eight-by-eight orthogonal transform mode detects a maximum value while practicing the orthogonal transformation. This feature completes the entire processing in a shorter time than the way in which all of the orthogonal transform coefficients on the eight pixels-by-eight lines-formed pixel block are compared with each other following the orthogonal transformation, thereby detecting a maximum value.

Pursuant to the present embodiment, the orthogonal transform circuit 3 in the four-by-four orthogonal transform mode detects a maximum value while performing the orthogonal transformation. This feature completes the entire processing at a shorter time than the way in which all of the orthogonal transform coefficients on the four pixels-by-four lines-formed pixel blocks are compared with each other following the orthogonal transformation, thereby detecting a maximum value.

Following the orthogonal transformation, a quantized value is compared, before quantization, with a maximum value from among orthogonal transform coefficients on an eight pixels-by-eight lines-formed pixel block. When the maximum value from among the orthogonal transform coefficients is smaller than the quantized value, then all of the orthogonal transform coefficients resulting from the eight-by-eight orthogonal transformation on the eight pixels-by-eight lines-formed pixel block can be processed to have a value equal to zero without the need for operations to quantize the orthogonal transform coefficients. As a result, inter-images can be quantized in a reduced processing time.

When the inter-images are encoded, detecting a maximum value from among all of the orthogonal transform coefficients on the eight pixels-by-eight lines-formed pixel block is effective in encoding the inter-images because DC and AC coefficients have the same quantization value.

Following the orthogonal transformation, a quantized value is compared, before quantization, with a maximum value from among orthogonal transform coefficients for each of four pixels-by-four lines-formed four pixel blocks. When the maximum value from among the orthogonal transform coefficients is smaller than the quantized value, then all of the orthogonal transform coefficients resulting from the four-by-four orthogonal transformation on the four pixels-by-four lines-formed pixel block can be processed to have a value equal to zero without the need for operations to quantize the orthogonal transform coefficients. As a result, inter-images can be quantized in a reduced processing time.

When the inter-images are encoded, detecting a maximum value from among all of the orthogonal transform coefficients on the four pixels-by-four lines-formed four pixel blocks is effective in encoding the inter-images because DC and AC coefficients have the same quantization value.

The quantized value as mentioned above refers to a value of a divisor for dividing the orthogonal transform coefficients when the orthogonal transform coefficients are quantized.

As an alternative, when the orthogonal transform circuit 3 is in the four-by-four orthogonal transform mode, the maximum value-detecting circuit 40 is possible to detect a maximum value from among a total of sixty-four pieces of orthogonal transform coefficient data on an eight pixels-by-eight lines-formed pixel block.

In this alternative, a quantized value can be compared with the maximum value from among the sixty-four pieces of orthogonal transform coefficient data at a fewer number of times than the way in which a quantized value is compared with a maximum value from among orthogonal transform coefficients for each of four pixels-by-four lines-formed four pixel blocks. As a result, in the inter-images, the quantized value is compared with the maximum value at high speeds.

As a further alternative, when the orthogonal transform circuit 3 is in the eight-by-eight and four-by-four orthogonal transform modes, the maximum value-detecting circuit 40 is possible to detect a maximum value from among AC coefficients that are obtained by deleting DC coefficients from orthogonal transform coefficient data.

In this alternative, following the orthogonal transformation, a quantized value is compared, before quantization, with a maximum value from among AC coefficients on an eight pixels-by-eight lines-formed pixel block. When the maximum value from among the AC coefficients is smaller than the quantized value, then all of the AC coefficients resulting from eight-by-eight orthogonal transformation on the eight pixels-by-eight lines-formed pixel block can be processed to have a value equal to be zero without operations to quantize the AC coefficients. As a result, intra-images can be quantized in a reduced processing time.

In addition, following the orthogonal transformation, a quantized value is compared, before quantization, with a maximum value from among AC coefficients for each of four pixels-by-four lines-formed four pixel blocks. When the maximum value from among the AC coefficients is smaller than the quantized value, then all of the AC coefficients resulting from four-by-four orthogonal transformation on the four pixels-by-four lines-formed pixel block can be processed to have a value equal to be zero without the need for operations to quantize the AC coefficients. As a result, intra-images can be quantized at a reduced processing time.

When the intra-images are encoded, detecting a maximum value from among the AC coefficients is effective in encoding the intra-images because DC and AC coefficients have different quantized value.

As a yet further alternative, when the orthogonal transform circuit 3 is in the four-by-four orthogonal transform mode, the maximum value-detecting circuit 40 is possible to detect a maximum value from among sixty AC coefficients on an eight pixels-by-eight lines-formed pixel block.

In this alternative, a quantized value can be compared with the maximum value from among the sixty AC coefficients at a fewer number of times than the way in which a maximum value from among AC coefficients is determined for each of four pixels-by-four lines-formed four pixel blocks. As a result, in the intra-images, the quantized value can be compared at high speeds with the maximum value from among the sixty AC coefficients.

In both of the eight-by-eight and four-by-four orthogonal transform modes, a maximum value from among only AC coefficients is detected.

As illustrated in FIG. 9, the present embodiment allows a butterfly operation circuit to be disposed, as an alternative, between the input data buffer 33 and the MAC operation circuits "34a" to "34h". This alternative performs an eight-by-eight orthogonal transform operation at high speeds.

The present embodiment illustrates the orthogonal transform circuit 3 designed for both of the eight-by-eight and four-by-four orthogonal transform modes. Alternatively, the present embodiment is applicable to an orthogonal transform circuit designed for an N-by-N orthogonal transform mode and an N/2-by-N/2 orthogonal transform mode, where N is equal to 2x (x is an exponent).

The orthogonal transform circuit 3 according to the present embodiment is achievable using software. Therefore, the present invention is not limited to being applicable to hardware.

The encoding apparatus according to the present embodiment can be realized by both of the software and hardware.

In both of the eight-by-eight and four-by-four orthogonal transform modes, the input data buffer 33, the MAC operation circuits "34a" to "34h", and the output data buffers "35a" to "35h" behave in a manner similar to the way in which those according to the first embodiment work.

The orthogonal transform circuit according to the present embodiment includes all components that form the orthogonal transform circuit according to the first embodiment. As a result, the present embodiment provides beneficial effects similar to those according to the first embodiment.

(Embodiment 4)

A next generation coding system would possibly incorporate a four pixels-by-four lines orthogonal transformation therein.

In the next generation coding system, DC coefficients may be separated from AC coefficients in a chroma block in order to practice variable length encoding because a small-sized block is usable.

As a result, in chroma components, the only DC coefficients, not the AC coefficients, can be sent in order to reduce a coding amount.

The use of the only DC coefficients often makes it feasible to decode a moving image to a satisfactory degree because the block as small as four pixels by four lines is used, and further because it is difficult to visually recognize a difference in the chroma components.

In this step, another transformation or a particular arithmetic operation on the DC coefficients may be required to practice before the variable length encoding in order to provide a further reduced coding amount.

As of today in the year of 2002, an orthogonal transform apparatus designed for the above processing is not available.

The present embodiment provides an orthogonal transform circuit adapted for the next generation coding system as just discussed.

An encoding apparatus according to the present embodiment is entirely similar in structure to the encoding apparatus of FIG. 1. Therefore, the present embodiment is described with reference to FIG. 1 as well as FIG. 19.

Figure 19:
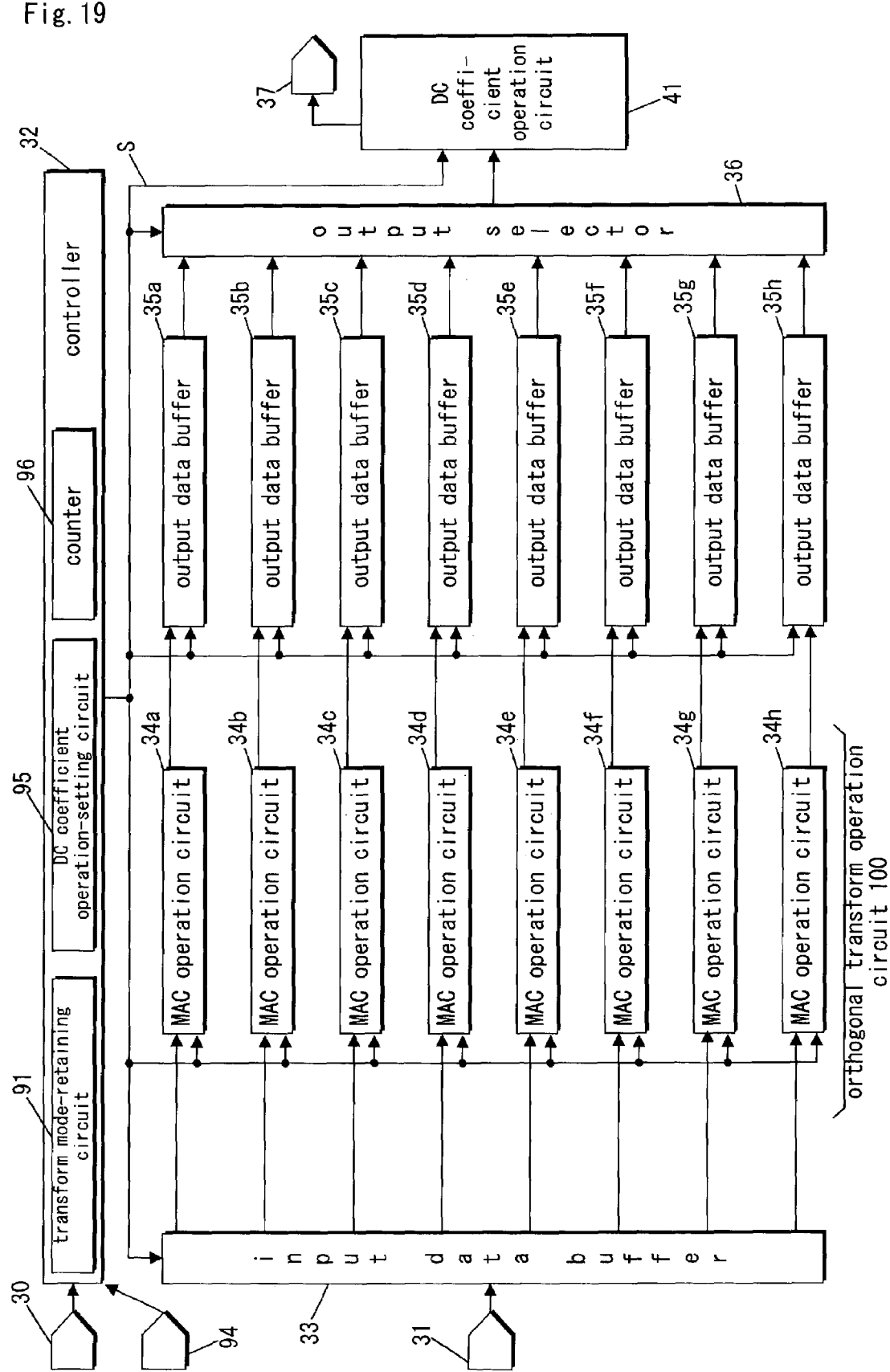
FIG. 19 is a block diagram, illustrating an exemplary orthogonal transform circuit according to a four embodiment of the present invention.

FIG. 19 is a block diagram, illustrating an exemplary orthogonal transform circuit 3 of FIG. 1 according to the present embodiment. In FIG. 19, the components similar to those of FIG. 4 are identified by the same reference characters, and description related thereto are omitted.

As illustrated in FIG. 19, the orthogonal transform circuit 3 according to the present embodiment has a DC coefficient operation circuit 41 and a DC operation-setting port 94 added to the orthogonal transform circuit of FIG. 4. In addition, a DC coefficient operation-setting circuit (a DC operation-setting circuit) 95 and a counter 96 are added to the controller 32.

In an eight-by-eight orthogonal transform mode, the orthogonal transform circuit 3 according to the present embodiment woks in a manner similar to the way in which the orthogonal transform circuit 3 according to the first embodiment behaves, and therefore descriptions related thereto are omitted. In the eight-by-eight orthogonal transform mode, orthogonal transform coefficient data selectively fed out of the output data selector 36 are emitted out of the orthogonal transform circuit 3 through the output port 37 after being sent to the output port 37 through the DC coefficient operation circuit 41. The following discusses differences between the present embodiment and the first embodiment.

Assume that the orthogonal transform circuit 3 is set into a four-by-four orthogonal transform mode and a particular operation-executing mode.

The DC coefficient operation-setting circuit 95 sets the orthogonal transform circuit 3 into the particular operation-executing mode when the DC operation-setting port 94 receives a signal that instructs the orthogonal transform circuit 3 to perform particular operations.

Similarly to the first embodiment, eight pieces of orthogonal transform coefficient data produced by the MAC operation circuits "34*a*" to "34*h*" are fed into the output data selector 36 through the output data buffers "35*a*" to "35*h*", respectively.

The output data selector 36 feeds the entered eight pieces of orthogonal transform coefficient data in sequence into the DC coefficient operation circuit 41 in response to a control signal from the controller 32.

The input data buffer 33, the MAC operation circuits "34*a*" to "34*h*", and the output data buffers "35*a*" to "35*h*" provide the same behaviors as those according to the first embodiment.

The DC coefficient operation circuit 41 delivers AC and DC coefficients to the output port 37, while retaining the DC coefficients in the DC coefficient operation circuit 41. An example of this step is now described in detail.

Assume that the MAC operation circuits "34*a*" to "34*h*" produce respective pieces of the orthogonal transform coefficient data on the first to eighth column of FIG. 2(*c*).

In other words, assume that the MAC operation circuits "34*a*" to "34*h*" produce a piece of the orthogonal transform coefficient data on the first line of FIG. 2(*c*), a piece of the orthogonal transform coefficient data on the second line of FIG. 2(*c*), a piece of the orthogonal transform coefficient data on the third line of FIG. 2(*c*), a piece of the orthogonal transform coefficient data on the fourth line of FIG. 2(*c*), a piece of the orthogonal transform coefficient data on the fifth line of FIG. 2(*c*), a piece of the orthogonal transform coefficient data on the sixth line of FIG. 2(*c*), a piece of the orthogonal transform coefficient data on the seventh line of FIG. 2(*c*), and a piece of the orthogonal transform coefficient data on the eighth line of FIG. 2 (c), respectively.

The output data selector 36 feeds the eight pieces of orthogonal transform coefficient data from the MAC operation circuits "34*a*" to "34*h*" into the DC coefficient operation circuit 41 in response to the control signal from the controller 32. At this time, the output data selector 36 initially feeds the orthogonal transform coefficient data from the uppermost positioned MAC operation circuit "34*a*", and subsequently feeds the orthogonal transform coefficient data from the second upper-positioned MAC operation circuit "34*b*". In this way, the eight pieces of orthogonal transform coefficient data are delivered to the DC coefficient operation circuit 41 in the order top to down as illustrated in FIG. 19 from the MAC operation circuits "34*a*" to "34*h*".

This system allows the DC coefficients to be determined by counting the orthogonal transform coefficient data fed out of the output data selector 36.

A counter 96 performs such counting, thereby providing count values. The controller 32 determines the DC coefficients on the basis of the count values. The controller 32 instructs the DC coefficient operation circuit 41 to retain the DC coefficients therein.

In this way, the DC coefficient operation circuit 41 retains the DC coefficients therein.

For convenience of description, assume that pixel data are entered into the orthogonal transform circuit 3 through the input port 31 in the data input sequence as given in FIG. 5(*d*).

This means that the DC coefficient operation circuit 41 is in receipt of four DC coefficients when the orthogonal transform circuit 3 completes the orthogonal transformation on the pixel data on the fifth column of FIG. 5(*d*).

The DC coefficient operation circuit 41 in receipt of the four DC coefficients starts to execute particular operations on the four DC coefficients. The DC coefficient operation circuit 41 retains the processed data therein. For example, the DC coefficient operation circuit 41 practices primary Hadamard transform as one of the particular operations.

The orthogonal transform circuit 3 executes orthogonal transformation on the respective pixel data on the sixth to eighth columns of FIG. 5(*d*) in parallel with the particular operations on the DC coefficients. In this way, the orthogonal transform circuit 3 practices orthogonal transform operations on four pixels-by-four lines-formed four pixel blocks.

A flow of processing in the orthogonal transform circuit 3 of FIG. 19 according to the present embodiment is now discussed with reference to FIG. 19 and a flowchart of FIG. 20.

Figure 20:
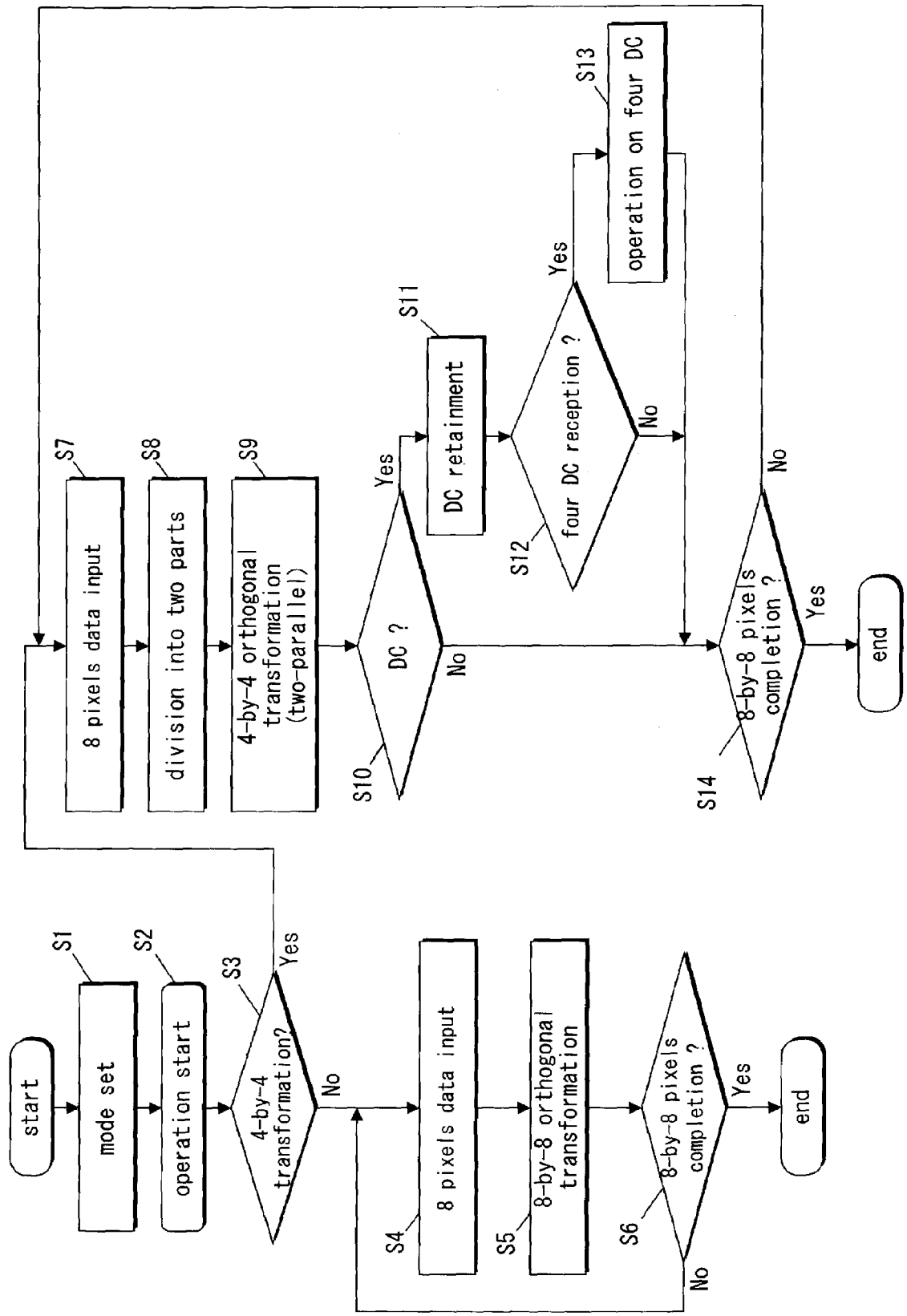
FIG. 20 is a flowchart, illustrating an exemplary flow of processing in the orthogonal transform circuit.

FIG. 20 is the flowchart, showing an exemplary flow of processing in the orthogonal transform circuit of FIG. 19 according to the present embodiment.

In FIG. 20, the orthogonal transform circuit 3 in the eight-by-eight orthogonal transform mode practices the orthogonal transformation in a manner similar to that according to the first embodiment, and therefore descriptions related thereto are omitted. See FIG. 8.

Assume that the orthogonal transform circuit 3 is in the four-by-four orthogonal transform mode and the particular operation-executing mode. At step S1, the orthogonal transform circuit 3 is set into the four-by-four orthogonal transform mode and the particular operation-executing mode. At step S2, the orthogonal transform circuit 3 starts practicing arithmetic operations.

At step S3, the routine is advanced to step S7 because the orthogonal transform circuit 3 assumes the four-by-four orthogonal transform mode.

At step S7, the input data buffer 33 receives eight pixels-based pixel data through the input port 31.

At step S8, the input data buffer 33 enters a first half of the eight pixels-based pixel data into each of the MAC operation circuits "34*a*" to "34*d*", while feeding a second half thereof into each of the MAC operation circuits "34*e*" to "34*h*". This means that the eight pixels-based pixel data are divided into two equal parts, which are entered into the MAC operation circuits "34*a*" to "34*h*" in a manner just described.

At step S9, the MAC operation circuits "34*a*" to "34*d*" perform multiply-and-accumulation (MAC) operations in a four-parallel manner using the first half of the eight pixels-based pixel data and four pieces of four-by-four orthogonal transformation-related coefficient data, while the MAC operation circuits "34*e*" to "34*h*" perform the MAC operations in the four-parallel manner using the second half of the eight pixels-based pixel data and the four pieces of four-by-four orthogonal transformation-related coefficient data.

This means that the orthogonal transform circuit 3 executes the four-by-four orthogonal transformation on the four pixels-based pixel data in a two-parallel manner.

As a result, the MAC operation circuits "34*a*" to "34*h*" provide eight pieces of orthogonal transform coefficient data, and feed them into the DC coefficient operation circuit 41 through output data selector 36.

At step S11, the DC coefficient operation circuit 41 retains the DC coefficients from among the sequentially entered orthogonal transform coefficient data. Meanwhile, at step S10, the DC coefficient operation circuit 41 sends the DC coefficients and AC coefficients to the output port 37.

At step S14, the routine is returned to step S7 when the orthogonal transform circuit 3 is still practicing the four-by-four orthogonal transform on the eight pixels-by-eight lines-formed pixel block.

At step S12, a determination is made as to whether the DC coefficient operation circuit 41 receives the four DC coefficients. When the response to the determination in step S12 results in YES, then at step S13, the DC coefficient operation circuit 41 performs the particular operations on the four DC coefficients. The DC coefficient operation circuit 41 retains the processed data therein.

For example, assuming that the pixel data are entered into the orthogonal transform circuit 3 through the input port 31 in accordance with the data input sequence as illustrated in FIG. 5(*d*), the DC coefficient operation circuit 41 is in receipt of the four DC coefficients when the orthogonal transform circuit 3 completes the orthogonal transformation on the pixel data on the fifth column as illustrated in FIG. 5(*d*). The DC coefficient operation circuit 41 starts performing the particular operations on the four DC coefficients.

When the DC coefficient operation circuit 41 starts performing the particular operations, the orthogonal transform circuit 3 does not complete the orthogonal transformation on the respective pixel data on the sixth to eighth columns as illustrated in FIG. 5(*d*). Therefore, at step S14, the MAC operation circuits "34*a*" to "34*h*" continue to perform the orthogonal transform operations.

Thus, the respective pixel data on the sixth to eighth columns of FIG. 5(*d*) are orthogonally transformed in parallel with the particular operation on the DC coefficients.

At step S14, the orthogonal transform circuit 3 terminates the orthogonal transformation when completing the four-by-four orthogonal transformation on the eight pixels-by-eight lines-formed pixel block. As a result, the above steps ultimately produce a total of sixty-four pieces of orthogonal transform coefficient data resulting from the four-by-four orthogonal transformation and a total of four pieces of particular operation-caused data.

The total of sixty-four pieces of orthogonal transform coefficient data and the total of four pieces of particular operation-caused data are sent to the outside through the output port 37.

As described above, pursuant to the present embodiment, in the four-by-four orthogonal transform mode, the DC coefficient calculation circuit 41 starts performing the particular operations before the MAC operation circuits "34*a*" to "34*h*" produce all of the sixty-four pieces of orthogonal transform coefficients on the four pixels-by-four lines-formed four blocks.

In other words, the particular operations on the DC coefficients are practiced while the four-by-four orthogonal transformation is performed.

This feature completes the entire processing at a shorter time than the way in which the four DC coefficients are searched to experience the particular operations after the total of sixty-four orthogonal transform coefficients on the four pixels-by-four lines-formed four pixel blocks are produced. As a result, high-speed processing is achievable.

Alternatively, in the four-by-four orthogonal transform mode, a total of sixty pieces of AC coefficients and the particular operation-caused data may be sent to the outside through the output port 37. The sixty pieces of AC coefficients are obtained by removing the four DC coefficients from the sixty-four orthogonal transform coefficients that are produced on the four pixels-by-four lines-formed four blocks.

This alternative is effective and suitable for encoding chroma components in the next generation coding system.

In the next generation coding system, there is a possibility that the AC coefficients in the chroma components and the DC coefficients following the particular operation are subjected to variable length encoding for transmittance. Accordingly, in the next generation coding system, it is effective in outputting the AC coefficients that are obtained by removing the DC coefficients from the orthogonal transform coefficients.

Assuming that the orthogonal transform circuit 3 feeds the total of sixty-four pieces of orthogonal transform coefficient data including the DC coefficients to the outside through the output port 37, the variable length-encoding circuit 5, e.g., must removes and searches the four DC coefficients from the sixty-four pieces of orthogonal transform coefficient data before practicing the variable length encoding.

This step results in an objectionable time to remove and search the four DC coefficients.

In order to eliminate such an inconvenience, the outputting-selecting circuit 36 may remove the DC coefficients from the sixty-four pieces of orthogonal transform coefficient data to deliver the removed DC coefficients and the AC coefficients to the DC coefficient operation circuit 41. The DC coefficient operation circuit 41 retains the delivered DC coefficients therein while feeding the AC coefficients to the output port 37. This step eliminates a time to search the DC coefficients.

According to the present embodiment, the DC coefficient operation circuit 41 starts executing the particular operations after receipt of the four DC coefficients.

Alternatively, there are cases where the DC coefficient operation circuit 41 may start executing the particular operations after receipt of two from among the four DC coefficients. Therefore, the DC coefficient operation circuit 41 is able to start executing the particular operations upon receipt of the two DC coefficients.

Thus, there is no need for the DC coefficient operation circuit 41 to wait for all of the four DC coefficients to arrive. Accordingly, the DC coefficient operation circuit 41 may start performing the particular operations upon receipt of as many DC coefficients as is enough to start executing the particular operations.

According to the present embodiment, a butterfly operation circuit may be provided between the input data buffer 33 and the MAC operation circuits "34*a*" to "34*h*", as illustrated in FIG. 9. This alternative provides an eight-by-eight orthogonal transform operation at high speeds.

The present embodiment illustrates the orthogonal transform circuit 3 designed for both of the eight-by-eight and four-by-four orthogonal transform modes. Alternatively, the present embodiment is applicable to an orthogonal transform circuit designed for an N-by-N orthogonal transform mode and an N/2-by-N/2 orthogonal transform mode, where N is equal to 2x (x is an exponent).

The orthogonal transform circuit 3 according to the present embodiment is realized by software. Therefore, the present invention is not limited to being applicable to hardware.

Similarly, the encoding apparatus according to the present embodiment can be realized by both of the software and hardware.

In both of the eight-by-eight and four-by-four orthogonal transform modes, the input data buffer 33, the MAC operation circuits "34*a*" to "34*h*", and the output data buffers "35*a*" to "35*h*" behave in a manner similar to the way in which those according to the first embodiment work.

The orthogonal transform circuit according to the present embodiment includes all components that form the orthogonal transform circuit according to the first embodiment. As a result, the present embodiment provides beneficial effects similar to those according to the first embodiment.

(Embodiment 5)

A next generation coding system would possibly incorporate a four pixels-by-four lines orthogonal transformation therein.

In the next generation coding system, DC coefficients may be separated from AC coefficients in a chroma block in order to practice variable length encoding because a small-sized block is usable.

As a result, in chroma components, the only DC coefficients, not the AC coefficients, can be sent in order to reduce a coding amount.

The use of the only DC coefficients often makes it feasible to decode a moving image to a satisfactory degree because the block as small as four pixels by four lines is used, and further because it is difficult to visually recognize a difference in the chroma components.

In this step, another transformation or a particular arithmetic operation on the DC coefficients may be required to practice before the variable length encoding in order to provide a further reduced coding amount.

As of today in the year of 2002, an inverse orthogonal transform apparatus designed for the above processing is not available.

The present embodiment provides an inverse orthogonal transform circuit adapted for the next generation coding system as just discussed.

A decoding apparatus according to the present embodiment is entirely similar in structure to the decoding apparatus of FIG. 10. Therefore, the present embodiment is described with reference to FIG. 10 as well as FIG. 21.

Figure 21:
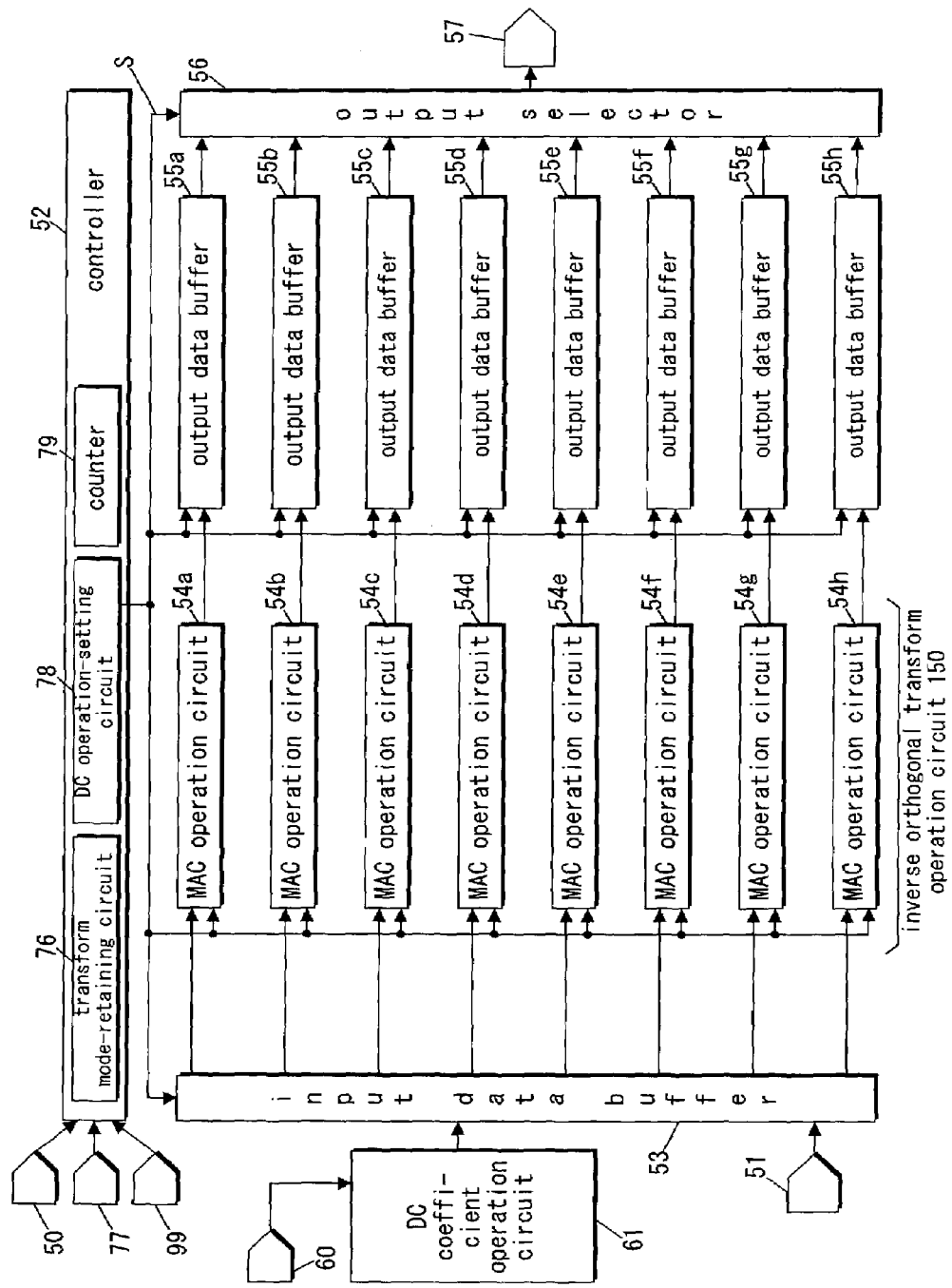
FIG. 21 is a block diagram, illustrating an exemplary inverse orthogonal transform circuit according to a fifth embodiment of the present invention.

FIG. 21 is a block diagram, illustrating an exemplary inverse orthogonal transform circuit 15 of FIG. 10 according to the present embodiment. In FIG. 21, the components similar to those of FIG. 12 are identified by the same reference characters, and description related thereto are omitted.

As illustrated in FIG. 21, the inverse orthogonal transform circuit 15 according to the present embodiment has a DC coefficient operation circuit 61, a DC operation-setting port 77, four data input port 60, and a DC information input port 99 added to the inverse orthogonal transform circuit of FIG. 12. In addition, a DC coefficient operation-setting circuit (a DC operation-setting circuit) 78 and a counter 79 are added to the controller 52.

In an eight-by-eight inverse orthogonal transform mode, the inverse orthogonal transform circuit 15 according to the present embodiment woks in a manner similar to the way in which the inverse orthogonal transform circuit 15 according to the second embodiment behaves, and therefore descriptions related thereto are omitted. In the eight-by-eight orthogonal transform mode, the DC coefficient operation circuit 61 does not work. The following mainly discusses differences between the present embodiment and the second embodiment.

Assume that the inverse orthogonal transform circuit 15 is set into a four-by-four inverse orthogonal transform mode and a particular operation-executing mode.

In this instance, assume that particular data (e.g., zero) are inserted in data (the data are entered into the inverse orthogonal transform circuit 15 through an input port 51) at positions of DC coefficients in the data.

For convenience of descriptions, the following description assumes that the data are entered into the inverse orthogonal transform circuit 15 through the input port 51 in the data input sequence as illustrated by FIG. 5(d) when an eight pixels-by-eight lines-formed pixel block as illustrated in FIG. 5(d) is assumed to consist of a total of sixty-four pieces of orthogonal transform coefficient data. In addition, assume that the particular data are inserted in the data at the positions of the DC coefficients in the data.

The DC coefficient operation-setting circuit 78 sets the inverse orthogonal transform circuit 15 into the particular operation-executing mode when the DC operation-setting port 77 receives a signal that instructs the inverse orthogonal transform circuit 15 to perform particular operations.

The four data input port 60 enters four pieces of data into the DC coefficient operation circuit 61 to set the four pieces of data in order to allow the DC coefficient operation circuit 61 to practice the particular operations on the four pieces of data. The four pieces of data result in the DC coefficients. The four pieces of data correspond to four pieces of particular operation-caused data according to the fourth embodiment.

In the present embodiment, data such as the four pieces of data that result in the DC coefficients are called "original data".

The DC coefficient operation circuit 61 starts to execute the particular operations on the four pieces of original data upon receipt of the four pieces of original data. For example, the DC coefficient operation circuit 61 practices primary inverse Hadamard transform as one of the particular operations. The DC coefficient operation circuit 61 retains the results from the particular operations, i.e., the DC coefficients in orthogonal transform coefficients.

Eight pieces of data on the first column as illustrated in FIG. 5(d) are entered, one by one, into the inverse orthogonal transform circuit 15 through the input port 51. When the eight pieces of data are all orthogonal transform coefficient data, then the DC coefficient operation circuit 61 has an option to execute the particular operations while the eight pieces of data are entered into the inverse orthogonal transform circuit 15.

When the particular data are inserted in the data (the data are entered into the inverse orthogonal transform circuit 15 through the input port 51) at the positions of the DC coefficients in the data, then the input data buffer 53 overwrites the DC coefficients produced using the DC coefficients operation circuit 61 onto the particular data at the positions of the DC coefficients in the data in response to instructions from the controller 52.

In this way, the input data buffer 53 receives the eight pieces of orthogonal transform coefficient data when the particular data are inserted in the data (the data are entered into the inverse orthogonal transform circuit 15 through the input port 51) at the positions of the DC coefficients in the data.

The controller 52 ascertains, on the basis of DC information that is entered into the controller 52 through the DC information input port 99, that the particular data, not the DC coefficients, are inserted in the data at the positions of the DC coefficients in the data.

The DC coefficients are entered in a fixed sequence, and the positions of the DC coefficients can easily be detected by counting, using the counter 79, the data that are entered into the inverse orthogonal transform circuit 15 through the input port 51.

As described above, the DC coefficient operation circuit 61 starts executing the particular operations before the input data buffer 53 receives all of the eight pieces of orthogonal transform coefficient data through the input port 51.

Similarly to the second embodiment, the input data buffer 53 in receipt of the eight pieces of orthogonal transform coefficient data feeds a first half of the eight pieces of orthogonal transform coefficient data into each of multiply-and-accumulation (MAC) operation circuits "54*a*" to "54*d*", while entering a second half of the eight pieces of orthogonal transform coefficient data into each of MAC operation circuits "54*e*" to "54*h*". Subsequent processing is the same as one according to the second embodiment, and descriptions related thereto are omitted.

When the inverse orthogonal transform circuit 14 completes the inverse orthogonal transformation on the second column to the eighth column as illustrated in FIG. 5(*d*), then a total of sixty-four pieces of pixel data are provided.

A flow of processing in the inverse orthogonal transform circuit 15 of FIG. 21 according to the present embodiment is now discussed with reference to FIG. 21 and a flowchart of FIG. 22.

Figure 22:
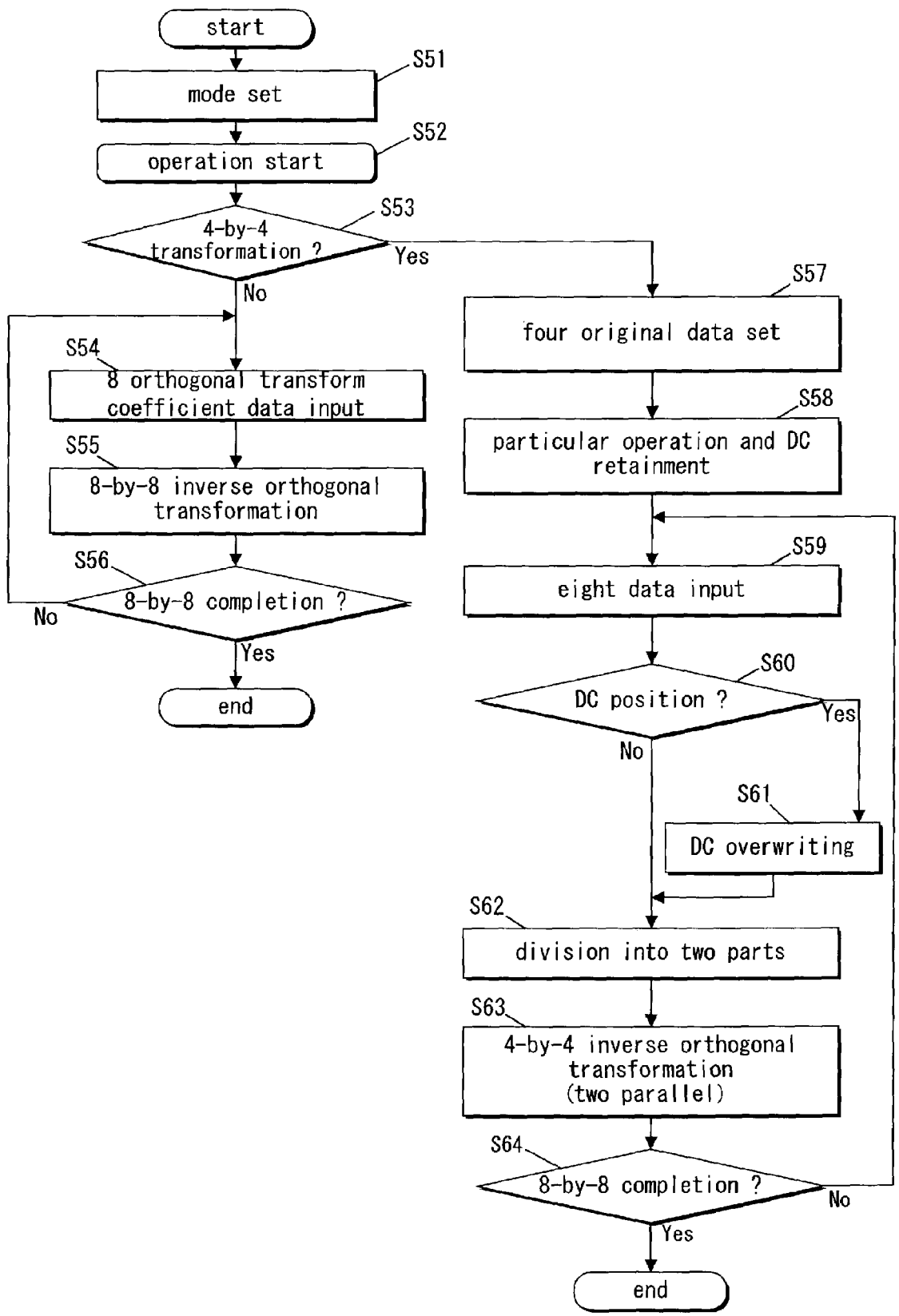
FIG. 22 is a flowchart, illustrating an exemplary flow of processing in the inverse orthogonal transform circuit.
Figure 23:
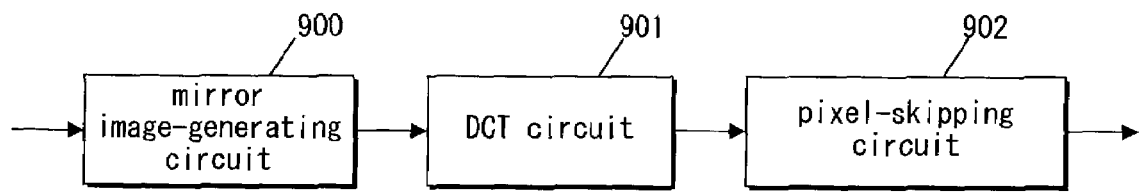
FIG. 23 is a block diagram, illustrating a prior art DCT apparatus.
Figure 24:
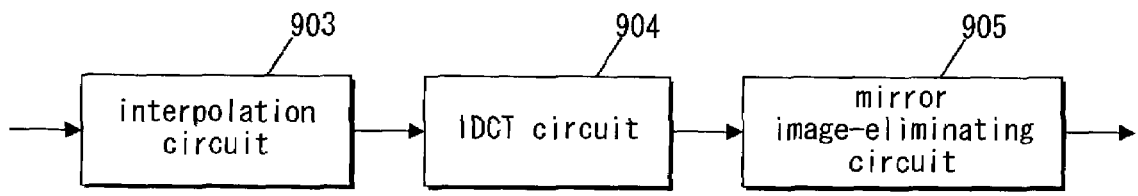
FIG. 24 is a block diagram, illustrating a prior art IDCT apparatus.

FIG. 22 is the flowchart, showing an exemplary flow of processing in the inverse orthogonal transform circuit 15 of FIG. 21 according to the present embodiment.

In FIG. 22, the orthogonal transform circuit 3 in the eight-by-eight inverse orthogonal transform mode practices the inverse orthogonal transformation in a manner similar to that according to the second embodiment, and therefore descriptions related thereto are omitted. See FIG. 15.

For convenience of description, the following assumes that the data are entered into the inverse orthogonal transform circuit 15 through the input port 51 in the data input sequence as illustrated by FIG. 5(*d*) when the eight pixels-by-eight lines-formed pixel block as illustrated in FIG. 5(*d*) is assumed to consist of the sixty-four pieces of orthogonal transform coefficient data. In addition, assume that the particular data are inserted in the data at the positions of the DC coefficients in the data Assume that the inverse orthogonal transform circuit 15 is in the four-by-four inverse orthogonal transform mode and the particular operation-executing mode. At step S51, the inverse orthogonal transform circuit 15 is set into the four-by-four inverse orthogonal transform mode and the particular operation-executing mode. At step S52, the inverse orthogonal transform circuit 15 starts practicing arithmetic operations.

At step S53, the routine is advanced to step S57 because the inverse orthogonal transform circuit 15 assumes the four-by-four inverse orthogonal transform mode.

At step S57, the four data input port 60 enters the four pieces of original data into the DC coefficient operation circuit 61 to set the four pieces of original data in order to allow the DC coefficient operation circuit 61 to practice the particular operations on the four pieces of original data.

At step S58, the DC coefficient operation circuit 61 starts executing the particular operations upon receipt of the four pieces of original data. The DC coefficient operation circuit 61 retains the results of the particular operations, i.e., the DC coefficients in the orthogonal transform coefficients.

At step S59, the eight pieces of data on the first column as illustrated by FIG. 5(*d*) are entered, one by one, into the inverse orthogonal transform circuit 15 through the input port 51. When the eight pieces of data are all orthogonal transform coefficient data, then the DC coefficient operation circuit 61 has an option to execute the particular operations while the eight pieces of data are entered into the inverse orthogonal transform circuit 15.

At step S60, the controller 52 instructs the input data buffer 53 to overwrite the DC coefficients produced using the DC coefficient operation circuit 61 onto the particular data at the positions of the DC coefficients in the data when the particular data are inserted in the data (the data are entered into the inverse orthogonal transform circuit 15 through the input port 51) at the positions of the DC coefficients in the data.

At step S61, the input data buffer 53 overwrites the DC coefficients produced using the DC coefficient operation circuit 61 onto the particular data at the positions of the DC coefficients in the data in response to the instructions from the controller 52.

In this way, the input data buffer 53 receives all of the eight pieces of orthogonal transform coefficient data when the particular data are inserted in the data (the data are entered into the inverse orthogonal transform circuit 15 through the input port 51) at the positions of the DC coefficients in the data.

As described above, the DC coefficient operation circuit 61 starts executing the particular operations before the input data buffer 53 receives all of the eight pieces of orthogonal transform coefficient data through the input port 51.

At step S62, similarly to the second embodiment, the input data buffer 53 in receipt of the eight pieces of orthogonal transform coefficient data enters a first half of the eight pieces of orthogonal transform coefficient data into each of the MAC operation circuits "54*a*" to "54*d*", while feeding a second half thereof into each of the MAC operation circuits "54*e*" to "54*h*". This means that the eight pieces of orthogonal transform coefficients are divided into two equal parts, which are entered into the MAC operation circuits "54*a*" to "54*h*" in a manner just described.

At step S63, the MAC operation circuits "54*a*" to "54*d*" perform multiply-and-accumulation (MAC) operations in a four-parallel manner using the first half of the eight pieces of orthogonal transform coefficient data and four pieces of four-by-four inverse orthogonal transformation-related coefficient data, while the MAC operation circuits "54*e*" to "54*h*" perform the MAC operations in the four-parallel manner using the second half of the eight pieces of orthogonal transform coefficient data and the four pieces of four-by-four orthogonal transformation-related coefficient data.

This means that the inverse orthogonal transform circuit 15 executes the four-by-four inverse orthogonal transformation on the four pieces of orthogonal transform coefficient data in a two-parallel manner.

At step S64, the routine is returned to step S59 when the inverse orthogonal transform circuit 15 is still practicing the four-by-four inverse orthogonal transform on the eight pixels-by-eight lines-formed block as illustrated in FIG. 5(*d*).

In other words, the routine is returned to step S59 when the completed operation is not related to the data on the eighth column as illustrated by FIG. 5(*d*).

At step S64, the inverse orthogonal transform circuit 15 terminates the processing when completing the four-by-four inverse orthogonal transform on the eight pixels-by-eight lines-formed block as illustrated in FIG. 5(*d*). As a result, a total of sixty-four pieces of pixel data are produced.

According to the present embodiment, the DC coefficient operation circuit 61 starts executing the particular operations on the four pieces of original data after receipt of the four pieces of original data.

As an alternative, there are cases where the DC coefficient operation circuit 61 may start executing the particular operations after receipt of two from among the four pieces of original data. Therefore, the DC coefficient operation circuit 61 is able to start executing the particular operations upon receipt of the two pieces of original data.

Thus, there is no need for the DC coefficient operation circuit 61 to wait for all of the four pieces of original data to arrive. Accordingly, the DC coefficient operation circuit 61 may start performing the particular operations upon receipt of as much original data as is enough to start executing the particular operations.

As described above, pursuant to the present embodiment, when the inverse orthogonal transform circuit 15 is in the four-by-four inverse orthogonal transform mode, then the DC coefficient operation circuit 61 starts to execute the particular operations before the input data buffer 53 receives all of the eight pieces of data through the input port 51.

This feature reduces the entire processing time, when compared with the way in which the DC coefficient operation circuit 61 starts performing the particular operations after the input data buffer 53 receives the eight pieces of data, and the input data buffer 53 writes the DC coefficients to the particular data in the data at the positions of the DC coefficients in the data after receipt of all of the DC coefficients before the inverse orthogonal transform circuit 15 starts practicing the four-by-four inverse orthogonal transform operations. As a result, high-speed processing is achievable.

No particular data may be inserted in the data (the data are entered into the inverse orthogonal transform circuit 15 through the input port 51) at the positions of the DC coefficients in the data. In other words, only AC coefficients may be entered as the data into the inverse orthogonal transform circuit 15 through the input port 51. In this instance, the input data buffer 53 inserts the DC coefficients produced using the DC coefficient operation circuit 61 into the data at the positions of the DC coefficients in the data in response to instructions from the controller 52.

At this time, the controller 52 ascertains, on the basis of DC information that is entered into the controller 52 through the DC information input port 99, that no data are present at the positions of the DC coefficients.

In the next generation coding system, there is a possibility that the AC coefficients in chroma components and the DC coefficients following the particular operations are subjected to variable length encoding for transmittance. Accordingly, when the only AC coefficients are entered into the inverse orthogonal transform circuit 15 though the input port 51, then it is particularly effective in decoding the chroma components in the next generation coding system.

According to the present embodiment, a butterfly operation circuit may be provided between the MAC operation circuits "54a" to "54h" and the output data buffers "55a" to "55h", as illustrated in FIG. 16. This alternative provides an eight-by-eight inverse orthogonal transform operation at high speeds.

The present embodiment illustrates the inverse orthogonal transform circuit 15 designed for both of the eight-by-eight and four-by-four inverse orthogonal transform modes. Alternatively, the present embodiment is applicable to an inverse orthogonal transform circuit designed for an N-by-N inverse orthogonal transform mode and an N/2-by-N/2 inverse orthogonal transform mode, where N is equal to 2x (x is an exponent).

The inverse orthogonal transform circuit 15 according to the present embodiment is realized by software. Therefore, the present invention is not limited to being applicable to hardware.

Similarly, the decoding apparatus according to the present embodiment can be realized by both of the software and hardware.

The inverse orthogonal transform circuit 15 according to the present embodiment is usable as an inverse orthogonal transform circuit 7 as illustrated in FIG. 1.

In both of the eight-by-eight and four-by-four inverse orthogonal transform modes, the input data buffer 53, the MAC operation circuits "54a" to "54h", and the output data buffers "55a" to "55h" behave in a manner similar to the way in which those according to the second embodiment work. However, in the four-by-four inverse orthogonal transform mode, the second embodiment excludes the way in which the input data buffer 53 overwrites the DC coefficients that are produced using the DC coefficient operation circuit 61.

The inverse orthogonal transform circuit according to the present embodiment includes all components that form the inverse orthogonal transform circuit according to the second embodiment. As a result, the present embodiment provides beneficial effects similar to those according to the second embodiment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An orthogonal transform apparatus operable to perform one of an N-by-N orthogonal transformation and an N/2-by-N/2 orthogonal transformation on data on an N-pixels-by-N-lines-formed pixel block, where N is equal to 2x, and x is an exponent, said orthogonal transform apparatus comprising:

an input unit operable to enter N-pieces of pixel data after receipt of the N-pieces of pixel data in an N-by-N orthogonal transform mode, and said input unit operable to enter N/2-pieces of first pixel data and N/2 pieces of second pixel data after receipt of the N-pieces of pixel data in an N/2-by-N/2 orthogonal transform mode; and an orthogonal transform operation unit operable to, in the N-by-N orthogonal transform mode, perform an operation on the entered N-pieces of pixel data and given N-by-N orthogonal transformation-related coefficient data, thereby producing N-number of orthogonal transform coefficients, said orthogonal transform operation unit operable to, in the N/2-by-N/2 orthogonal transform mode, perform an operation on the entered N/2-pieces of first pixel data and given N/2-by-N/2 orthogonal transformation-related coefficient data, thereby producing a first N/2-number of orthogonal transform coefficients, and said orthogonal transform operation unit operable to, in the N/2-by-N/2 orthogonal transform mode, perform an operation on the entered N/2-pieces of second pixel data and the given N/2-by-N/2 orthogonal transformation-related coefficient data, thereby producing a second N/2-number of orthogonal transform coefficients.

2. An orthogonal transform apparatus as defined in claim 1, wherein said orthogonal transform operation unit comprises:

a first coefficient storage unit operable to contain the N-by-N orthogonal transformation-related coefficient data;

a second coefficient storage unit operable to contain the N/2-by-N/2 orthogonal transformation-related coefficient data; and N-number of multiply-and-accumulation operation units, each of which is operable to perform a multiply-and-accumulation operation in the N-by-N orthogonal transform mode using the N-by-N orthogonal transformation-related coefficient data from said first coefficient storage unit, thereby producing one of the orthogonal transform coefficients, wherein, in the N/2-by-N/2 orthogonal transform mode, said input unit in receipt of the N-pieces of pixel data is operable to feed the N/2-pieces of first pixel data into each of N/2-number of first multiply-and-accumulation operation units and feed the N/2-pieces of second pixel data into each of N/2-number of second multiply-and-accumulation operation units, said N-number of multiply-and-accumulation operation units being formed by said N/2-number of first multiply-and-accumulation operation units and said N/2-number of second multiply-and-accumulation operation units, wherein, in the N/2-by-N/2 orthogonal transform mode, each of said N/2-number of first multiply-and-accumulation operation units is operable to perform the multiply-and-accumulation operation using the entered N/2-pieces of first pixel data and the N/2-by-N/2 orthogonal transformation-related coefficient data from said second coefficient storage unit, thereby providing one of the first orthogonal transform coefficients, and wherein, in the N/2-by-N/2 orthogonal transform mode, each of said N/2-number of second multiply-and-accumulation operation units is operable to perform the multiply-and-accumulation operation using the entered N/2-pieces of second pixel data and the N/2-by-N/2 orthogonal transformation-related coefficient data from said second coefficient storage unit, thereby providing one of the second orthogonal transform coefficients.

3. An orthogonal transform apparatus as defined in claim 1, further comprising:

a maximum value-detecting unit operable to, in the N-by-N orthogonal transform mode, detect a maximum value from among orthogonal transform coefficients on the N-pixels-by-N-lines-formed pixel block, and said maximum value-detecting unit operable to, in the N/2-by-N/2 orthogonal transform mode, detect a maximum value from among orthogonal transform coefficients for each of N/2-pixels-by-N/2-lines-formed four pixel blocks, the N/2-pixels-by-N/2-lines-formed four pixel blocks being obtained by dividing the N-pixels-by-N-lines-formed pixel block into four parts, wherein, in the N-by-N orthogonal transform mode, said maximum value-detecting unit is operable to detect the maximum value from among the orthogonal transform coefficients on the N-pixels-by-N-lines-formed pixel block by comparison with the orthogonal transform coefficients sequentially entered, while said orthogonal transform operation unit is operable to perform the N-by-N orthogonal transformation in the N-by-N orthogonal transform mode, and wherein, in the N/2-by-N/2 orthogonal transform mode, said maximum value-detecting unit is operable to detect the maximum value from among the orthogonal transform coefficients on the N/2-pixels-by-N/2-lines-formed pixel block by comparison with the orthogonal transform coefficients sequentially entered, while said orthogonal transform operation unit is operable to perform the N/2-by-N/2 orthogonal transformation in the N/2-by-N/2 orthogonal transform mode.

4. An orthogonal transform apparatus as defined in claim 1, further comprising:

a maximum value-detecting unit operable to, in the N-by-N orthogonal transform mode, detect a maximum value from among orthogonal transform coefficients on the N-pixels-by-N-lines-formed pixel block, and said maximum value-detecting unit operable to, in the N/2-by-N/2 orthogonal transform mode, detect a maximum value from among orthogonal transform coefficients on the N-pixels-by-N-lines-formed pixel block, wherein, in the N-by-N orthogonal transform mode, said maximum value-detecting unit is operable to detect the maximum value from among the orthogonal transform coefficients on the N-pixels-by-N-lines-formed pixel block by comparison with the orthogonal transform coefficients sequentially entered, while said orthogonal transform operation unit is operable to perform the N-by-N orthogonal transformation in the N-by-N orthogonal transform mode, and wherein, in the N/2-by-N/2 orthogonal transform mode, said maximum value-detecting unit is operable to detect the maximum value from among the orthogonal transform coefficients on the N-pixels-by-N-lines-formed pixel block by comparison with the orthogonal transform coefficients sequentially entered, while said orthogonal transform operation unit is operable to perform the N/2-by-N/2 orthogonal transformation in the N/2-by-N/2 orthogonal transform mode.

5. An orthogonal transform apparatus as defined in claim 1, further comprising:

a maximum value-detecting unit operable to, in the N-by-N orthogonal transform mode, detect a maximum value from among AC coefficients in orthogonal transform coefficients on the N-pixels-by-N-lines-formed pixel block, and said maximum value-detecting unit operable to, in the N/2-by-N/2 orthogonal transform mode, detect a maximum value from among AC coefficients in orthogonal transform coefficients for each of N/2-pixels-by-N/2-lines-formed four pixel blocks, the N/2-pixels-by-N/2-lines-formed four pixel blocks being obtained by dividing the N-pixels-by-N-lines-formed pixel block into four parts, wherein, in the N-by-N orthogonal transform mode, said maximum value-detecting unit is operable to detect the maximum value from among the AC coefficients in the orthogonal transform coefficients on the N-pixels-by-N-lines-formed pixel block by comparison with the AC coefficients in the orthogonal transform coefficients sequentially entered, while said orthogonal transform operation unit is operable to perform the N-by-N orthogonal transformation in the N-by-N orthogonal transform mode, and wherein, in the N/2-by-N/2 orthogonal transform mode, said maximum value-detecting unit is operable to detect the maximum value from among the AC coefficients in the orthogonal transform coefficients on the N/2-pixels-by-N/2-lines-formed pixel block by comparison with the AC coefficients in the orthogonal transform coefficients sequentially entered, while said orthogonal transform operation unit is operable to perform the N/2-by-N/2 orthogonal transformation in the N/2-by-N/2 orthogonal transform mode.

6. An orthogonal transform apparatus as defined in claim 1, further comprising:
- a maximum value-detecting unit operable to, in the N-by-N orthogonal transform mode, detect a maximum value from among AC coefficients in orthogonal transform coefficients on the N-pixels-by-N-lines-formed pixel block, and
- said maximum value-detecting unit operable to, in the N/2-by-N/2 orthogonal transform mode, detect a maximum value from among AC coefficients in orthogonal transform coefficients on the N-pixels-by-N-lines-formed pixel block,
- wherein, in the N-by-N orthogonal transform mode, said maximum value-detecting unit is operable to detect the maximum value from among the AC coefficients in the orthogonal transform coefficients on the N-pixels-by-N-lines-formed pixel block by comparison with the AC coefficients in the orthogonal transform coefficients sequentially entered, while said orthogonal transform operation unit is operable to perform the N-by-N orthogonal transformation in the N-by-N orthogonal transform mode, and
- wherein, in the N/2-by-N/2 orthogonal transform mode, said maximum value-detecting unit is operable to detect the maximum value from among the AC coefficients in the orthogonal transform coefficients on the N-pixels-by-N-lines-formed pixel block by comparison with the AC coefficients in the orthogonal transform coefficients sequentially entered, while said orthogonal transform operation unit is operable to perform the N/2-by-N/2 orthogonal transformation in the N/2-by-N/2 orthogonal transform mode.

7. An orthogonal transform apparatus as defined in claim 1, further comprising:
- a DC coefficient operation unit operable to, in the N/2-by-N/2 orthogonal transform mode, obtain four DC coefficients on N/2-pixels-by-N/2-lines-formed four pixel blocks, while said orthogonal transform operation unit is operable to perform the N/2-by-N/2 orthogonal transformation in the N/2-by-N/2 orthogonal transform mode, the N/2-pixels-by-N/2-lines-formed four pixel blocks being obtained by dividing the N-pixels-by-N-lines-formed pixel block into four parts, and
- said DC coefficient operation unit operable to perform a predetermined operation on the obtained four DC coefficients,
- wherein said DC coefficient operation unit is operable to start executing the predetermined operation when obtaining as many of the DC coefficients as are able to start performing the predetermined operation.

8. An orthogonal transform apparatus as defined in claim 7, wherein, in the N/2-by-N/2 orthogonal transform mode, AC coefficients obtained by removing the four DC coefficients from N-by-N number of orthogonal transform coefficients are outputted to the outside, the N-by-N number of orthogonal transform coefficients being produced using the N/2-pixels-by-N/2-lines-formed four pixel blocks in the N/2-by-N/2 orthogonal transform mode.

9. An encoding apparatus comprising:
- an orthogonal transform unit operable to orthogonally transform data on an N-pixels-by-N-lines-formed pixel block, where N is equal to 2x, and x is an exponent, thereby producing orthogonal transform coefficient data;
- a quantizing unit operable to quantize the produced orthogonal transform coefficient data, thereby producing quantized data; and
- a variable length encoding unit operable to perform variable length encoding of the quantized data, thereby producing encoded data,
- wherein said orthogonal transform unit comprises:
- an input unit operable to enter N-pieces of pixel data after receipt of the N-pieces of pixel data in an N-by-N orthogonal transform mode, and
- said input unit operable to enter N/2-pieces of first pixel data and N/2 pieces of second pixel data after receipt of the N-pieces of pixel data in an N/2-by-N/2 orthogonal transform mode; and
- an orthogonal transform operation unit operable to, in the N-by-N orthogonal transform mode, perform an operation on the entered N-pieces of pixel data and given N-by-N orthogonal transformation-related coefficient data, thereby producing N-pieces of orthogonal transform coefficient data,
- said orthogonal transform operation unit operable to, in the N/2-by-N/2 orthogonal transform mode, perform an operation on the entered N/2-pieces of first pixel data and given N/2-by-N/2 orthogonal transformation-related coefficient data, thereby producing a first N/2-pieces of orthogonal transform coefficient data, and
- said orthogonal transform operation operable to, in the N/2-by-N/2 orthogonal transform mode, perform an operation on the entered N/2-pieces of second pixel data and the given N/2-by-N/2 orthogonal transformation-related coefficient data, thereby producing a second N/2-pieces of orthogonal transform coefficient data.

10. An inverse orthogonal transform apparatus operable to perform one of an N-by-N inverse orthogonal transformation and an N/2-by-N/2 inverse orthogonal transformation on orthogonal transform coefficient data on an N-pixels-by-N-lines-formed block, where N is equal to 2x, and x is an exponent, said inverse orthogonal transform apparatus comprising:
- an input unit operable to, in an N-by-N inverse orthogonal transform mode, enter N-number-of-pixels-based orthogonal transform coefficient data after receipt of the N-number-of-pixels-based orthogonal transform coefficient data, and
- said input unit operable to, in an N/2-by-N/2 inverse orthogonal transform mode, enter N/2-number-of-first pixels-based orthogonal transform coefficient data and N/2 number-of-second pixels-based orthogonal transform coefficient data after receipt of the N-number-of-pixels-based orthogonal transform coefficient data; and
- an inverse orthogonal transform operation unit operable to, in the N-by-N inverse orthogonal transform mode, perform an operation on the entered N-number-of-pixels-based orthogonal transform coefficient data and given N-by-N inverse orthogonal transformation-related coefficient data, thereby producing N-pieces of pixel data,
- said inverse orthogonal transform operation unit operable to, in the N/2-by-N/2 inverse orthogonal transform mode, perform an operation on the entered N/2-number-of-first pixels-based orthogonal transform coefficient data and given N/2-by-N/2 inverse orthogonal transformation-related coefficient data, thereby producing a first N/2-pieces of pixel data, and
- said inverse orthogonal transform operation unit operable to, in the N/2-by-N/2 inverse orthogonal transform mode, perform an operation on the entered N/2-number-of-second pixels-based orthogonal transform coefficient data and the given N/2-by-N/2 inverse orthogonal transformation-related coefficient data, thereby producing a second N/2-pieces of pixel data.

11. An inverse orthogonal transform apparatus as defined in claim 10, wherein said inverse orthogonal transform operation unit comprises:

a first coefficient storage unit operable to contain the N-by-N inverse orthogonal transformation-related coefficient data;

a second coefficient storage unit operable to contain the N/2-by-N/2 inverse orthogonal transformation-related coefficient data; and N-number of multiply-and-accumulation operation units, each of which is operable to perform a multiply-and-accumulation operation in the N-by-N inverse orthogonal transform mode using the N-by-N inverse orthogonal transformation-related coefficient data from said first coefficient storage unit, thereby producing a piece of the pixel data, wherein, in the N/2-by-N/2 inverse orthogonal transform mode, said input unit in receipt of the N-number-of-pixels-based orthogonal transform coefficient data is operable to feed the N/2-number-of-first pixels-based orthogonal transform coefficient data into each of N/2-number of first multiply-and-accumulation operation units, and feed the N/2-number-of-second pixels-based orthogonal transform coefficient data into each of N/2-number of second multiply-and-accumulation operation units, said N-number of multiply-and-accumulation operation units being formed by said N/2-number of first multiply-and-accumulation operation units and said N/2-number of second multiply-and-accumulation operation units, wherein, in the N/2-by-N/2 inverse orthogonal transform mode, each of said N/2-number of first multiply-and-accumulation operation units is operable to perform the multiply-and-accumulation operation using the entered N/2-number-of-first pixels-based orthogonal transform coefficient data and the N/2-by-N/2 inverse orthogonal transformation-related coefficient data from said second coefficient storage unit, thereby providing a piece of the first pixel data, and wherein, in the N/2-by-N/2 inverse orthogonal transform mode, each of said N/2-number of second multiply-and-accumulation operation units is operable to perform the multiply-and-accumulation operation using the entered N/2-number-of-second pixels-based orthogonal transform coefficient data and the N/2-by-N/2 inverse orthogonal transformation-related coefficient data from said second coefficient storage unit, thereby providing a piece of the second pixel data.

12. An inverse orthogonal transform apparatus as defined in claim 10, further comprising:

a DC coefficient operation unit operable to obtain original data of four DC coefficients on N/2-pixels-by-N/2-lines-formed four blocks in the N/2-by-N/2 inverse orthogonal transform mode, the N/2-pixels-by-N/2-lines-formed four blocks being obtained by dividing the N-pixels-by-N-lines-formed block into four parts, and to perform a predetermined operation on the obtained original data, thereby providing the four DC coefficients, wherein data received by said input unit in the N/2-by-N/2 inverse orthogonal transform mode contains no DC coefficient, and said input unit feeds the DC coefficients provided by said DC coefficient operation unit into said inverse orthogonal transform operation unit when said input unit must enter the DC coefficients into said inverse orthogonal transform operation unit in the N/2-by-N/2 inverse orthogonal transform mode, and wherein said DC coefficient operation unit starts performing the predetermined operation before said input unit completes data acceptance to enter the received data into said inverse orthogonal transform operation unit.

13. A decoding apparatus for decoding data on an N-pixels-by-N-lines-formed block, where N is equal to 2x, and x is an exponent, comprising:

a variable length decoding unit operable to perform variable length decoding of encoded data, thereby producing quantized data;

an inverse quantizing unit operable to inversely quantize the quantized data, thereby producing orthogonal transform coefficient data; and an inverse orthogonal transform unit operable to inversely orthogonally transform the produced orthogonal transform coefficient data, thereby producing pixel data, wherein said inverse orthogonal transform unit comprises:

an input unit operable to, in an N-by-N inverse orthogonal transform mode, enter N-number-of-pixels-based orthogonal transform coefficient data after receipt of the N-number-of-pixels-based orthogonal transform coefficient data, and said input unit operable to, in an N/2-by-N/2 inverse orthogonal transform mode, enter N/2-number-of-first pixels-based orthogonal transform coefficient data and N/2-number-of-second pixels-based orthogonal transform coefficient data after receipt of the N-number-of-pixels-based orthogonal transform coefficient data; and an inverse orthogonal transform operation unit operable to, in the N-by-N inverse orthogonal transform mode, perform an operation on the entered N-number-of-pixels-based orthogonal transform coefficient data and given N-by-N inverse orthogonal transformation-related coefficient data, thereby producing N-pieces of pixel data, said inverse orthogonal transform operation unit operable to, in the N/2-by-N/2 inverse orthogonal transform mode, perform an operation on the entered N/2-number-of-first pixels-based orthogonal transform coefficient data and given N/2-by-N/2 inverse orthogonal transformation-related coefficient data, thereby producing a first N/2-pieces of pixel data, and said inverse orthogonal transform operation unit operable to, in the N/2-by-N/2 inverse orthogonal transform mode, perform an operation on the entered N/2-number-of-second pixels-based orthogonal transform coefficient data and the given N/2-by-N/2 inverse orthogonal transformation-related coefficient data, thereby producing a second N/2-pieces of pixel data.

* * * * *